United States Patent
Nyhart et al.

(10) Patent No.: US 11,467,257 B2
(45) Date of Patent: Oct. 11, 2022

(54) GOLF LASER RANGEFINDERS

(71) Applicant: Bushnell Inc., Overland Park, KS (US)

(72) Inventors: Scott O. Nyhart, Shawnee, KS (US); John DeCastro, Overland Park, KS (US)

(73) Assignee: BUSHNELL INC., Overland Park, KS (US)

( * ) Notice: Subject to any disclaimer, the term of this patent is extended or adjusted under 35 U.S.C. 154(b) by 922 days.

(21) Appl. No.: 16/145,057

(22) Filed: Sep. 27, 2018

(65) Prior Publication Data

US 2019/0094343 A1    Mar. 28, 2019

Related U.S. Application Data

(63) Continuation of application No. 29/631,822, filed on Jan. 3, 2018, now Pat. No. Des. 875,200.
(Continued)

(51) Int. Cl.
*G01S 7/48* (2006.01)
*A63B 57/00* (2015.01)
(Continued)

(52) U.S. Cl.
CPC ............ *G01S 7/4808* (2013.01); *A63B 57/00* (2013.01); *A63B 69/36* (2013.01); *G01P 5/00* (2013.01);
(Continued)

(58) Field of Classification Search
CPC ........ G01S 7/4808; G01S 7/481; G01S 17/08; G01S 17/86; G01S 17/88; G01S 7/51;
(Continued)

(56) References Cited

U.S. PATENT DOCUMENTS 6,066,046 A * 5/2000 Yamamoto ............ A63F 13/005
                                                    463/7
6,154,143 A * 11/2000 Robinson ............... G01C 21/20
                                                    340/584

(Continued)

OTHER PUBLICATIONS

English translation of text of First Office Action received in corresponding CN Application No. 201880076346.6, dated Dec. 15, 2021.

*Primary Examiner* — Luke D Ratcliffe
*Assistant Examiner* — Woohyeong Cho
(74) *Attorney, Agent, or Firm* — Walter M. Egbert, III; Richard J. Brown; Reed Smith LLP

(57) ABSTRACT

A laser rangefinder may include a housing supporting an objective optic, an eyepiece optic, and a view-thru display. The view-thru display may be located along an optical path between the objective optic and the eyepiece optic. The view-thru display may comprise a first transparent sheet and a plurality of electrodes disposed on a first inner surface of the first transparent sheet. The view-thru display may be disposed rearward of the objective optic and the eyepiece optic may be disposed rearward of the view-thru display assembly so that a scene or subject can be viewed through the eyepiece optic and a plurality of display elements selectively displayed by the view-thru display assembly are superimposed on the scene or subject being viewed. Information regarding wind in proximity to the laser rangefinder may be presented on the view-thru display.

19 Claims, 48 Drawing Sheets

Related U.S. Application Data

(60) Provisional application No. 62/566,874, filed on Oct. 2, 2017, provisional application No. 62/566,826, filed on Oct. 2, 2017, provisional application No. 62/567,064, filed on Oct. 2, 2017, provisional application No. 62/565,291, filed on Sep. 29, 2017, provisional application No. 62/497,307, filed on Sep. 27, 2017.

(51) Int. Cl.
| | | |
|---|---|---|
| *G01P 5/00* | (2006.01) | |
| *G01S 17/08* | (2006.01) | |
| *G01S 7/51* | (2006.01) | |
| *G01S 7/481* | (2006.01) | |
| *G01S 17/88* | (2006.01) | |
| *G01S 17/86* | (2020.01) | |
| *A63B 69/36* | (2006.01) | |

(52) U.S. Cl.
CPC ............. *G01S 7/481* (2013.01); *G01S 7/51* (2013.01); *G01S 17/08* (2013.01); *G01S 17/86* (2020.01); *G01S 17/88* (2013.01); *A63B 2220/805* (2013.01)

(58) Field of Classification Search
CPC ... G01S 19/48; G01P 5/00; G01P 5/26; G01P 13/00; A63B 2220/805; A63B 2225/02; A63B 57/00; A63B 69/36
See application file for complete search history.

(56) References Cited

U.S. PATENT DOCUMENTS

| | | | | |
|---|---|---|---|---|
| 6,681,512 | B2* | 1/2004 | Sammut | F41G 1/38 33/265 |
| 7,905,046 | B2* | 3/2011 | Smith, III | F41G 3/06 42/142 |
| 8,055,395 | B1* | 11/2011 | Dirks | G05D 1/0204 701/16 |
| 8,074,394 | B2* | 12/2011 | Lowrey, III | F41G 3/08 42/123 |
| 8,453,368 | B2* | 6/2013 | Bockmon | F41G 3/06 42/111 |
| 8,694,184 | B1* | 4/2014 | Boorman | B64C 19/00 701/14 |
| 9,310,165 | B2* | 4/2016 | Bell | F41A 23/14 |
| 9,328,995 | B1* | 5/2016 | Hancosky | F41G 1/345 |
| 2003/0163278 | A1* | 8/2003 | Clark | G01P 5/24 702/138 |
| 2007/0085706 | A1* | 4/2007 | Feyereisen | G01C 23/005 340/968 |
| 2007/0236367 | A1 | 10/2007 | Matayoshi et al. | |
| 2008/0039962 | A1* | 2/2008 | McRae | G01S 17/88 700/90 |
| 2008/0198356 | A1 | 8/2008 | Hocknell et al. | |
| 2013/0119257 | A1* | 5/2013 | Ikeda | G08B 29/22 250/347 |
| 2015/0055119 | A1 | 2/2015 | Hamilton | |
| 2015/0176948 | A1 | 6/2015 | Varshneya et al. | |

\* cited by examiner

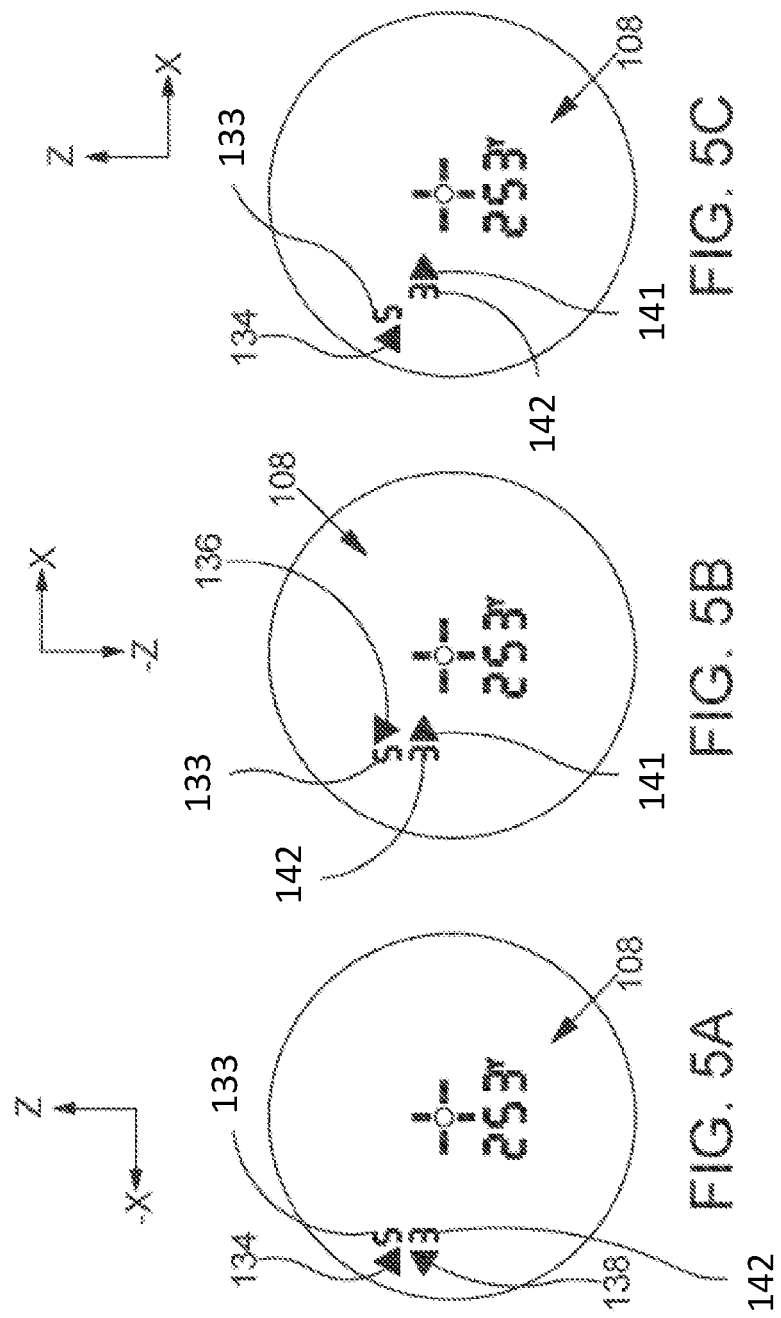

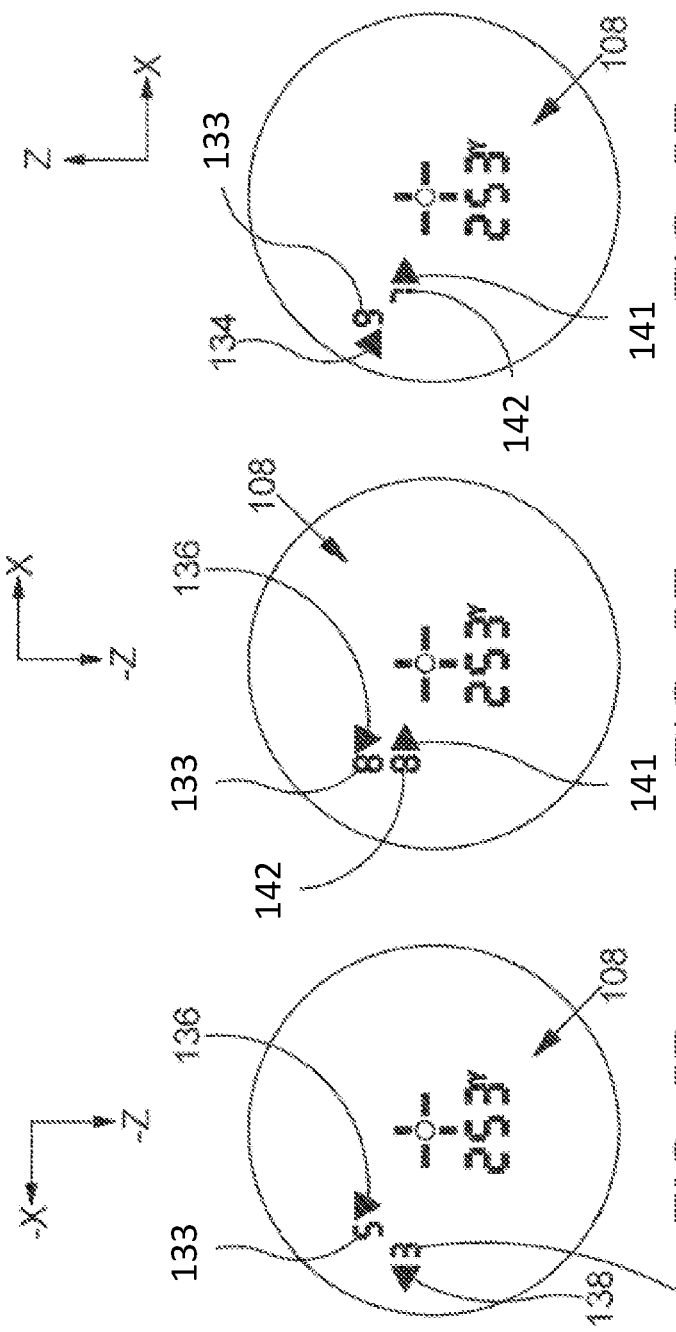

| ELEMENT NUMBER | POLAR COORDINATES | |
|---|---|---|
| | RADIUS | Θ [DEGREES] |
| 42 | R | 45 |
| 44 | R | 90 |
| 46 | R | 135 |
| 48 | R | 180 |
| 50 | R | 225 |
| 52 | R | 270 |
| 54 | R | 315 |
| 40 | R | 0, 360 |

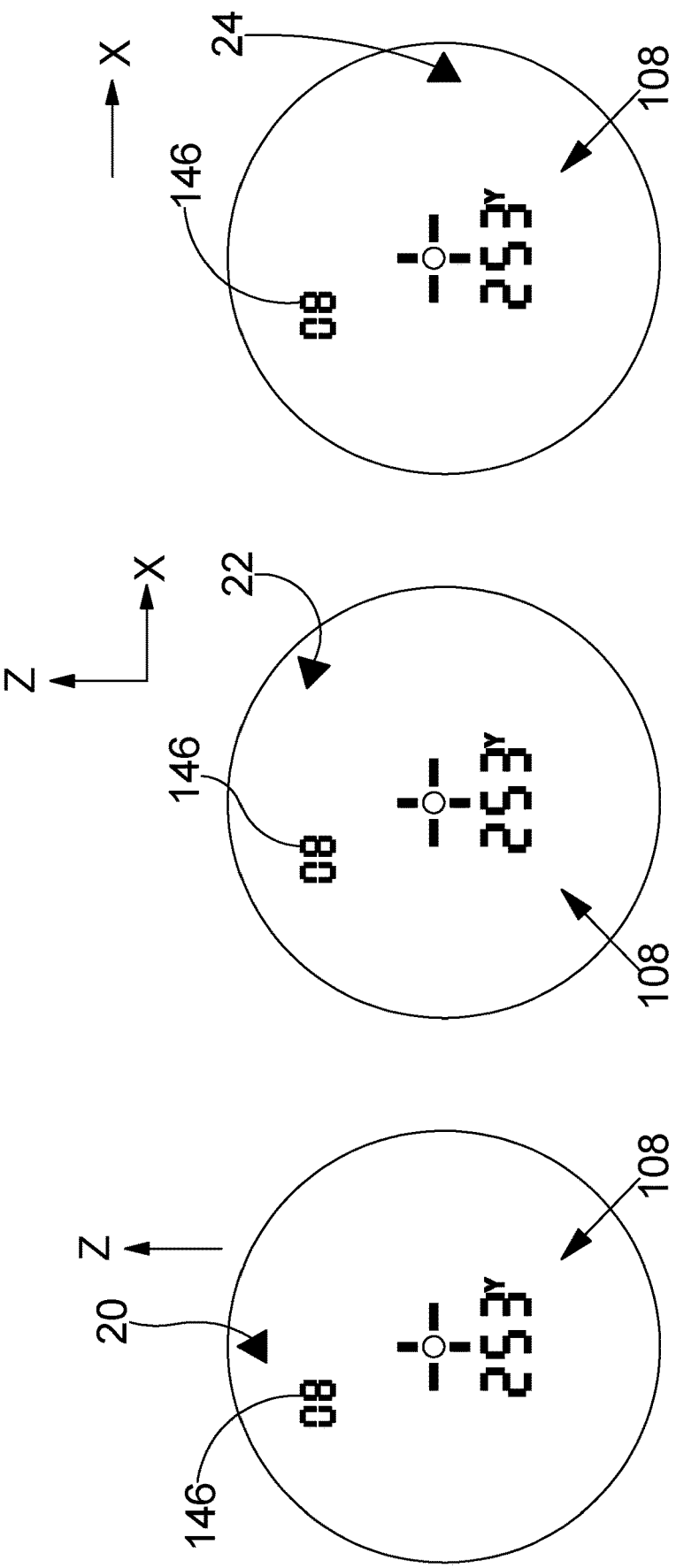

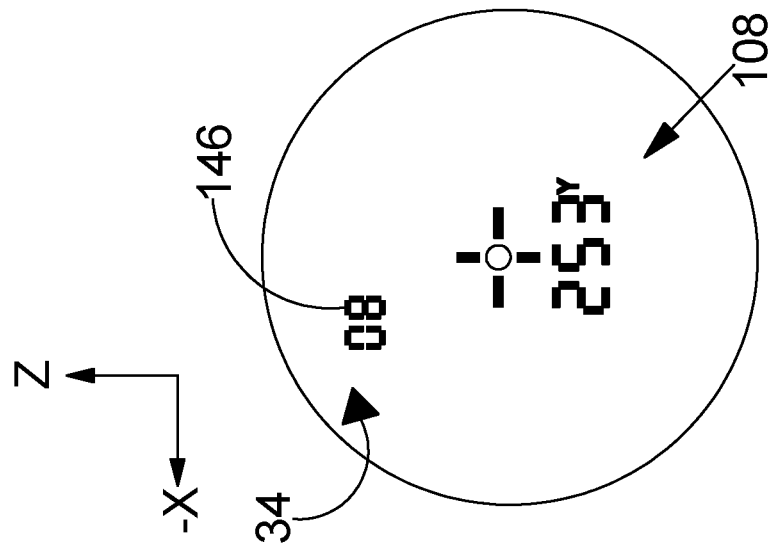
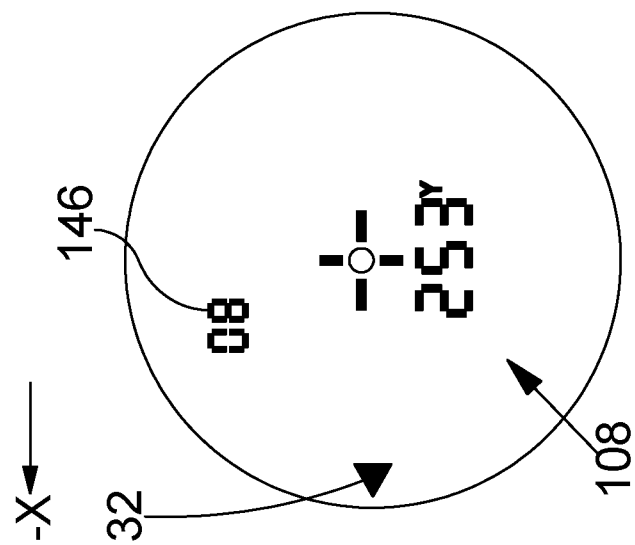
FIG. 14H
FIG. 14G

| ELEMENT NUMBER | RADIUS | θ [DEGREES] | ELEMENT NUMBER | RADIUS | θ [DEGREES] |
|---|---|---|---|---|---|
| 1 | R | 22.5 | 9 | R | 202.5 |
| 2 | R | 45.0 | 10 | R | 225.0 |
| 3 | R | 67.5 | 11 | R | 247.5 |
| 4 | R | 90.0 | 12 | R | 270.0 |
| 5 | R | 112.5 | 13 | R | 282.5 |
| 6 | R | 135.0 | 14 | R | 315.0 |
| 7 | R | 157.5 | 15 | R | 337.5 |
| 8 | R | 180.0 | 16 | R | 0, 360 |

FIG. 15B

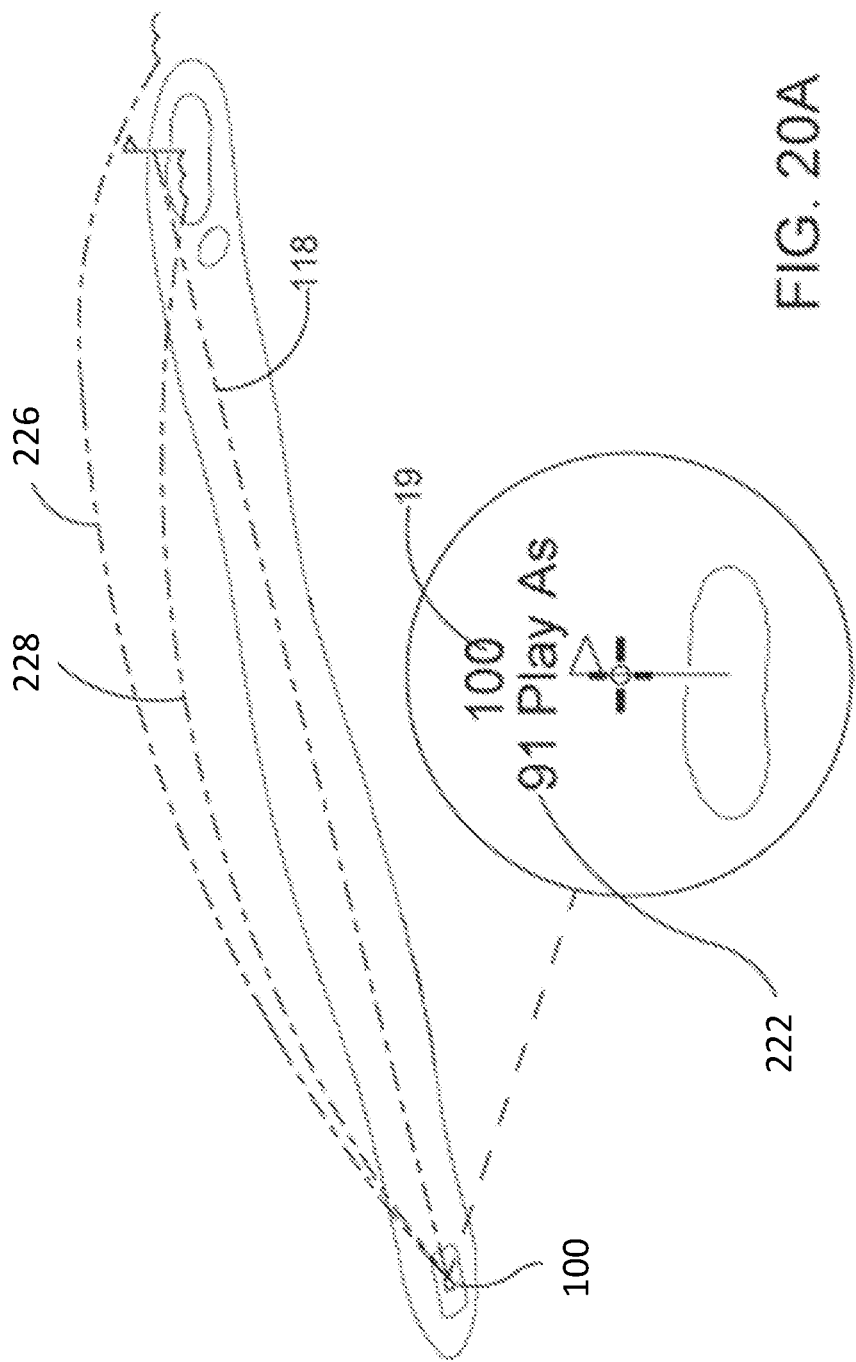

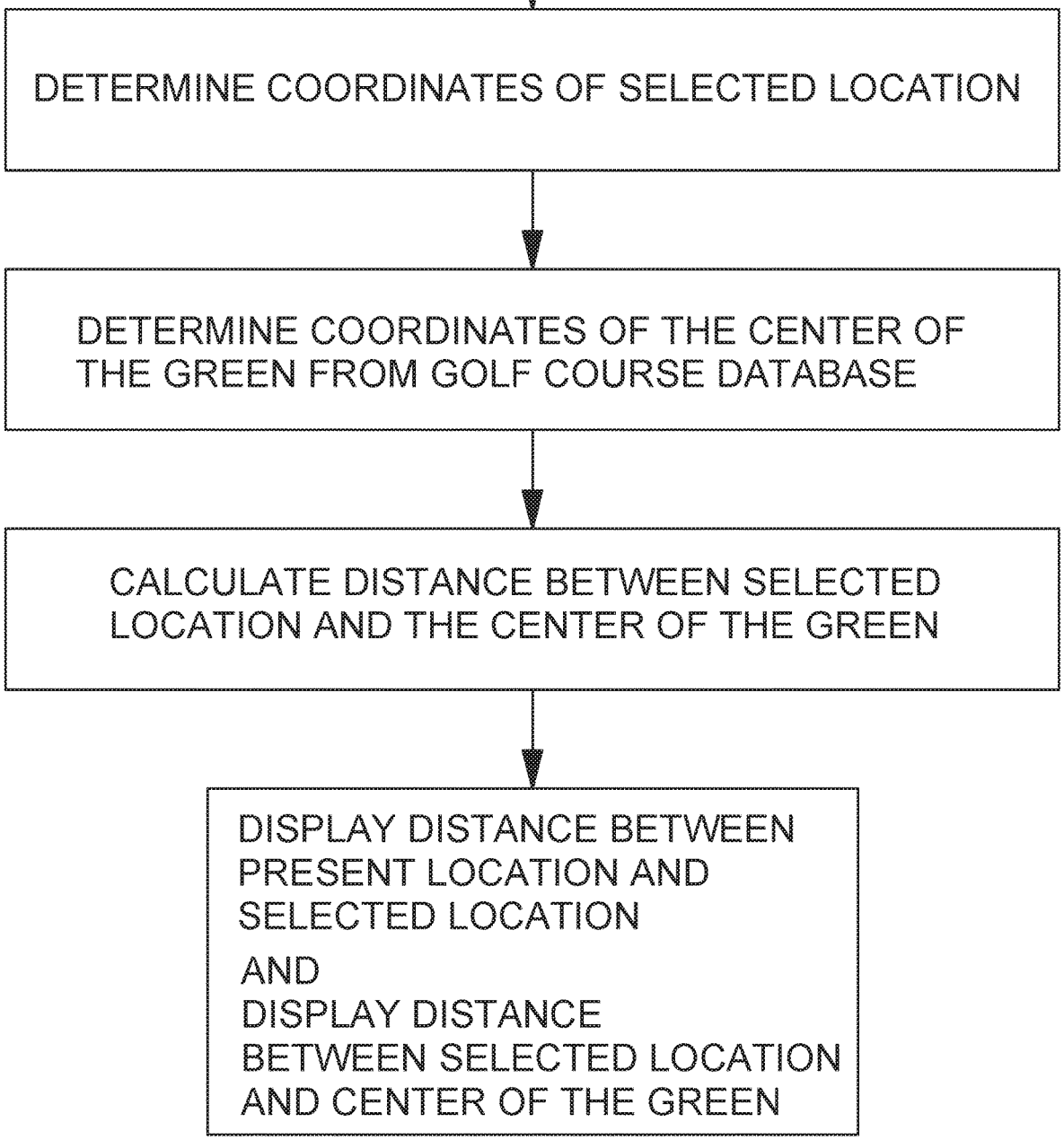

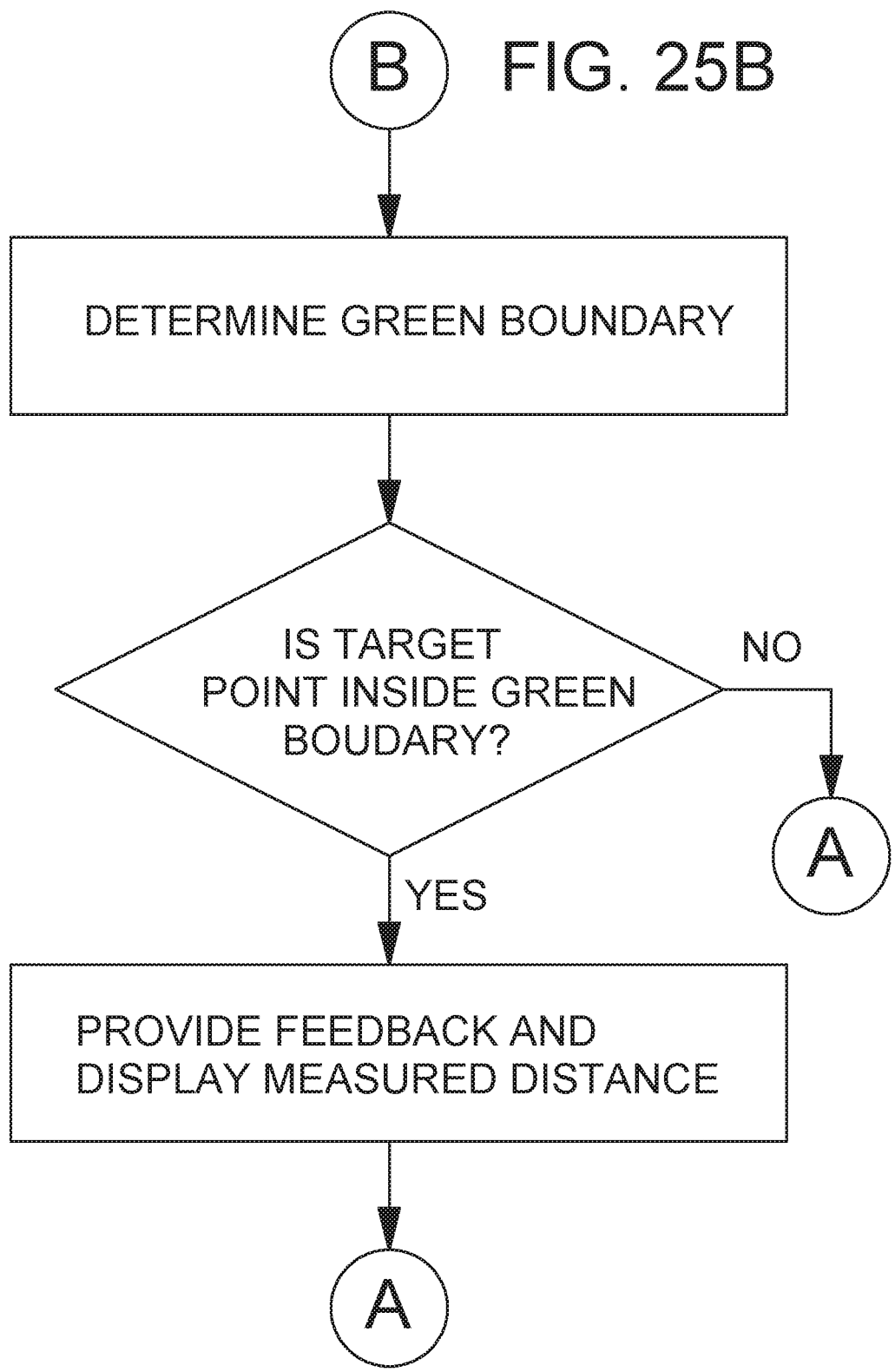

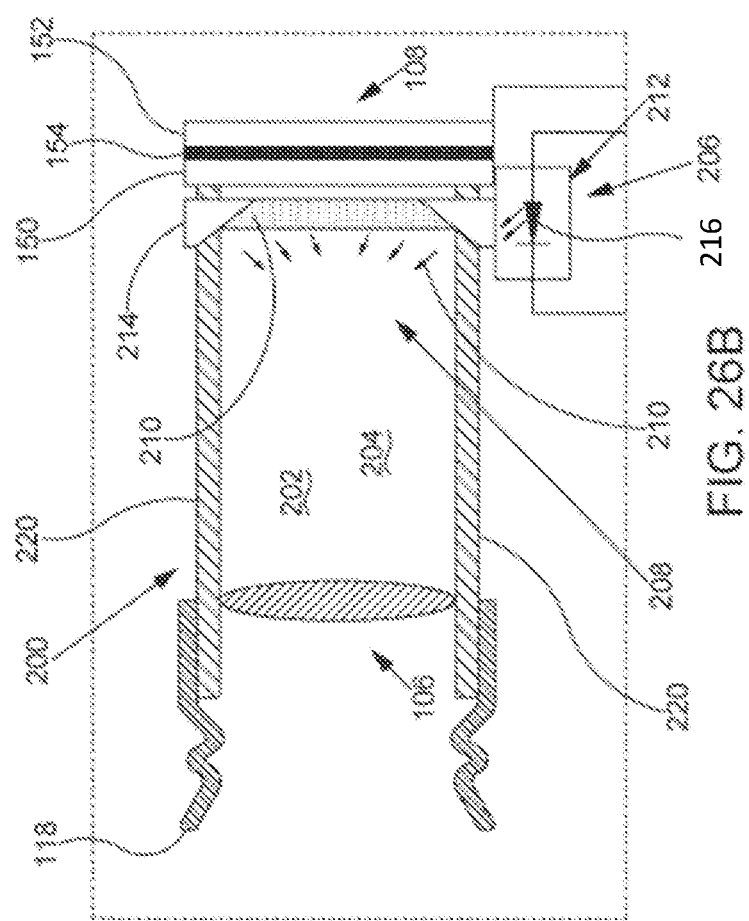

GOLF LASER RANGEFINDERS

CROSS-REFERENCE TO RELATED APPLICATION

This application claims the benefit of U.S. Design patent application No. 29/631,822, filed Jan. 3, 2018 and claims the benefit of U.S. Provisional Application Nos. 62/566,826, filed Oct. 2, 2018; 62/567,064, filed Oct. 2, 2017; 62/566,874, filed Oct. 2, 2017; 62/565,291 filed Sep. 29, 2017 and 62/497,207, filed Sep. 27, 2017, the disclosures of which are incorporated by reference herein.

BACKGROUND OF THE DISCLOSURE

Unlike sports such as baseball, tennis, soccer and football, the sport of golf does not use a standardized playing area. Accordingly, the player's ability to cope with the varied terrains encountered on different golf courses is an important part of game strategy. Tools at a player's disposal include golf course maps and laser rangefinders for making measurements while on the golf course. A golf course typically consists of either 9 or 18 holes with each hole having a cup surrounded by a putting green. A flagstick or "pin" is received in the making the location of the cup visible from a distance. Each hole also includes a teeing region or "tee box" that is set off with two markers showing the bounds of the legal tee area. A fairway extends between the tee box and the cup. A variety of obstacles and hazards are also typically placed between the tee box and the pin. These obstacles and hazards may including sand bunkers, trees, ponds, lakes, rivers, shoreline, creeks, un-grassed areas, and natural vegetation areas, which are typically located on the sides of fairways but may be place in the fairways. Generally, the fairway is far from perfectly flat and may have significant undulations and changes in elevation, sometimes the elevation differential between the golf ball striking location and the landing spot, such as the green, can be significant. Also, environmental conditions can affect the golf ball path, such as wind direction and strength, altitude, and temperature.

Golfers strive to shoot low golf scores, that is, going from tee to cup in a minimal number of strokes. Serious golfers need to know the distances that they hit each club in their bag, however, such distances presume level surfaces and ideal or typical weather conditions. Golfers always are making subjective judgements on accommodating different variables that they are subjected to including wind, differing elevations from ball location to landing area, and avoidance of hazards, all with the goal of shooting low scores.

A further consideration in golf is the pace of play. Maintaining a good pace of play is one of the main rules of etiquette of golf. At times this is very important as a slow player or players can back up an entire course and disrupt scheduled tee times. Playing partners and groups behind slow players seriously frown upon slow play. Slow play can result by players taking too long to line up shots, considering which club to hit, assessing the many variables, such as wind, elevation differences, potential landing spots, and risks of off-line shots. Properly and expediently assessing all these variable is necessary for shooting low scores and keeping up with the pace of play.

Within recent decades, laser rangefinders were introduced to the game of golf. Laser range finders can provide highly accurate measurements to pins, hazards and intermediate landing spots. Distances are graphically displayed in the viewfinder of the range finder. Initially laser rangefinders were utilized solely for measuring actual laser ranged distances, for example to a flagstick or a hazard. Although that is clearly still their principle use today, it is known to equip laser rangefinders with additional functionalities. For example, providing in addition to displaying measured laser ranged distances, also displaying "play as" distances where the measured distance is adjusted to compensate for such things as changes in elevation, wind, altitude, and temperature. The rangefinders utilizing internal algorithms and processors to make the calculations and suitable adjustments.

Laser range finders originally had significant issues discriminating trees and other objects from the flagsticks. These issues have been addressed to some extent by utilizing algorithms and software with processors to identify flag acquisition internally by the laser rangefinder processors and then by visually indicating to the user that the flagstick or other object has been identified with some certainty by the rangefinder. Typically such a pin acquisition indicator has been by way of an icon appearing in the middle of the display or in the central portion of the display, or with labels, such as TARGET ACQUIRED appearing in the central portion of the display.

Apart for laser rangefinders, GPS devices are utilized for providing distance assistance to aid golfers. Such devices store golf course layouts and with the GPS device establishing the location of the range finder and with the course layout stored in the GPS device, the device can calculate the distances to the middle, front, and rear of the green on the current hole. Laser ranging can be supplemented with location information provided by GPS. For example, combining a laser range finder with the GPS can give a distance to the flag stick and then can add the GPS calculated distances to the front and rear of the green. Such laser rangefinders are known.

Accomplished golfers consider many variables on each shot, especially shots to the green, and to the extent data and information is available through the electronic devices, such data and information is welcome. Such information and data can help golfers determine club selection, where to hit the ball, and even how to hit the ball.

In golf pace of play is very important. Players that take too long to line up shots, or in considering which club to hit, or in taking too many practice swings are frowned upon. There is a very real need of providing data to the golfer through the laser range finder quickly and clearly so as not to inhibit the pace of play.

In lining up a shot, either off of the tee, or between the tee and green, golfers may often think the more data the better. The viewfinder in sophisticated golf rangefinders may end up being flooded with data, including data such as: actual distance to pin, distance to the front of the green, distance to the rear of the green, play as distance, wind direction, battery life, hole being played, and other information. The more user friendly the data and information presentation is the better. Pace of play can be maintained and vital data and information can be conveyed to the golfer.

As the golfer is viewer data in his rangefinder, perhaps the most used and important data provided in the viewfinder is the actual distance to the flag, as discussed above, that distance is most reliable when the laser has locked onto the flagstick and the laser range finder provides a target of flagstick acquired indication in the display. Where there is lots of data in the display, where the golfer is contemplating options and hazards, and where the golfer is attempting to maintain pace of play, it is not always easy to notice the target acquired icons that appears in the middle of the display, close to the flag being ranged, as graphic indicators are already cluttered about the display. Moreover, these graphical icons and labels that providing information block part of the display, inhibiting a clear view. Flagstick acquisition icons add to the issue of inhibiting a clear view. Improvements in target acquired indicators that are more noticeable and that do not block the display and inhibit a clear view of the sighted region would be welcome by golfers.

The prior art that teaches rangefinders with wind information present wind direction as an arrow pointing a particular direction around the periphery of the display. Discerning what the arrow means and how to use this wind direction indicator arrow effectively can be confounding as wind impacts both shot distance and shot direction. Improvements in wind data and information display would be well received by golfers. Generally, improvements in the display of data and information to golfers such that they can more expediently process and use information would be well received.

SUMMARY

A golf laser rangefinder has a viewfinder, a push button laser actuator, an eyepiece, and a display viewable through the eyepiece with information and data provided on the display. The information includes a measured distance readout and may include additional information such as "play as" distance, wind information, battery information, hole being played information, distance to front of green, and distance to back of green. In embodiments, a pronounced pin acquired indicator is presented outside the central viewing region of the viewing screen. The pin acquired indicator may be positioned at the periphery of the viewing screen in a circular illumination about the image of the see-thru display that appears upon the pin acquisition, In embodiments the indicator may be a peripheral distortion of the displayed image in the viewfinder. In embodiments, the pin acquisition indicator may be coloration of the entire viewing screen. In embodiments, the pin acquisition indicator may be a darkening or brightening of the image, for example the entire image, in the viewfinder. In embodiments, the rangefinder presents wind information in the viewfinder. The information may be provided by publically available weather sourcing information or by sensors attached to or used by the golfer. In embodiments, the golfer can observe and enter a wind direction and strength (velocity). In embodiments, the wind information is provided in the display in the form of at least two wind components, such as arrows indicating a headwind/tailwind or forward-rearward wind component and a crosswind or left-right wind component. Each of the forward-rearward and left-right wind components have associated therewith a wind strength or velocity indicator. In embodiments, the indicator may be a number positioned proximate to the arrow indicating miles per hour with respect to that respected wind component, or the indicator may be the length or size of the arrow. The wind components comprising the respective arrows and strength indicators represent the mathematical equivalent of the wind vector provided to the laser range finder processor. The wind vector may be provided by wireless communications via a wireless link such as WiFi or Bluetooth, a wind sensor attached to the laser rangefinder, or may be manually entered by the user. In embodiments the arrows may have an orthogonal shape that suggests the arrows lying in a horizontal plane extending essentially parallel to the ground of the image viewed through eyepiece. An arrow may appear that is one of forward and rearward. Another arrow may appear that is one of leftward/rightward and that is perpendicular to the forward/rearward arrows. The components reflect the actual wind direction as equivalent forward rearward and leftward and rightward components.

A feature and advantage of embodiments is that the flagstick or target acquisition indicator is easier to perceive. A feature and advantage of embodiments is that the flagstick or target acquisition indicator does not impede the view in the display or further clutter the display with additional labels or icons. A feature and advantage of embodiments is a target acquisition visual indicator that does not block the middle viewing region of the viewfinder.

A feature and advantage of embodiments is that the two wind component indicators separately address the issue of the distance differential caused by the wind, and the left or right directional change of the ball in flight. The distance differential may be addressed by the golfer changing clubs and/or swinging velocity. The left and right directional change may be addressed by the aim that the golfer takes, that is aiming left or right of the target. In embodiments, the forward rearward component indicator provides a forward or rearward direction indicator and a wind strength or velocity indicator as calculated by the rangefinder processor(s).

In embodiments, the forward rearward component can be combined in the processor with data representative of an actual laser ranged distance to provide a correction to the ranged distance and provide and display a "play-as" distance. The correction of the forward rearward component may be further combined with a tilt compensation correction, where the change in elevation of the ball location and the ball landing region is taken into consideration. A combined play-as distance accounting for both change in elevation and direction may then be presented on the display.

In embodiments, the crosswind component is processed by the processor(s) of the laser rangefinder and a leftward or rightward arrow is presented in the display, and a left or right wind strength or velocity indicator is presented. The processor may utilize the wind component to provide a change of aim direction to the golfer as displayed in the eyepiece.

An example laser rangefinder may include a housing supporting an objective optic, an eyepiece optic, and a view-thru display. The view-thru display may be located along an optical path between the objective optic and the eyepiece optic. In embodiments, the view-thru display comprises a first transparent sheet and a plurality of electrodes disposed on a first inner surface of the first transparent sheet. The view-thru display may be disposed rearward of the objective optic and the eyepiece optic may be disposed rearward of the view-thru display assembly so that a scene or subject can be viewed through the eyepiece optic and a plurality of display elements selectively displayed by the view-thru display assembly are superimposed on the scene or subject being viewed. Information regarding wind in proximity to the laser rangefinder may be presented on the view-thru display. The view-thru display may comprise, for example, an LCD display and/or an OLED display.

The laser rangefinder may include a laser source and related optics for emitting a laser beam along a laser beam axis. The laser rangefinder may also include circuitry operatively coupled to the view-thru display. In embodiments, the laser rangefinder includes a digital compass and a current device direction is determined by the processor using signals from the digital compass. The device direction is aligned with the laser beam axis in embodiments.

In embodiments, the circuitry comprises one or more processors and a non-transitory computer readable medium storing one or more instruction sets. In embodiments, the one or more instruction sets include instructions configured to be executed by the one or more processors to cause the laser rangefinder determine a device direction and determine a wind vector. The wind vector comprises a vector direction and a vector magnitude in embodiments. The processor(s) may determine the magnitude of an angle that extends between the device direction and the vector direction. The instructions executed by the processor(s) may cause the processor(s) to calculate a headwind component velocity and calculate a crosswind component velocity. The instructions executed by the processor(s) may cause the headwind/tailwind component velocity and a headwind/tailwind direction icon (either forward or rearward) to be presented on the display. The instructions executed by the processor(s) may also cause the crosswind component velocity and a crosswind direction icon to be presented on the display, the icon pointing either leftward or rightward.

A laser rangefinder in accordance with an example embodiment comprises a housing supporting an objective optic, an eyepiece optic, and a view-thru display. In embodiments, the view-thru display includes a plurality of selectively displayable icons disposed along an arcuate path in the following sequential order: a zeroth icon, a first icon, a second icon, a third icon, a fourth icon, a fifth icon, a six icon, and a seventh icon. In embodiments, the laser rangefinder also comprises a processor operatively coupled to a view-thru display. In embodiments, the circuitry comprises one or more processors and a non-transitory computer readable medium storing one or more instruction sets. In embodiments, the one or more instruction sets include instructions configured to be executed by the one or more processors to cause the laser rangefinder determine a device direction and determine a wind vector. The device direction may be aligned with the laser beam axis and the wind vector may comprise a vector direction and a vector magnitude. The instructions executed by the processor(s) may cause the processor(s) to determine the magnitude of an angle extending between the device direction and the vector direction. The processor may identify a selected icon of the view-thru display in embodiments. The processor may cause the selected icon to be presented on the display. The processor may also cause a wind speed value to be presented on the display.

A laser rangefinder in accordance with an example embodiment comprises a housing supporting an objective optic, an eyepiece optic, and a view-thru display. In embodiments, the view-thru display includes a plurality of selectively displayable icons disposed along an arcuate path in the following sequential order a zeroth icon, a first icon, a second icon, a third icon, a fourth icon, a fifth icon, a six icon, and a seventh icon. In embodiments, the laser rangefinder also comprises a processor operatively coupled to a view-thru display. In embodiments, the circuitry comprises one or more processors and a non-transitory computer readable medium storing one or more instruction sets. In embodiments, the one or more instruction sets include instructions configured to be executed by the one or more processors to cause the laser rangefinder determine a device direction and determine a wind vector. The device direction may be aligned with the laser beam axis and the wind vector may comprise a vector direction and a vector magnitude. The instructions executed by the processor(s) may cause the processor(s) to determine the magnitude of an angle extending between the device direction and the vector direction. The processor may identify a selected icon of the view-thru display in embodiments. The processor may cause the selected icon to be presented on the display. The processor may also cause the wind speed to be presented on the display.

An example method may include providing a laser rangefinder including a processor operatively coupled to a view-thru display and a laser source. In embodiments, the device emits a laser beam along a laser beam axis. The method may also include determining a device direction. In embodiments, the laser beam emitted by the laser rangefinder extends along the laser beam axis in the device direction. The method may also include determining a wind vector that includes a vector direction and a vector magnitude. The method may also include determining an angle, the angle extending between the device direction and the vector direction. In embodiments, the vector direction and the device direction each comprise a compass heading with a value between 0 and 360 degrees. When this is the case, the angle may be calculated by subtracting the device direction from the wind direction.

The method may also include calculating a headwind component velocity based on the angle and the vector magnitude. In embodiments, calculating the headwind component value comprises multiplying the vector magnitude by a cosine of the angle. The method may also include presenting the calculated headwind component velocity on the view-thru display of the laser rangefinder. A first headwind icon or a second headwind icon may be displayed near the headwind component velocity in some methods. In some example methods, the first headwind icon comprises a triangle shaped icon with one corner pointing in an upward direction and the second headwind icon comprises a triangle shaped icon with one corner pointing in a downward direction. The second headwind icon may be displayed, for example, to indicate the presence of a tailwind and the first headwind icon may be displayed, for example, to indicate the presence of a headwind.

The method may also include calculating a crosswind component velocity based on the angle and the vector magnitude. In embodiments, calculating the crosswind component value comprises multiplying the vector magnitude by a sin of the angle. The method may also include presenting the calculated crosswind component velocity on the view-thru display of the laser rangefinder. A first crosswind icon or a second crosswind icon may be displayed near the crosswind component velocity in some methods. In some example methods, the first crosswind icon comprises a triangle shaped icon with one corner pointing in a leftward direction and the second crosswind icon comprises a triangle shaped icon with one corner pointing in a rightward direction. The second crosswind icon may be displayed, for example, to indicate the presence of a crosswind traveling in the rightward direction and the first crosswind icon may be displayed, for example, to indicate the presence of a crosswind traveling in the leftward direction.

A feature and benefit of embodiments is a laser rangefinder that displays an icon (e.g., a triangle, arrow or chevron shaped icon) that provides an indication of the direction the wind relative to the current orientation of the laser rangefinder.

A feature and benefit of embodiments is a laser rangefinder that displays wind speed in units of mph or kmph.

A feature and benefit of embodiments is a laser rangefinder that displays the speed of a crosswind component of the wind in units of mph or kmph.

A feature and benefit of embodiments is a laser rangefinder that displays the speed of a headwind component or a tailwind component of the wind in units of mph or kmph.

A feature and benefit of embodiments is a laser rangefinder that displays a "play as" distance that is compensated for the headwind component or tailwind component of the wind.

A feature and benefit of embodiments is a laser rangefinder that displays a strategic distance that is proportional to the headwind component or tailwind component of the wind. A feature and benefit of embodiments is a laser rangefinder that displays a hook distance that is proportional to a crosswind component of the wind.

A feature and benefit of embodiments is a laser rangefinder that displays a slice distance that is proportional to a crosswind component of the wind.

A feature and benefit of embodiments is a laser rangefinder that displays a measured distance, a front of the green distance and a back of the green distance on a single view-thru display.

A feature and benefit of embodiments is a laser rangefinder that displays a calculated "play as" distance that is determined based on factors such as inclination, altitude, pressure, and/or temperature.

A feature and benefit of embodiments is a laser rangefinder that displays a measured layup distance and a layup point to middle of green distance, a "layup point to green" distance, so that numerical values associated with the measured layup distance and the layup point to green distance are visible through an eyepiece optic.

A feature and benefit of embodiments is a laser rangefinder that displays a measured layup distance and a layup point to green distance on a single view-thru display.

A feature and benefit of embodiments is a laser rangefinder that generates user-perceivable feedback if a target point is located inside a green boundary. The user-perceivable feedback may include, for example, haptic feedback, visual feedback and/or audible feedback.

A feature and benefit of embodiments is a laser rangefinder that displays measurements in a view through display when it is determined that a target point is located inside a green boundary. A feature and benefit of embodiments is a laser rangefinder that does not display measurements when it is determined that a target point is located outside of a green boundary.

The above summary is not intended to describe each illustrated embodiment or every implementation of the present disclosure.

DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5A through FIG. 5F are stylized depictions showing example view-thru displays in accordance with an example embodiment.

FIGS. 14A-14H show stylized depictions of example view-thru displays in accordance with the detailed description.

FIG. 15B shows a table containing polar coordinates related to transparent electrodes support by the transparent sheet shown in FIG. 15A.

FIG. 20A is a diagram illustrating a laser rangefinder and a stylized display that may be seen through an eyepiece of the laser rangefinder.

FIGS. 23A and 23B show a flowchart illustrating an example method in accordance with the detailed description.

FIGS. 25A and 25B show a flowchart illustrating an example method in accordance with the detailed description.

FIG. 26B is an enlarged diagram illustrating a portion of the laser rangefinder shown in FIG. 26A.

Figure 1:
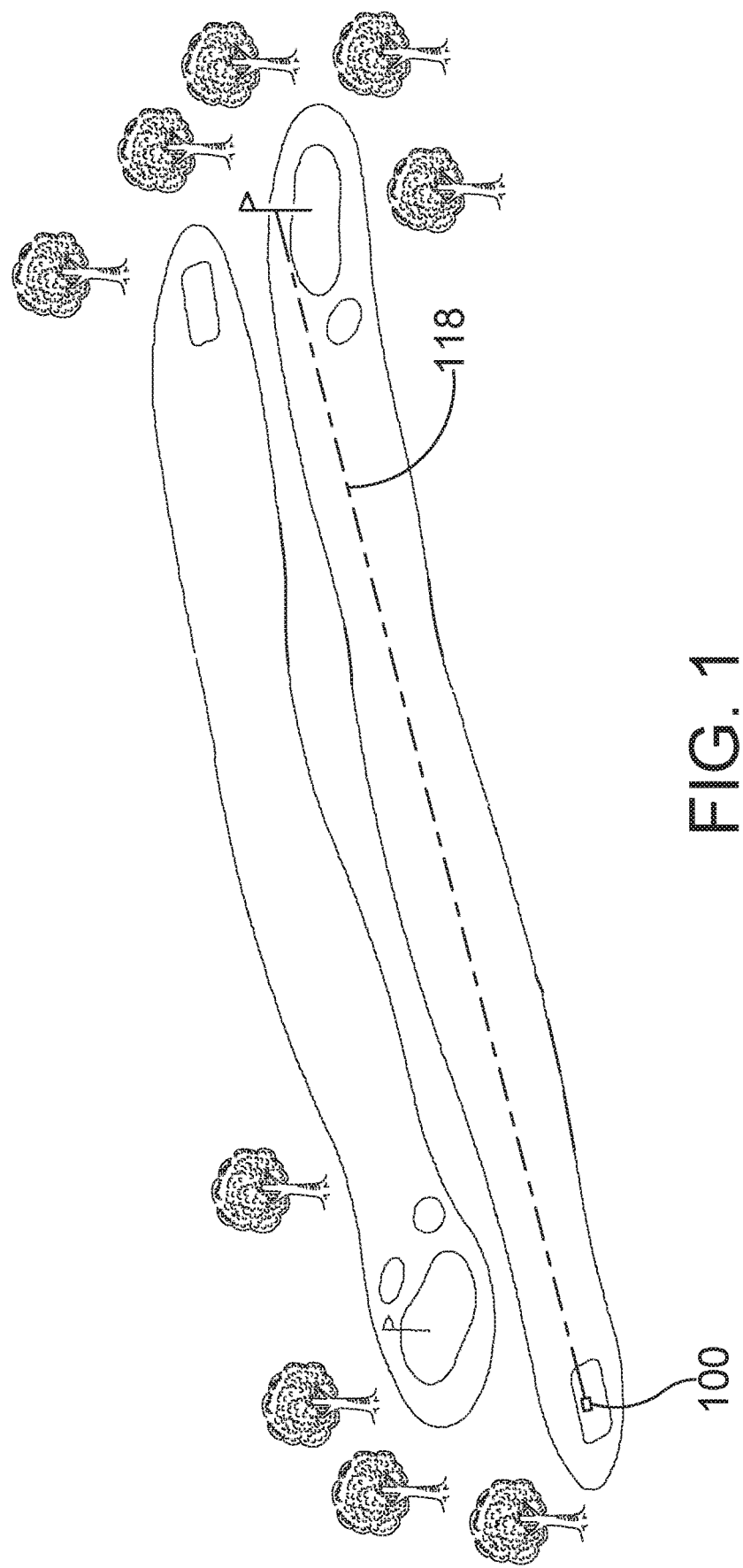
FIG. 1 is a perspective diagram illustrating a laser rangefinder in used on a golf course.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Figure 3:
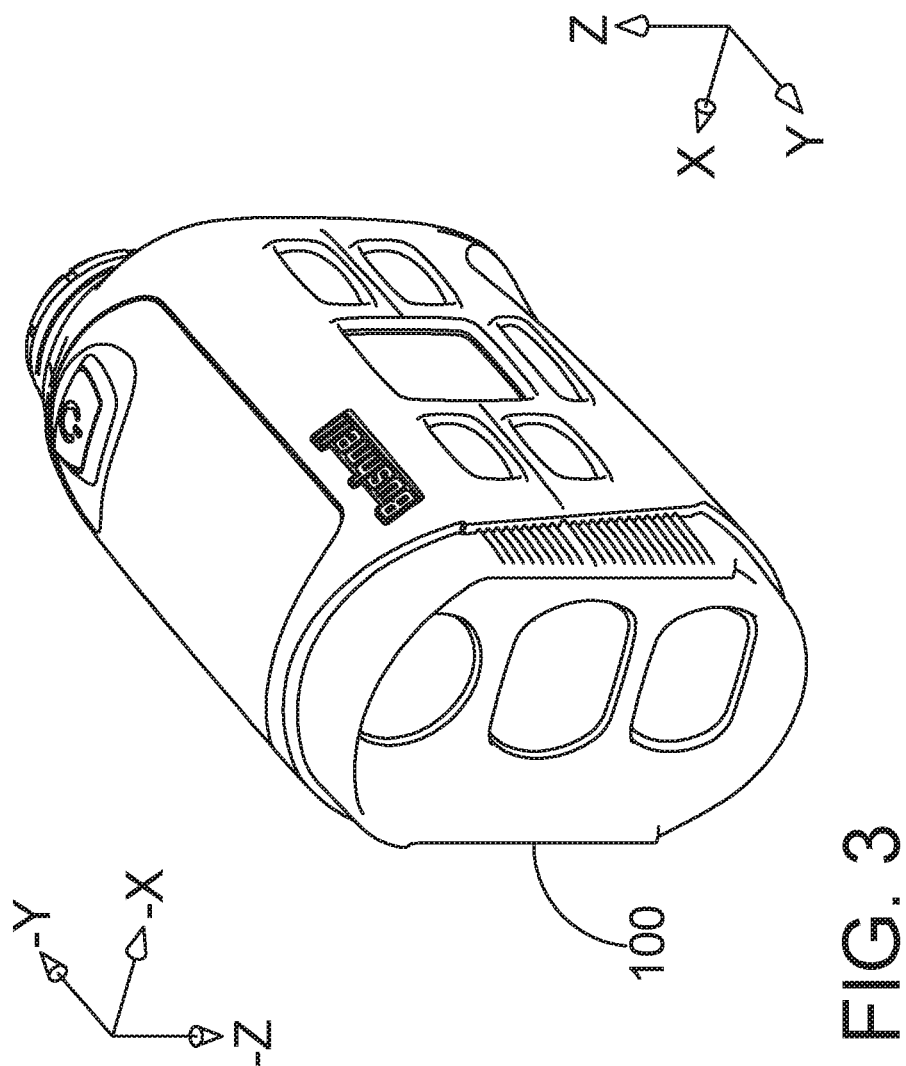
FIG. 3 is a perspective view of a laser rangefinder in accordance with an example embodiment.
Figure 4:
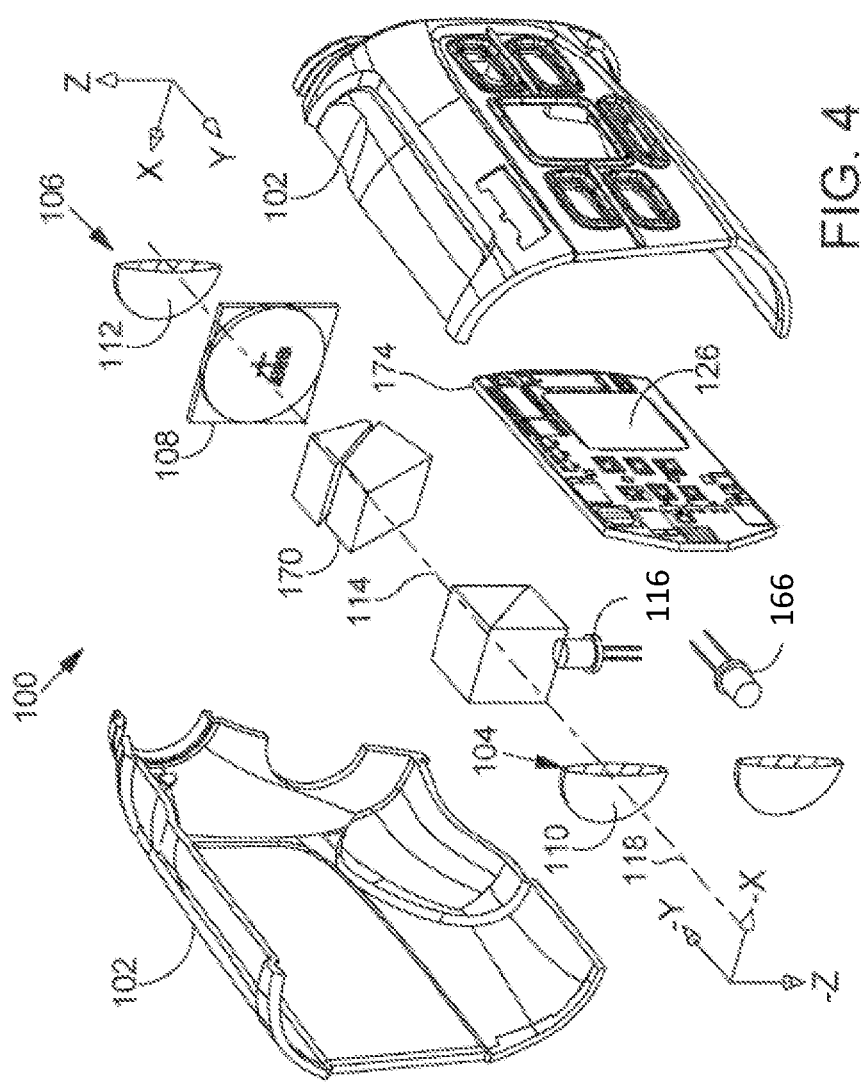
FIG. 4 is an exploded perspective view of a laser rangefinder in accordance with an example embodiment.
Figure 9:
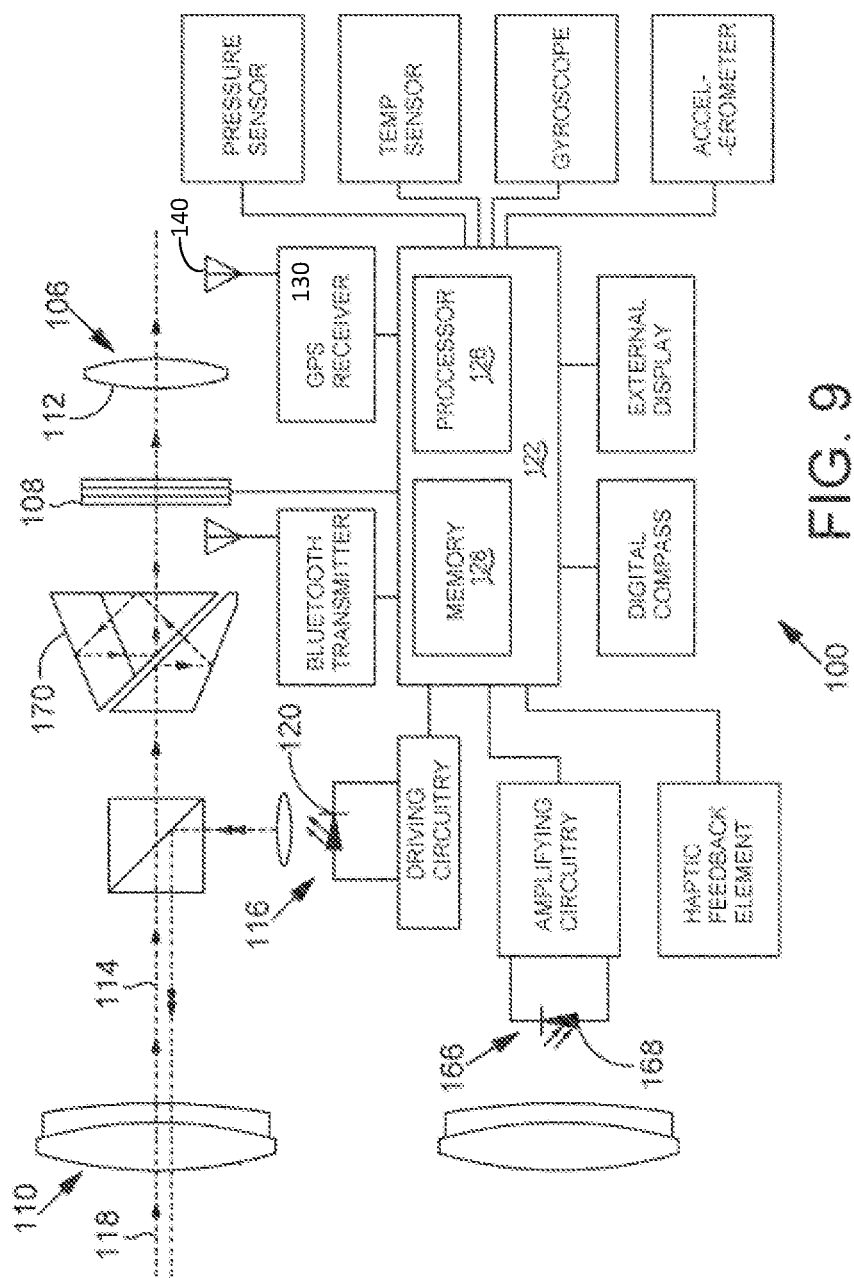
FIG. 9 is a diagram illustrating a laser rangefinder in accordance with the detailed description.

Referring, for example, to FIGS. 3, 4 and 9, a laser rangefinder 100 may comprise a housing 102 supporting an objective optic 104, an eyepiece optic 106, and a view-thru display assembly 108. The objective optic 104 may comprise one or more objective lenses 110 and the eyepiece optic 106 may comprise one or more eyepiece lenses 112. Between the objective optic 104 and the eyepiece optic 106, light path 114 passes through a prism block 170. The view-thru display assembly 108 may be located along the optical path 114 between the objective optic 104 and the eyepiece optic 106. The view-thru display assembly 108 may be disposed rearward of the objective optic 104 and the eyepiece optic 106 may be disposed rearward of the view-thru display assembly 108 so that a scene or subject can be viewed through the eyepiece optic 106 and a plurality of icons selectively presented on the view-thru display assembly are superimposed on the scene or subject being viewed. Information regarding wind in proximity to the laser rangefinder 100 may be presented on the view-thru display assembly 108. The view-thru display assembly 108 may comprise, for example, an LCD display assembly and/or an OLED display assembly.

The laser rangefinder 100 may include a laser source 116 and related optics for emitting a laser beam along a laser beam axis 118. The laser source 116 may comprise a laser light emitting diode 120. The laser rangefinder 100 may also include circuitry 122 operatively coupled to the view-thru display assembly 108. In embodiments, the laser rangefinder 100 includes a digital compass 124 and a current device direction is determined by one or more processors 126 using signals from the digital compass 124. The device direction is aligned with the laser beam axis 118 in embodiments. The laser rangefinder 100 also includes an optical detector 166 comprising a photodiode 168 that detects laser light reflected from the target.

In embodiments, the circuitry 122 comprises one or more processors 126 and a non-transitory computer readable medium 128 storing one or more instruction sets. In embodiments, the one or more instruction sets include instructions configured to be executed by the one or more processors to cause the laser rangefinder 100 determine a device direction and determine a wind vector. The wind vector comprises a vector direction and a vector magnitude in embodiments. The one or more processors 126 may determine the magnitude of an angle that extends between the device direction and the vector direction. The instructions executed by the one or more processors 126 may cause the one or more processors 126 to calculate a headwind component velocity and calculate a crosswind component velocity. The instructions executed by the one or more processors 126 may cause the headwind component velocity 133 and a headwind direction icon to be presented on the view-thru display assembly 108. The instructions executed by the one or more processors 126 may also cause the crosswind component velocity 142 and a crosswind direction icon 144 to be presented on the view-thru display assembly 108. In embodiments, the headwind component value is calculated by multiplying the vector magnitude by the cosine of the angle. In embodiments, the crosswind component value is calculated by multiplying the vector magnitude by a sin of the angle.

FIG. 5A through FIG. 5F show stylized depictions of example view-thru displays 108 in accordance with this detailed description. In the example embodiments of FIG. 5A through FIG. 5F, the display 108 includes a plurality of selectively displayable icons including a headwind icon 180 indicative of a forward or rearward wind component, and a crosswind icon indicative of leftward or rightward wind component. The display also includes a first numerical readout for displaying headwind component velocity 133 and a second numerical readout for displaying crosswind component velocity 142.

FIG. 5A shows a display with a headwind component velocity 133 and a crosswind component velocity 142 are each presented as numerical values on the display 108. A first headwind icon 134 and a first crosswind icon 138 are also presented on the display 108 in the embodiment of FIG. 5A. The first headwind icon 134 comprises a triangle with one corner pointing in an upward direction Z in the example embodiment of FIG. 5A. The first crosswind icon 138 comprises a triangle with one corner pointing in a leftward direction −X in the example embodiment of FIG. 5A.

FIG. 5B shows a display 108 with a headwind component velocity 133 and a crosswind component velocity 142 presented as numerical values on the display 108. A second headwind icon 136 and a second crosswind icon 141 are also presented on the display 108 in the embodiment of FIG. 5B. The second headwind icon 136 comprises a triangle with one corner pointing in a downward direction −Z in the example embodiment of FIG. 5B. The second crosswind icon 141 comprises a triangle with one corner pointing in a rightward direction X in the example embodiment of FIG. 5B.

In the embodiment of FIG. 5C, a headwind component velocity 133 and a crosswind component velocity 142 are each presented as numerical values on the display 108. A first headwind icon 134 and a second crosswind icon 141 are also presented on the display 108 in the embodiment of FIG. 5C. The first headwind icon 134 comprises a triangle with one corner pointing in an upward direction Z in the example embodiment of FIG. 5C. The second crosswind icon 141 comprises a triangle with one corner pointing in a rightward direction X in the example embodiment of FIG. 5C.

In the embodiment of FIG. 5D, a headwind component velocity 133 and a crosswind component velocity 142 are each presented as numerical values on the display 108. A second headwind icon 136 and a first crosswind icon 138 are also presented on the display 108 in the embodiment of FIG. 5D. The second headwind icon 136 comprises a triangle with one corner pointing in a downward direction −Z in the example embodiment of FIG. 5D. The first crosswind icon 138 comprises a triangle with one corner pointing in a leftward direction −X in the example embodiment of FIG. 5D.

Figure 5I:
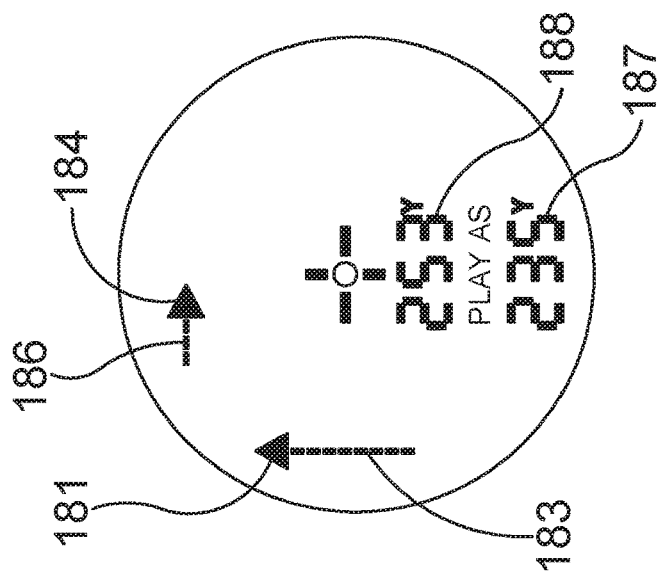
FIG. 5G through FIG. 5J are stylized depictions showing example view-thru displays in accordance with example embodiments.
Figure 5H:
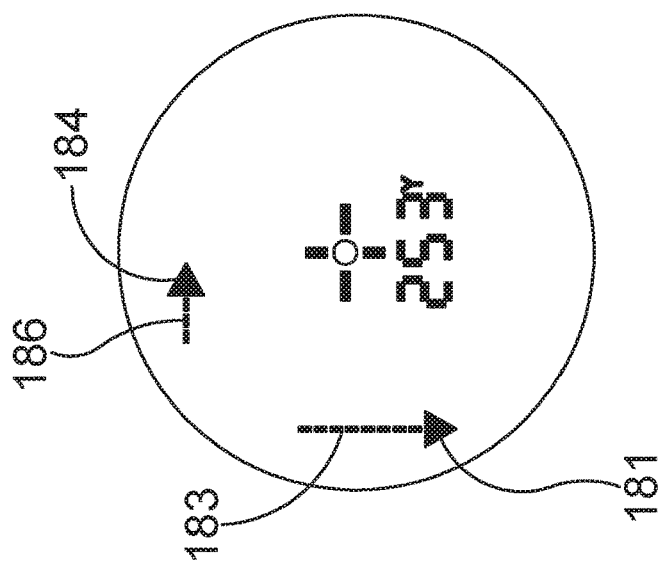
Figure 5G:
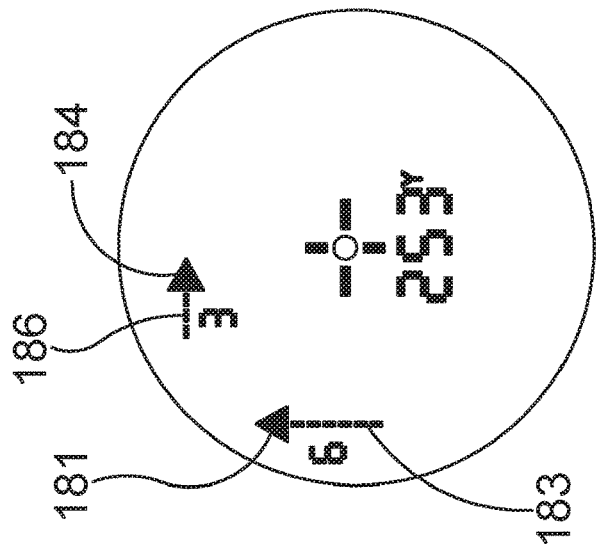
Figure 5J:
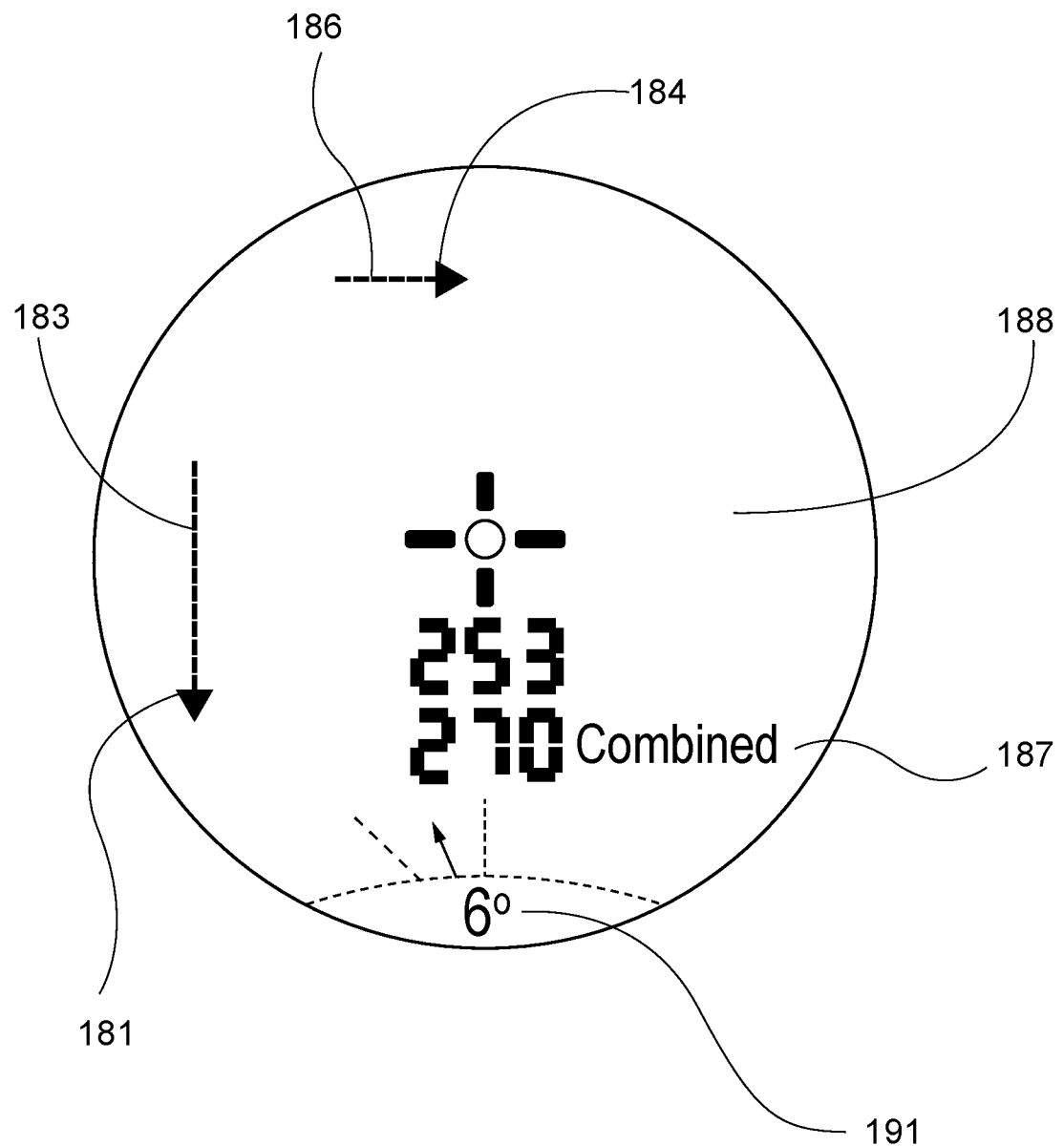

In the embodiments of FIG. 5G through FIG. 5J, a headwind icon 181 representative of a forward-rearward wind component has a tail 183 representative of the wind velocity. Said representation may indicate the wind velocity by the number of dashes and/or the length of the tail. A cross-wind icon 184 configured as an arrow also has a tail 186 that may be representative of the wind velocity by way of length and/or number of dashes, for example. Supplemental numerical values of the wind speed may also be provided as shown in FIG. 5G. FIG. 5H also shows an embodiment where the numerical indication is not present. Such presentation options may be selected by the user. FIG. 5I illustrates a display that includes a "Play As" distance 187 in addition to the actual laser ranged distance 188. FIG. 5J illustrates an aiming correction indicator 191 that compensates for the cross wind as indicated by the cross wind icons 184, 186. Those skilled in the art are knowledgeable in algorithms and programming processors for calculating the correction based on the target distance, the cross wind, and the head wind. Additionally, the "Play As" distance 187 may, in addition to having a correction based on wind, also include a correction based on elevation differences between the ball location and the anticipated ball landing location. In embodiments, the Play As distance may include corrections for other variables such as altitude and temperature.

Referring, for example, to FIGS. 5A-5J and 16A-16B, an example method in accordance with this detailed description may include providing a laser rangefinder including a processor operatively coupled to a view-thru display and a laser source. In embodiments, the device emits a laser beam along a laser beam axis. The method may also include determining a device direction. In embodiments, the laser beam emitted by the laser rangefinder extends along the laser beam axis in the device direction. The method may also include determining a wind vector that includes a vector direction and a vector magnitude. The method may also include determining an angle, the angle extending between the device direction and the vector direction. In embodiments, the vector direction and the device direction each comprise a compass heading with a value between 0 and 360 degrees. When this is the case, the angle may be calculated by subtracting the device direction from the wind direction.

The method may also include calculating a headwind component velocity based on the angle and the vector magnitude. In embodiments, calculating the headwind component value comprises multiplying the vector magnitude by a cosine of the angle. The method may also include presenting the calculated headwind component velocity on the view-thru display of the laser rangefinder. A first headwind icon or a second headwind icon may be displayed near the headwind component velocity in some methods. In some example methods, the first headwind icon comprises a triangle shaped icon with one corner pointing in an upward direction and the second headwind icon comprises a triangle shaped icon with one corner pointing in a downward direction. The second headwind icon may be displayed, for example, to indicate the presence of a tailwind and the first headwind icon may be displayed, for example, to indicate the presence of a headwind.

The method may also include calculating a crosswind component velocity based on the angle and the vector magnitude. In embodiments, calculating the crosswind component value comprises multiplying the vector magnitude by a sin of the angle. The method may also include presenting the calculated crosswind component velocity on the view-thru display of the laser rangefinder. A first crosswind icon or a second crosswind icon may be displayed near the crosswind component velocity in some methods. In some example methods, the first crosswind icon comprises a triangle shaped icon with one corner pointing in a leftward direction and the second crosswind icon comprises a triangle shaped icon with one corner pointing in a rightward direction. The second crosswind icon may be displayed, for example, to indicate the presence of a crosswind traveling in the rightward direction and the first crosswind icon may be displayed, for example, to indicate the presence of a crosswind traveling in the leftward direction.

FIG. 6A through FIG. 6F show stylized depictions of example view-thru displays 108 in accordance with this detailed description. In the example embodiments of FIG. 6A through FIG. 6F, the display 108 includes a plurality of selectively displayable icons including a first headwind icon 134, a first crosswind icon 138, a second headwind icon 136, and a second crosswind icon 141. The display also includes a first numerical readout for displaying headwind component velocity 133 and a second numerical readout for displaying crosswind component velocity 142.

Figure 6C:
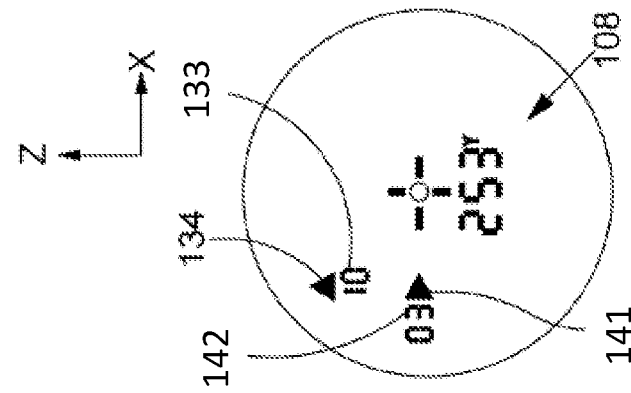
FIG. 6A through FIG. 6F are stylized depictions showing example view-thru displays in accordance with another example embodiment.
Figure 6B:
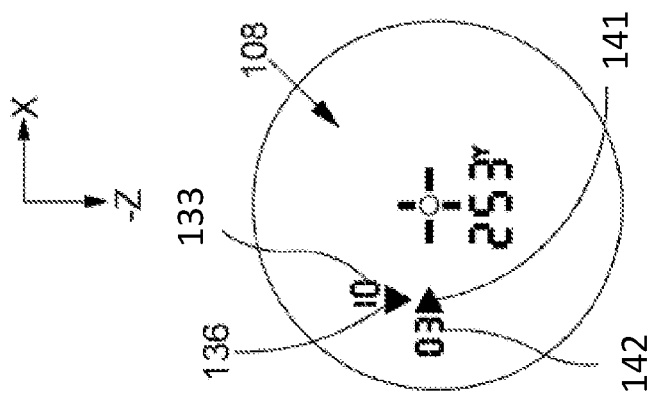
Figure 6A:
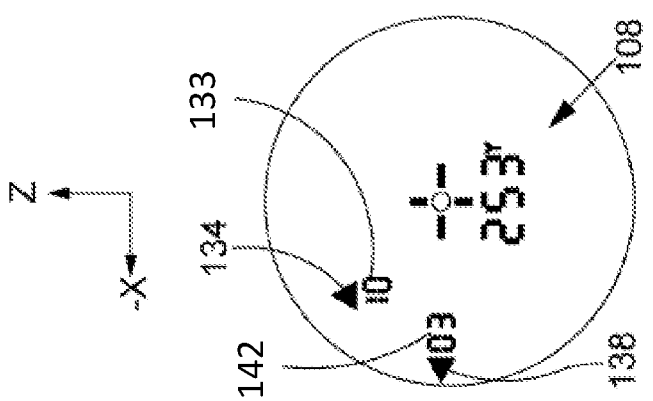
Figure 6F:
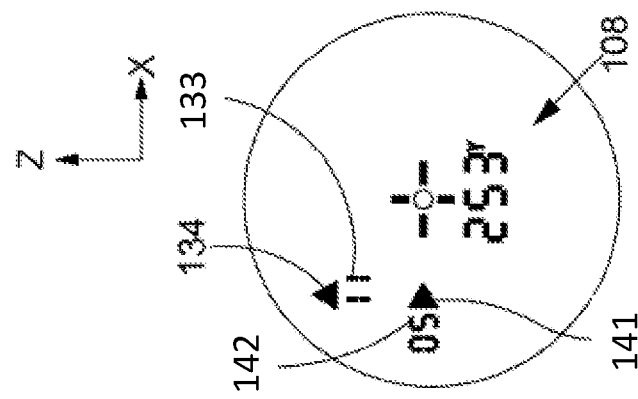
Figure 6E:
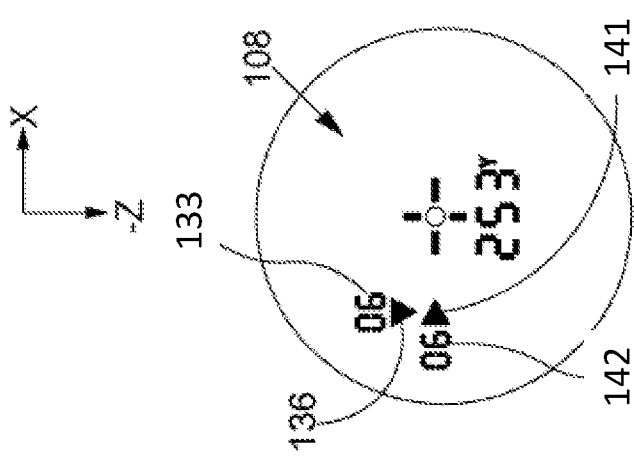

FIG. 6A shows a display with a headwind component velocity 133 and a crosswind component velocity 142 are each presented as numerical values on the display 108. A first headwind icon 134 and a first crosswind icon 138 are also presented on the display 108 in the embodiment of FIG. 6A. The first headwind icon 134 comprises a triangle with one corner pointing in an upward direction Z in the example embodiment of FIG. 6A. The first crosswind icon 138 comprises a triangle with one corner pointing in a leftward direction −X in the example embodiment of FIG. 6A.

FIG. 6B shows a display 108 with a headwind component velocity 133 and a crosswind component velocity 142 presented as numerical values on the display 108. A second headwind icon 136 and a second crosswind icon 141 are also presented on the display 108 in the embodiment of FIG. 6B. The second headwind icon 136 comprises a triangle with one corner pointing in a downward direction −Z in the example embodiment of FIG. 6B. The second crosswind icon 141 comprises a triangle with one corner pointing in a rightward direction X in the example embodiment of FIG. 6B.

In the embodiment of FIG. 6C, a headwind component velocity 133 and a crosswind component velocity 142 are each presented as numerical values on the display 108. A first headwind icon 134 and a second crosswind icon 141 are also presented on the display 108 in the embodiment of FIG. 6C. The first headwind icon 134 comprises a triangle with one corner pointing in an upward direction Z in the example embodiment of FIG. 6C. The second crosswind icon 141 comprises a triangle with one corner pointing in a rightward direction X in the example embodiment of FIG. 6C.

Figure 6D:
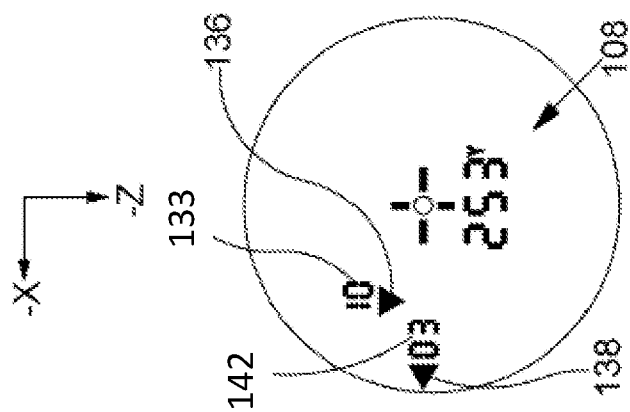

In the embodiment of FIG. 6D, a headwind component velocity 133 and a crosswind component velocity 142 are each presented as numerical values on the display 108. A second headwind icon 136 and a first crosswind icon 138 are also presented on the display 108 in the embodiment of FIG. 6D. The second headwind icon 136 comprises a triangle with one corner pointing in a downward direction −Z in the example embodiment of FIG. 6D. The first crosswind icon 138 comprises a triangle with one corner pointing in a leftward direction −X in the example embodiment of FIG. 6D.

Referring, for example, FIGS. 9-13, a laser rangefinder 100 in accordance with an example embodiment comprises a housing 102 supporting an objective optic 104, an eyepiece optic 106, and a view-thru display assembly 108. In embodiments, the view-thru display assembly 108 includes a plurality of selectively presented icons disposed along an arcuate path 148 in the following sequential order: a zeroth icon 20, a first icon 22, a second icon 24, a third icon 26, a fourth icon 28, a fifth icon 30, a sixth icon 32, and a seventh icon 34. In embodiments, the laser rangefinder 100 also comprises circuitry 122 operatively coupled to a view-thru display assembly 108. In embodiments, the circuitry 122 comprises one or more processors 126 and a non-transitory computer readable medium 128 storing one or more instruction sets. In embodiments, the one or more instruction sets include instructions configured to be executed by the one or more processors 126 to cause the laser rangefinder 100 determine a device direction and determine a wind vector. The device direction may be aligned with the laser beam axis 118 and the wind vector may comprise a vector direction and a vector magnitude. The instructions executed by the one or more processors 126 may cause the one or more processors 126 to determine the magnitude of an angle extending between the device direction and the vector direction. The processors 126 may identify a selected icon of the view-thru display assembly 108 in embodiments. The processors 126 may cause the selected icon to be presented on the view-thru display assembly 108. The processors 126 may also cause a wind speed value 146 to be presented on the display assembly.

FIGS. 14A-14H show stylized depictions of example view-thru displays 108 in accordance with this detailed description. In the example embodiments of FIGS. 14A-14H, the display 108 includes a plurality of selectively displayable icons disposed along an arcuate path in the following sequential order: a zeroth icon 20, a first icon 22, a second icon 24, a third icon 26, a fourth icon 28, a fifth icon 30, a six icon 32, and a seventh icon 34.

In the embodiment of FIG. 14A, a wind velocity 146 is presented as a numerical value on the display 108. A zeroth icon 20 is also presented on the display 108 in the embodiment of FIG. 14A. In some useful embodiments, the zeroth icon is selected for presentation if the angle between the device direction and the wind vector direction is between 0 and 22.5 or between 337.5 and 360.0. In the example embodiment of FIG. 14A, the zeroth icon 20 is positioned proximate an upper edge of the view-thru display. Also the example embodiment of FIG. 14A, the zeroth icon 20 comprises a triangle with one corner pointing in an upward direction Z.

FIG. 14B shows a display 108 with a first icon 22 presented on the display 108. In some useful embodiments, the first icon is selected for presentation if the angle between the device direction and the wind vector direction is between 22.5 and 67.5. A wind velocity 146 is presented as a numerical value on the display 108 in the embodiment of FIG. 14B.

In FIG. 14C, a display 108 is shown with a second icon 24 presented on the display 108. In some useful embodiments, the second icon 24 is selected for presentation if the angle between the device direction and the wind vector direction is between 67.5 and 112.5. A wind velocity 146 is presented as a numerical value on the display 108 in the embodiment of FIG. 14C.

Figure 14F:
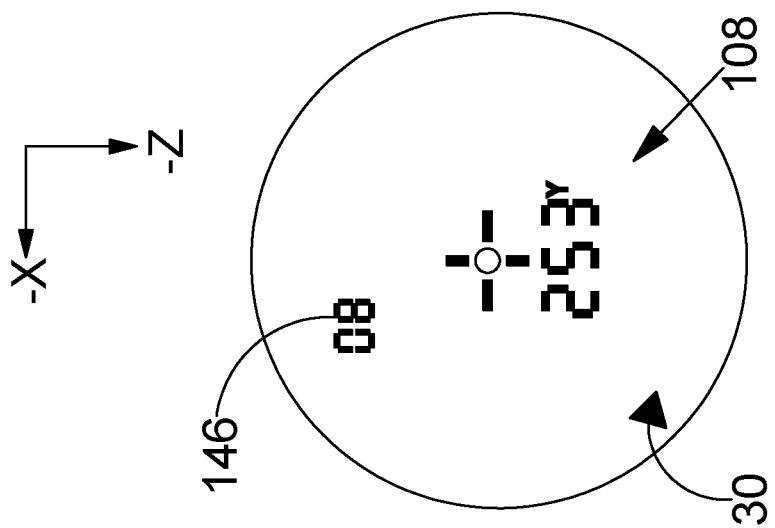
Figure 14E:
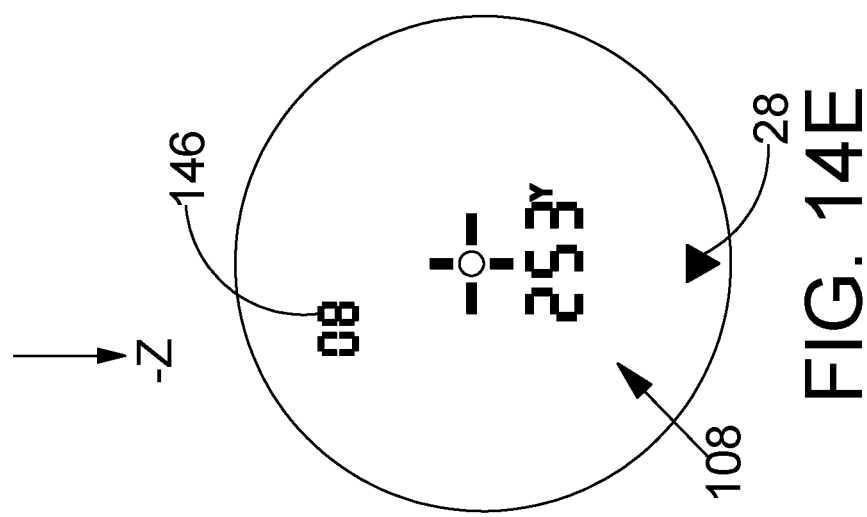
Figure 14D:
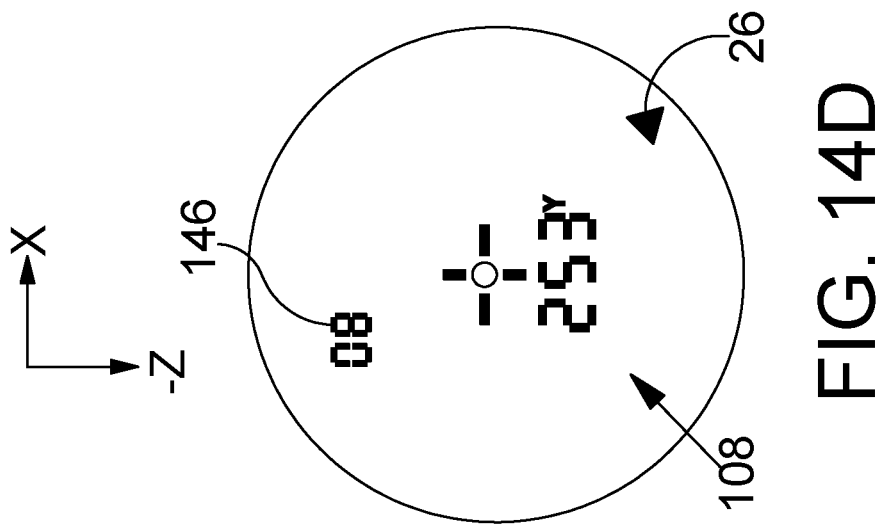

In FIG. 14D, a display 108 is shown with a third icon 26 presented on the display 108. In some useful embodiments, the third icon 26 is selected for presentation if the angle between the device direction and the wind vector direction is between 112.5 and 157.5. A wind velocity 146 is presented as a numerical value on the display 108 in the embodiment of FIG. 14D.

In FIG. 14E, a display 108 is shown with a fourth icon 28 presented on the display 108. In some useful embodiments, the fourth icon 28 is selected for presentation if the angle between the device direction and the wind vector direction is between 157.5 and 202.5. A wind velocity 146 is presented as a numerical value on the display 108 in the embodiment of FIG. 14E.

In FIG. 14F, a display 108 is shown with a fifth icon 30 presented on the display 108. In some useful embodiments, the fifth icon 30 is selected for presentation if the angle between the device direction and the wind vector direction is between 202.5 and 247.5. A wind velocity 146 is presented as a numerical value on the display 108 in the embodiment of FIG. 14F.

In FIG. 14G, a display 108 is shown with a sixth icon 32 presented on the display 108. In some useful embodiments, the sixth icon 32 is selected for presentation if the angle between the device direction and the wind vector direction is between 247.5 and 292.5. A wind velocity 146 is presented as a numerical value on the display 108 in the embodiment of FIG. 14G.

In FIG. 14H, a display 108 is shown with a seventh icon 34 presented on the display 108. In some useful embodiments, the seventh icon 34 is selected for presentation if the angle between the device direction and the wind vector direction is between 292.5 and 337.5. A wind velocity 146 is presented as a numerical value on the display 108 in the embodiment of FIG. 14H.

Referring, for example, to FIGS. 14A-14H and 17, an example method in accordance with this detailed description may include providing a laser rangefinder including a processor operatively coupled to a view-thru display and a laser source. In embodiments, the device emits a laser beam along a laser beam axis. The method may also include determining a device direction. In embodiments, the laser beam emitted by the laser rangefinder extends along the laser beam axis in the device direction. The method may also include determining a wind vector that includes a vector direction and a vector magnitude. The method may also include determining an angle, the angle extending between the device direction and the vector direction. In embodiments, the vector direction and the device direction each comprise a compass heading with a value between 0 and 360 degrees. When this is the case, the angle may be calculated by subtracting the device direction from the wind direction. The method may also include identifying a selected icon based and displaying the selected icon on the view-thru display. The wind magnitude may also be presented on the view-thru display in some example methods.

Figure 7:
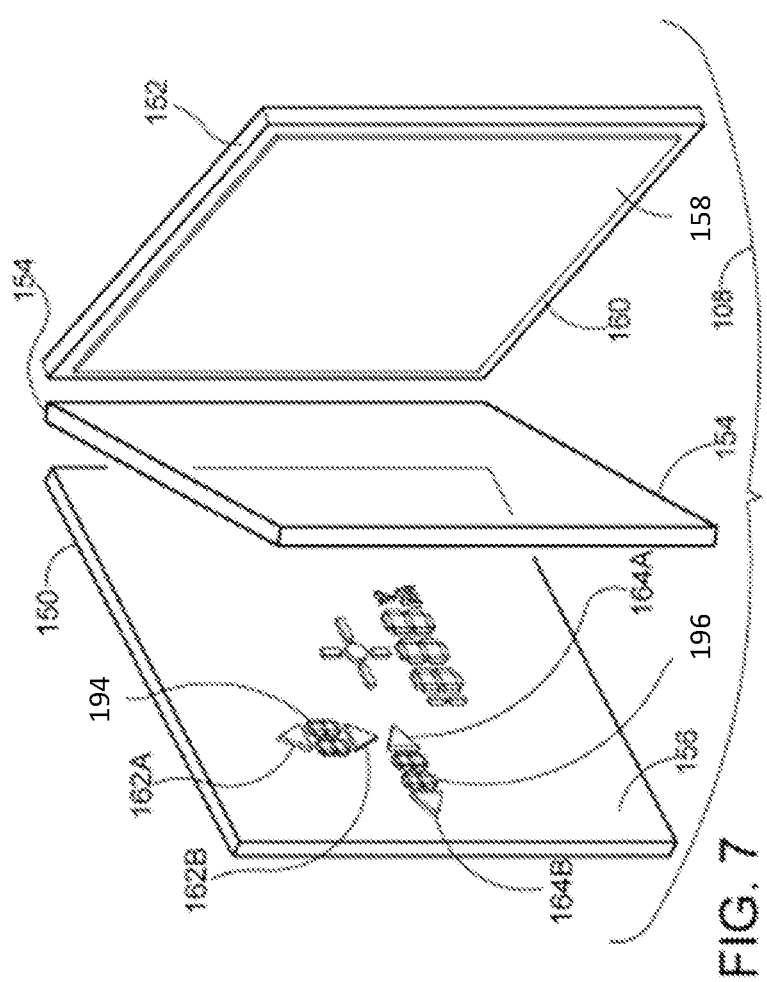
FIG. 7 is an exploded perspective view of an example display assembly in accordance with the detailed description.
Figure 8:
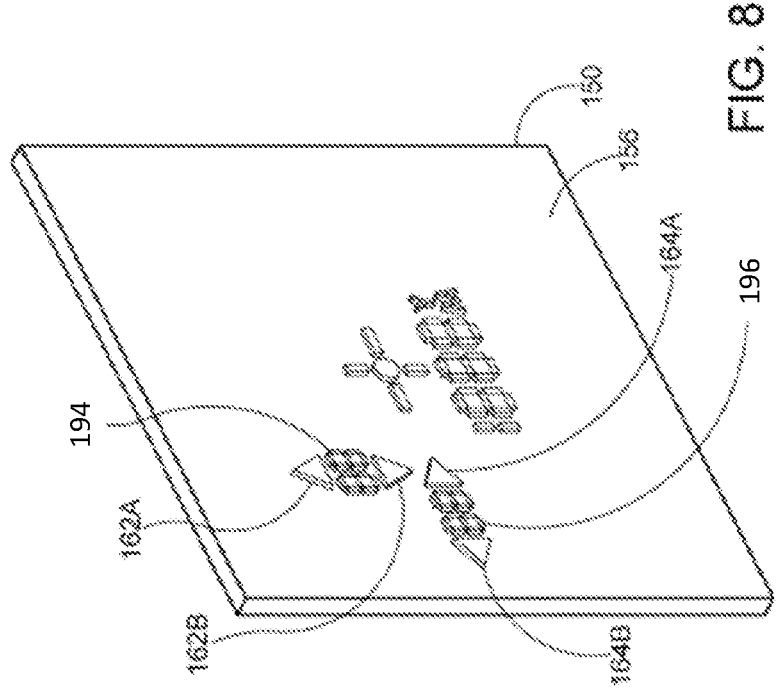
FIG. 8 is a perspective view showing a transparent sheet supporting a plurality of transparent electrodes in accordance with the detailed description.
Figure 11:
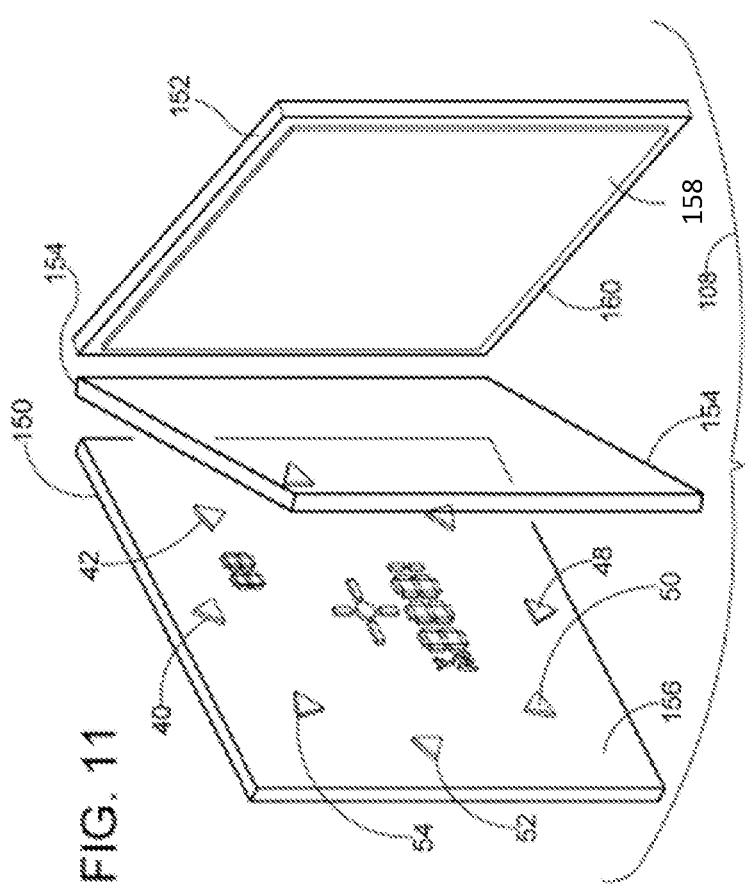
FIG. 11 is an exploded perspective view of an example display assembly in accordance with the detailed description.
Figure 12:
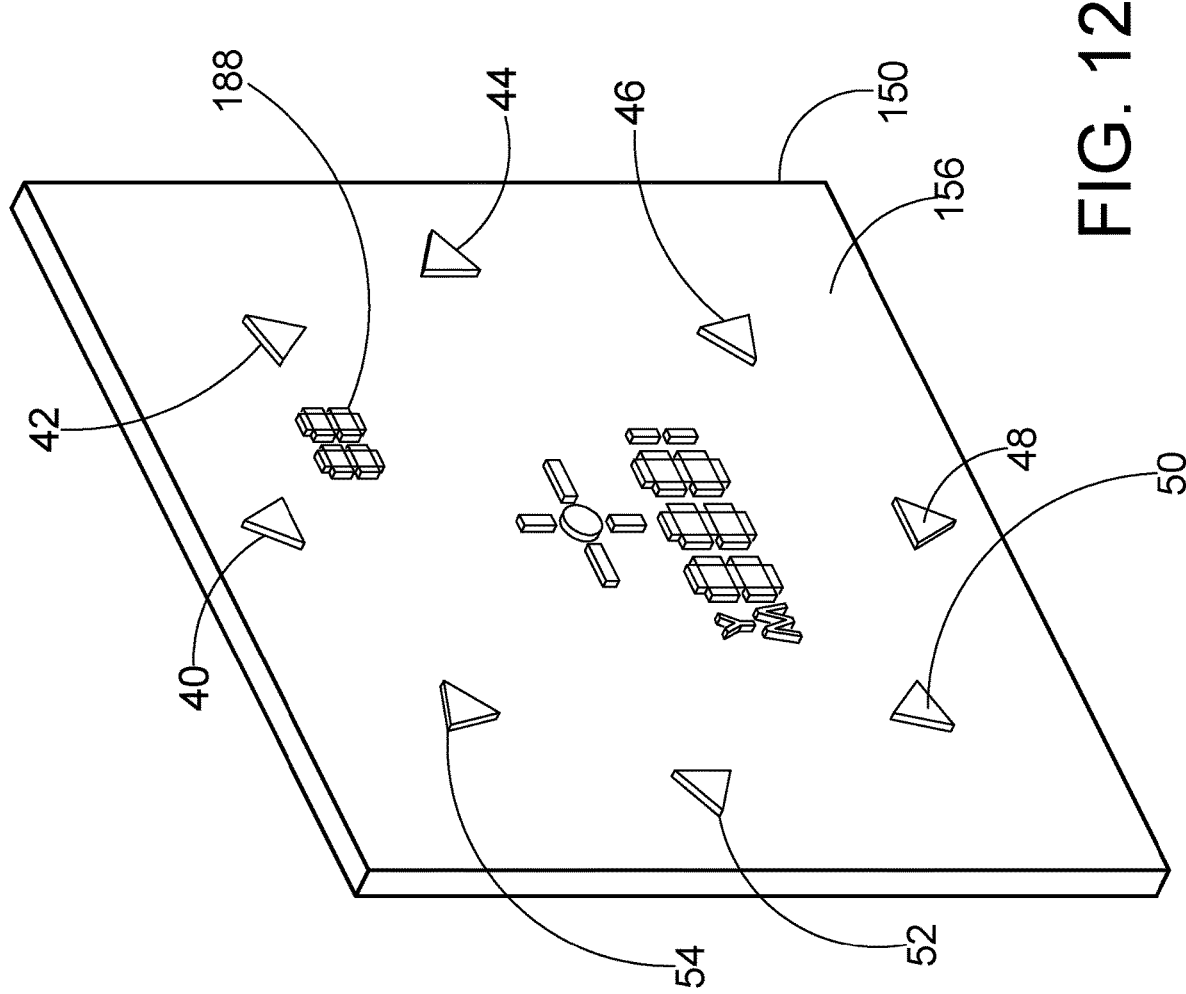
FIG. 12 is a perspective view showing a transparent sheet supporting a plurality of transparent electrodes in accordance with the detailed description.
Figures 13A, 13B:
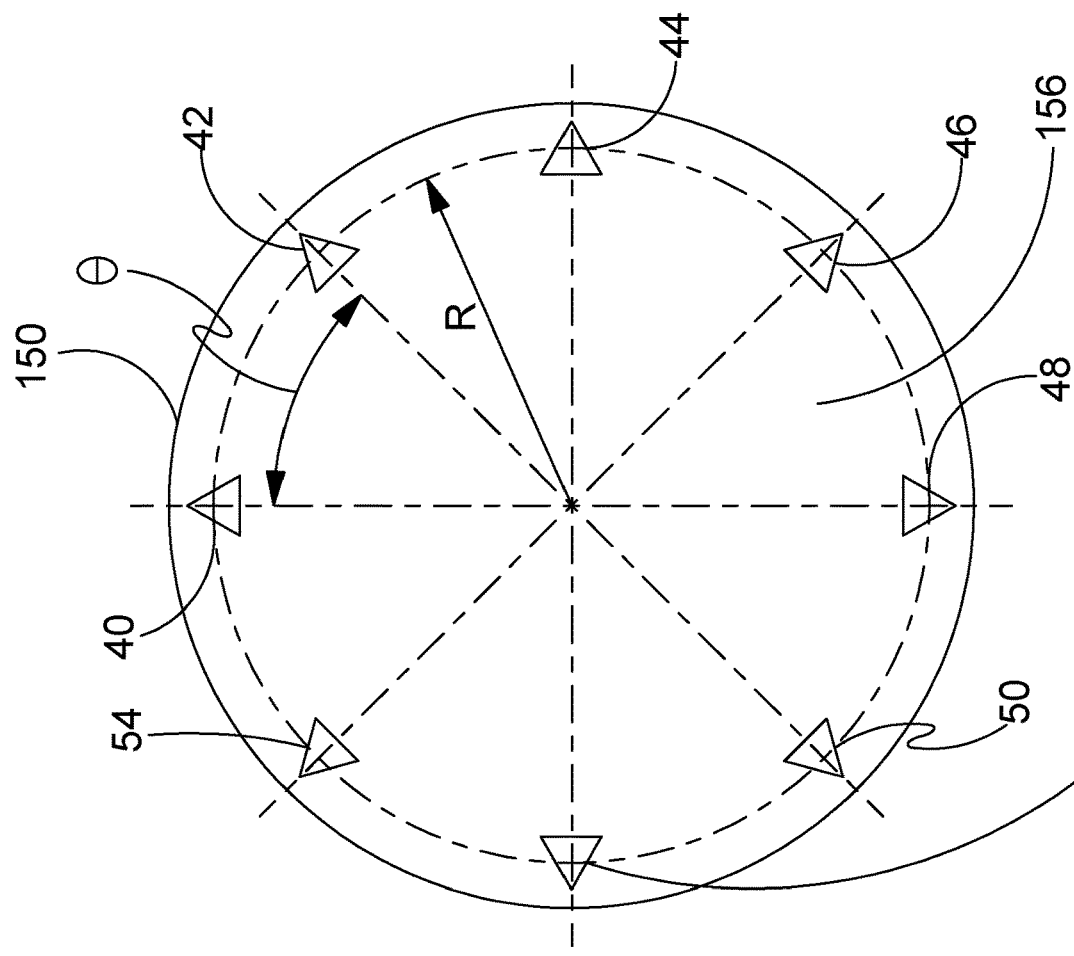
FIG. 13A is a plan view showing a transparent sheet supporting a plurality of transparent electrodes in accordance with the detailed description.
FIG. 13B shows a table containing polar coordinates related to transparent electrodes supported by the transparent sheet shown in FIG. 13A.
Figure 15A:
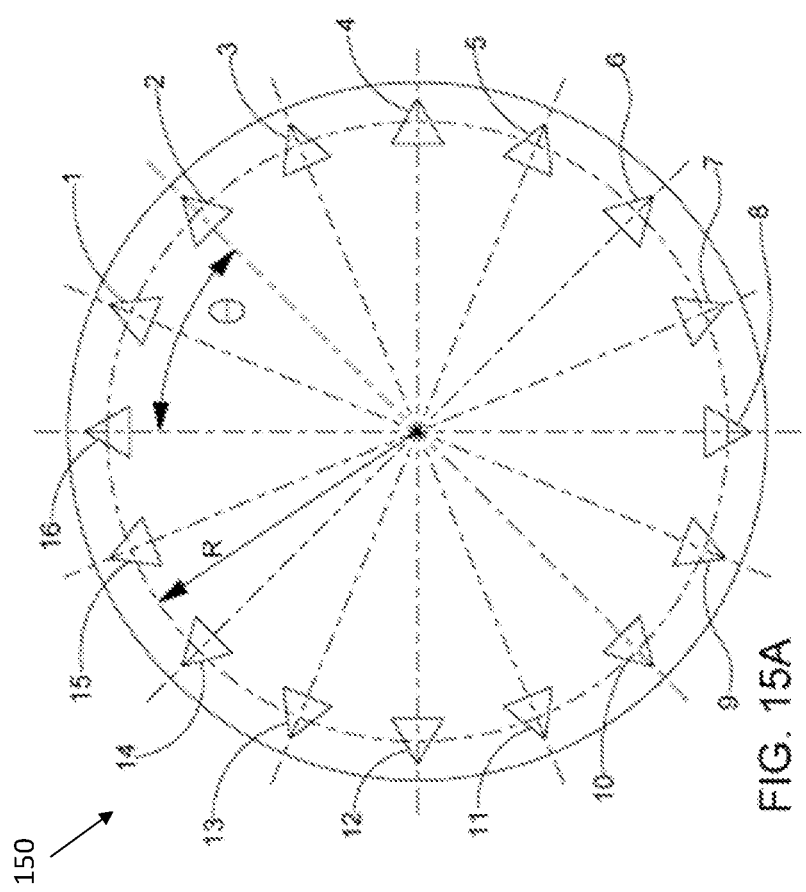
FIG. 15A is a plan view showing a transparent sheet supporting a plurality of transparent electrodes in accordance with the detailed description.
Figure 16A:
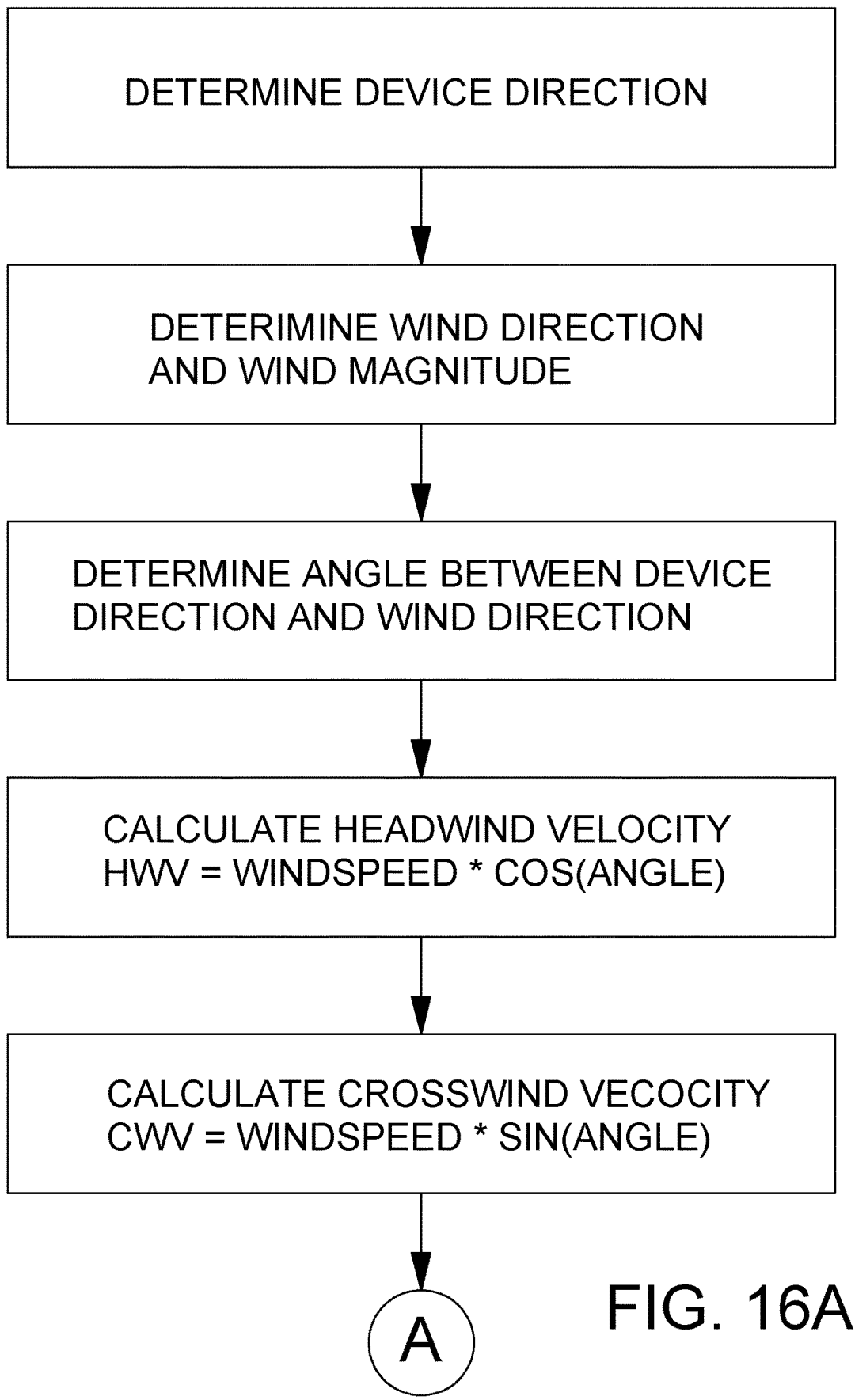
FIGS. 16A and 16B show a flowchart illustrating an example method in accordance with the detailed description.
Figure 16B:
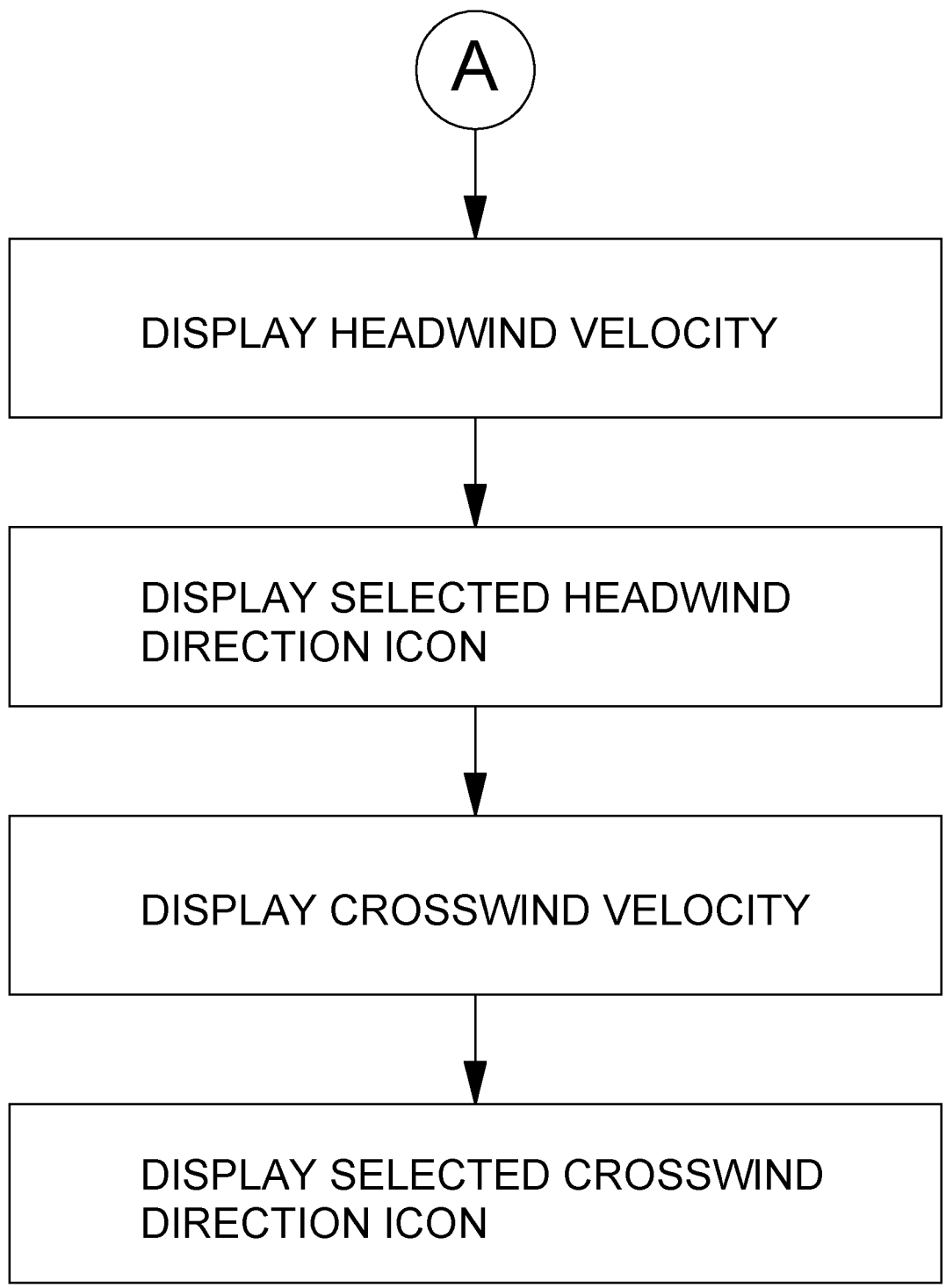
Figure 17:
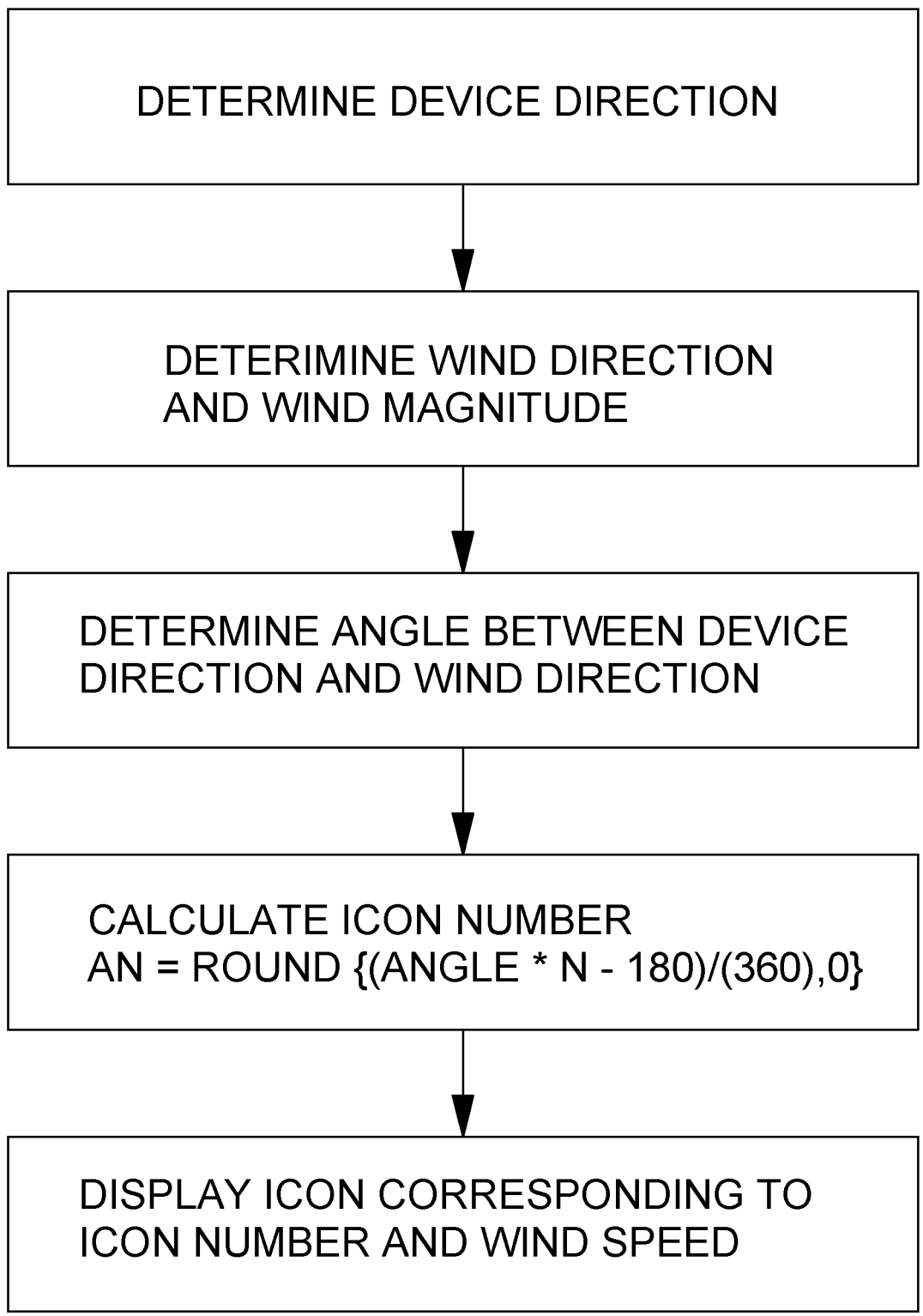
FIG. 17 is a flowchart illustrating an example method in accordance with the detailed description.

Referring, for example, to FIGS. 7-8 and 11-12, a view-thru display assembly 108 may comprise, for example, an LCD display assembly and/or an OLED display assembly. In embodiments, the view-thru display assembly 108 comprises a first transparent sheet 150 and a plurality of electrodes disposed on a first inner surface 156 of the first transparent sheet 150. In embodiments, the view-thru display assembly 108 comprises a first transparent sheet 150, a second transparent sheet 152, and a liquid crystal material 154 disposed between the first transparent sheet 150 and the second transparent sheet 152. The view-thru display assembly 108 may comprise a plurality of first sheet electrodes that are each supported by a first inner surface 156 of the first transparent sheet 150. The view-thru display assembly 108 may also comprise one or more second sheet electrodes 158 that are each supported by a second inner surface 160 of the second transparent sheet 152. In FIGS. 7 and 8, electrodes 162A, 162B, 164A and 164B enable display of first and second headwind icons 134 and 136 and first and second crosswind icons 138 and 141, respectively. Electrodes 194 and 196 enable display of the headwind component velocity 133 and crosswind component velocity 142, respectively. In FIGS. 11 and 12, electrodes 40, 42, 44, 46, 48, 50, 52 and 54 enable display of zeroth icon 20, a first icon 22, a second icon 24, a third icon 26, a fourth icon 28, a fifth icon 30, a sixth icon 32, and a seventh icon 34, respectively. See also FIGS. 13A and 13B that show a plan view of transparent sheet 150 supporting the transparent electrodes 40, 42, 44, 46, 48, 50, 52 and 54, and the polar coordinates related to them. FIGS. 15A and 15B show a plan view of an alternative transparent sheet 150 supporting transparent electrodes 1 through 16, and the polar coordinates related to them.

Figure 10:
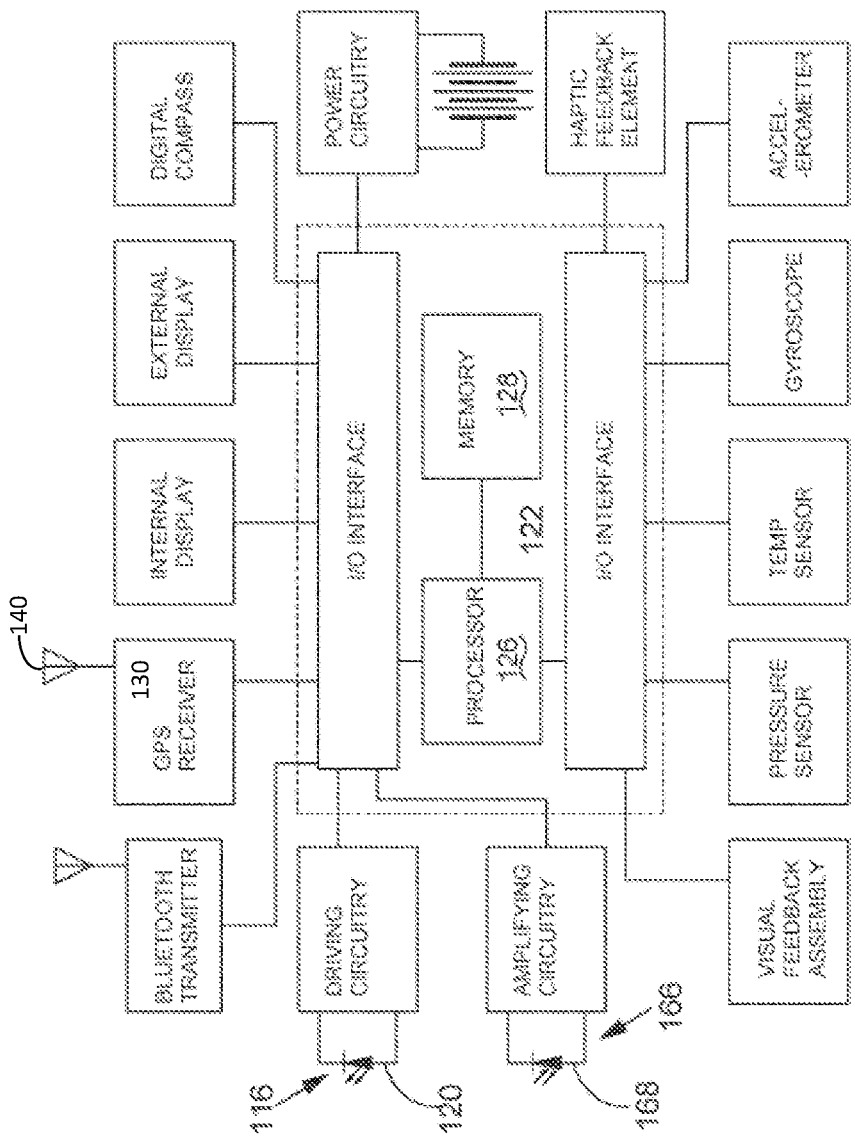
FIG. 10 is a diagram illustrating a laser rangefinder in accordance with the detailed description.

FIGS. 4, 9 and 10 schematically illustrate a laser rangefinder 100 in accordance with this detailed description. With reference to FIG. 4, it will be appreciated that the laser rangefinder 100 includes a printed wiring board 174 supporting the circuitry 122. In the embodiment of FIG. 4, the printed wiring board 174 comprises a substrate and the substrate supports a plurality of conductive paths 176 of the circuitry 122. In the example embodiment shown in FIG. 4, the circuitry 122 comprises the printed wiring board 174 and a plurality of electronic components fixed to the printed wiring board 174. The circuitry 122 may comprise various elements without deviating from the spirit and scope of the present invention. For example, the circuitry may comprise combinational logic, a plurality of state machines and a clock that provides a clock signal to the combinational logic and the plurality of state machines. Each state machine may comprise state logic circuitry and a state memory. The state memory may comprise a plurality of memory elements such as flip-flops. The state logic circuitry of the state machine determines the conditions for changing the logical values of bits stored in the state memory. More particularly, the state logic circuitry of the state machine logically combines the binary values of a plurality of inputs with the binary values in the state memory representing the current state to generate a binary number representing the next state. The combinational logic circuitry may comprise various elements without deviating from the spirit and scope of the present description. For example, the combinational logic circuitry may comprise a plurality of discrete electronic components. By way of a second example, combinational logic circuitry may comprise a plurality of electronic components in the form of an application specific integrated circuit (ASIC). Examples of electronic components that may be suitable in some applications include logic gates. Examples of logic gates include, AND gates, NAND gates, OR gates, XOR gates, NOR gates, NOT gates, and the like. These logic gates may comprise a plurality of transistors (e.g., transistor-transistor logic (TTL)).

Still referring to FIGS. 4, 9 and 10, the circuitry 122 may comprise various elements without deviating from the spirit and scope of the present invention. In embodiments, for example, the circuitry 122 may comprise a processor, a memory, an input/output interface, a display, and a bus that communicatively couples the processor to the memory, the display and the input/output interface.

In embodiments, the processor may comprise a collection of one or more logical cores or units for receiving and executing instructions or programs. For example, in one or more embodiments, the processor may be configured to receive and execute various routines, programs, objects, components, logic, data structures, and so on to perform particular tasks.

In embodiments, the memory is a collection of various computer-readable media in the system architecture. In various embodiments, memory can include, but is not limited to volatile media, non-volatile media, removable media, and non-removable media. For example, in one or more embodiments, the memory can include random access memory (RAM), cache memory, read only memory (ROM), flash memory, solid state memory, or other suitable type of memory. In one or more embodiments, the memory includes media that is accessible to the electronic circuitry 122. For example, in embodiments, the memory includes computer readable media located locally in the circuitry 122 and/or media located remotely to the circuitry 122 and accessible via a network. In embodiments, the memory includes a program product having a group of one or more logical instructions that are executable by the processor to carry out the functions of the various embodiments of the disclosure.

In embodiments, the bus comprises one or more of any of suitable type of bus structures for communicatively connecting the electronic elements. In various embodiments the bus may include a memory bus or memory controller, a peripheral bus, and a processor or local bus using any of a variety of bus architectures.

In embodiments, the circuitry 122 includes an I/O interface coupled to a processor. The I/O interface may facilitate communication between the various components of the circuitry 122. For example, in one or more embodiments, the I/O interface may be communicatively coupled with the projector, the processor and the memory for emitting an output image via the projector. For example, in certain embodiments, the processor generates an output that corresponds to a particular pattern. The processor can transmit this output to the I/O interface which can then translate the processor output into instructions which are compatible with the projector and which result in the projector emitting light corresponding to the pattern.

In certain embodiments the I/O interface facilitates communication with input and output devices for interacting with a user. For example, the I/O interface may communicate with one or more devices such, as a user-input device and/or an external display, which enable a user to interact directly with the circuitry 122. The user-input device may comprise a keypad, one or more push-buttons, a touch screen, or other devices that allows a user to input information. The external display may comprise any of a variety of visual displays, such as a viewable screen, a set of viewable symbols or numbers, and so on.

Figure 18:
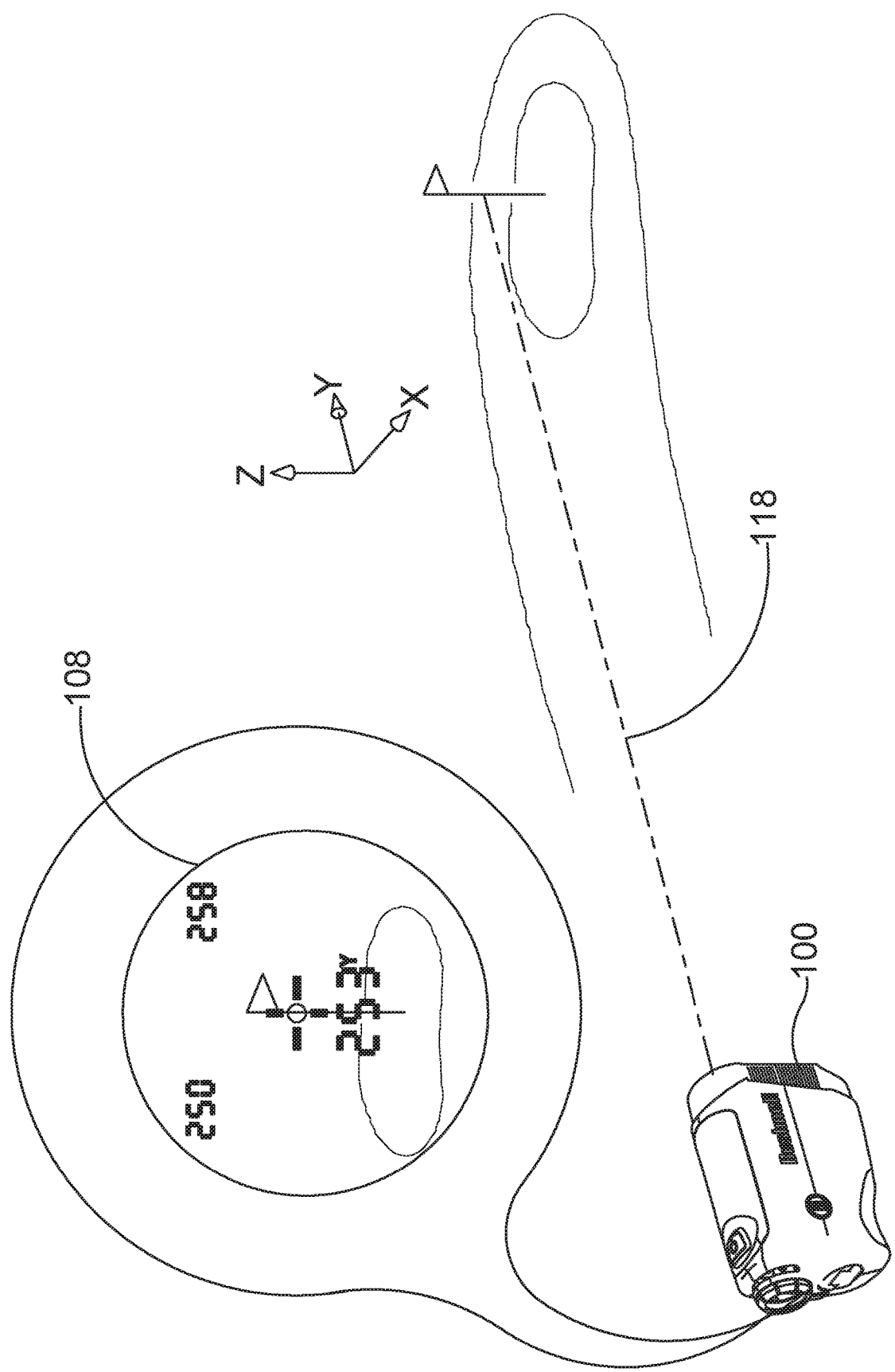
FIG. 18 is a perspective diagram illustrating a laser rangefinder in used on a golf course.
Figure 19A:
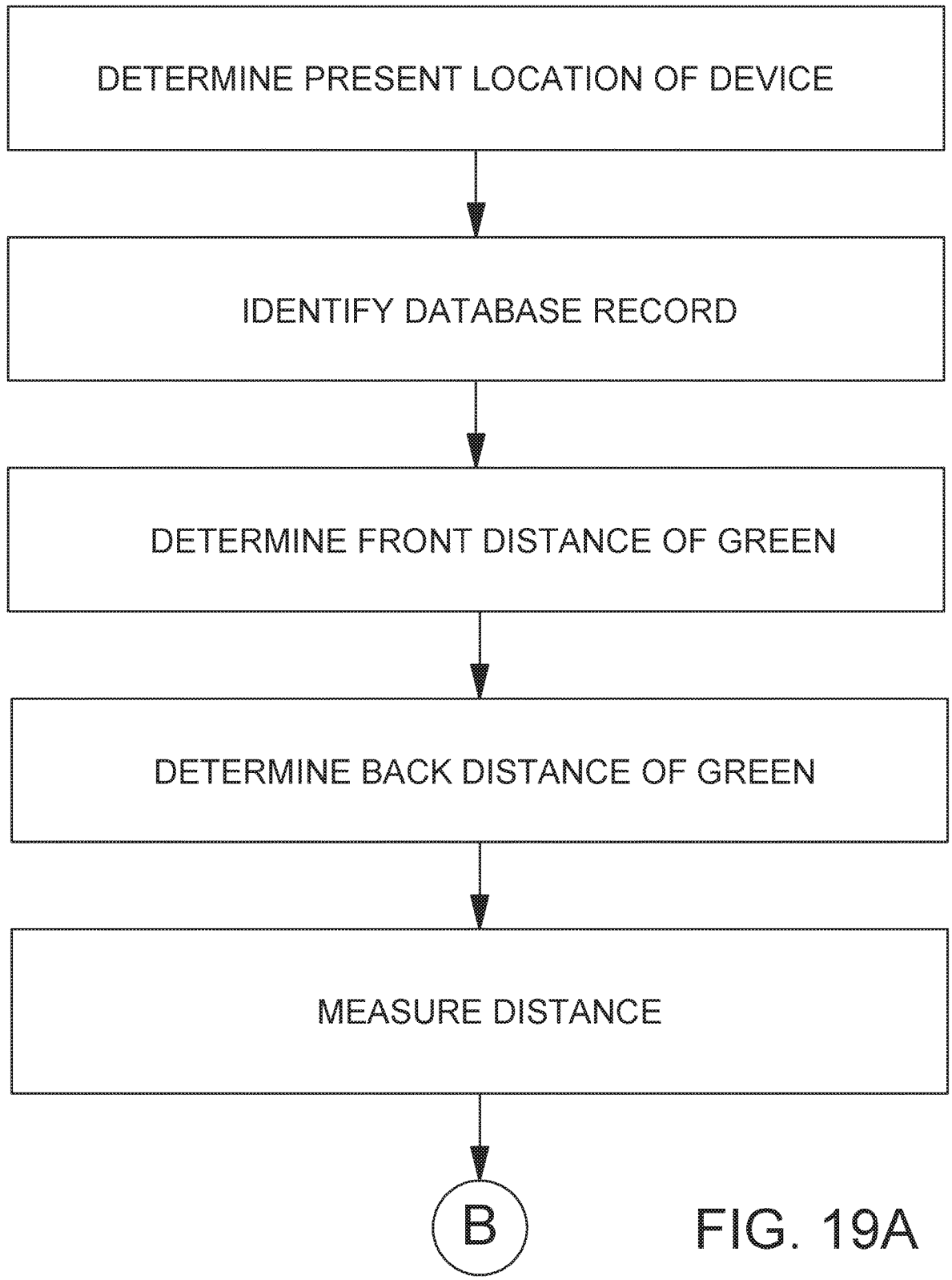
FIGS. 19A and 19B show a flowchart illustrating an example method in accordance with the detailed description.
Figure 19B:
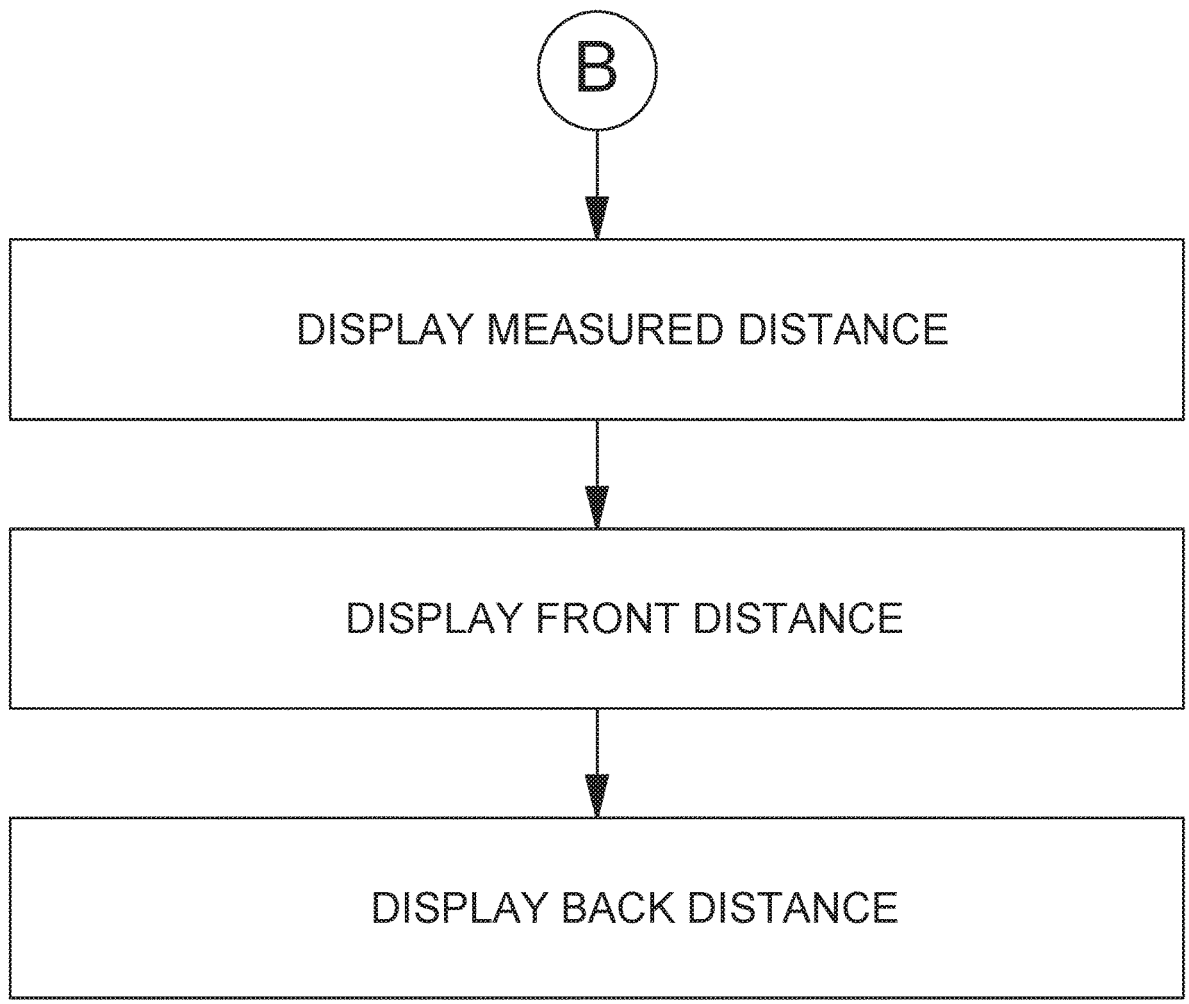

Referring to FIG. 18, in embodiments, a laser rangefinder 100 is used to measure the distance to a flag in a green and display that distance for viewing through an eyepiece along with a front distance and a back distance. The laser rangefinder is oriented so that a laser beam generated by the laser rangefinder 100 illuminates a portion of the flag. The laser rangefinder measures the time required for laser light to travel from the laser rangefinder 100 to the flag and back to the laser rangefinder 100. The laser rangefinder calculates the distance to the flag using this measured time. The measured distance is displayed for viewing through an eyepiece optic of the laser rangefinder. The laser rangefinder also displays a front distance and a back distance for viewing through an eyepiece optic of the laser rangefinder. The front distance is the distance from the current location of the laser rangefinder 100 to a front edge of the green. The back distance is the distance from the current location of the laser rangefinder 100 to a back edge of the green.

Referring to FIGS. 4, 9, 10, 18, 19A and 19B, in embodiments, a method in accordance with this detailed description may include providing a laser rangefinder including a processor operatively coupled to a view-thru display and a laser source. In embodiments, the device emits a laser beam along a laser beam axis. The method may also include determining a present location of the device based on information received from the GPS receiver. The method may also include identifying a database record associated with a golf hole proximate the present location of the device. The method may also include determining a front distance from the database record. The method may also include determining a back distance from the database record. The method may also include measuring a flight time of light emitted by the laser source, reflected off of a target and sensed by the photo detector. The method may also include determining a measured distance based on the flight time. The method may also include presenting the measured distance, the front distance and the back distance for viewing through an eyepiece optic of the laser rangefinder.

Referring to FIGS. 4, 9, 10, 18, 19A and 19B, in embodiments, a laser rangefinder 100 may include a GPS receiver 130 for receiving information from GPS satellites and an antenna 140 operatively coupled to the GPS receiver 130. In embodiments, the GPS receiver 130 is operatively coupled to the control circuitry 122. In embodiments, the control circuitry comprises one or more processors 126 and a non-transitory computer readable medium 128 storing one or more instruction sets. In embodiments, the one or more instruction sets include instructions configured to be executed by the one or more processors 126 to determine a present location of the laser rangefinder 100 based on information received from the GPS receiver 130 and identify a database record associated with a golf hole proximate the present location of the laser rangefinder 100. The processors 126 may determine a front distance and a back distance from the identified database record. The instructions executed by the processors 126 may cause the processors 126 to measure a flight time associated for light emitted by the laser source, reflected off of a target, and sensed by the photo detector. A measured distance may be calculated based on the determined flight time. The instructions executed by the processors 126 may cause the measured distance, the front distance and the back distance to be presented on the see-through display assembly 108 of the laser rangefinder 100.

Figure 20B:
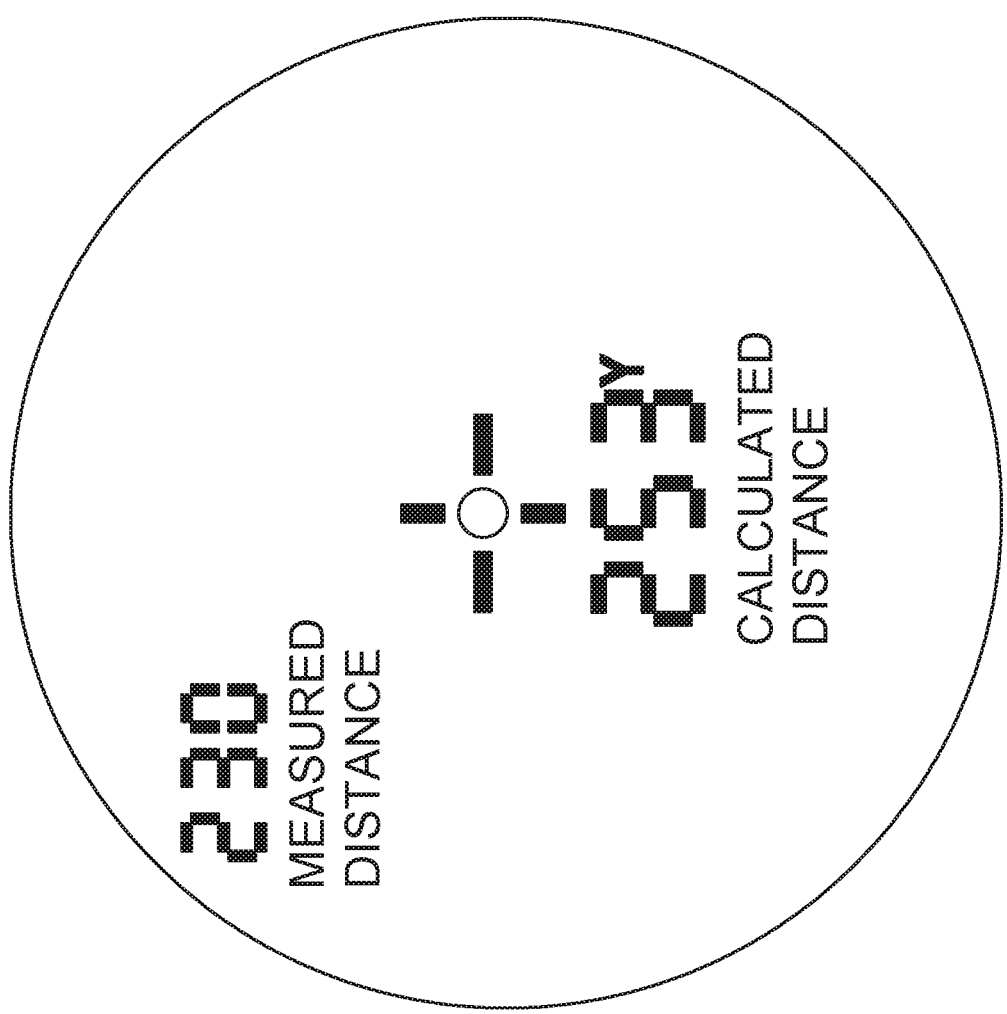
FIG. 20B is a diagram illustrating a stylized display that may be seen through an eyepiece of a laser rangefinder.
Figure 21A:
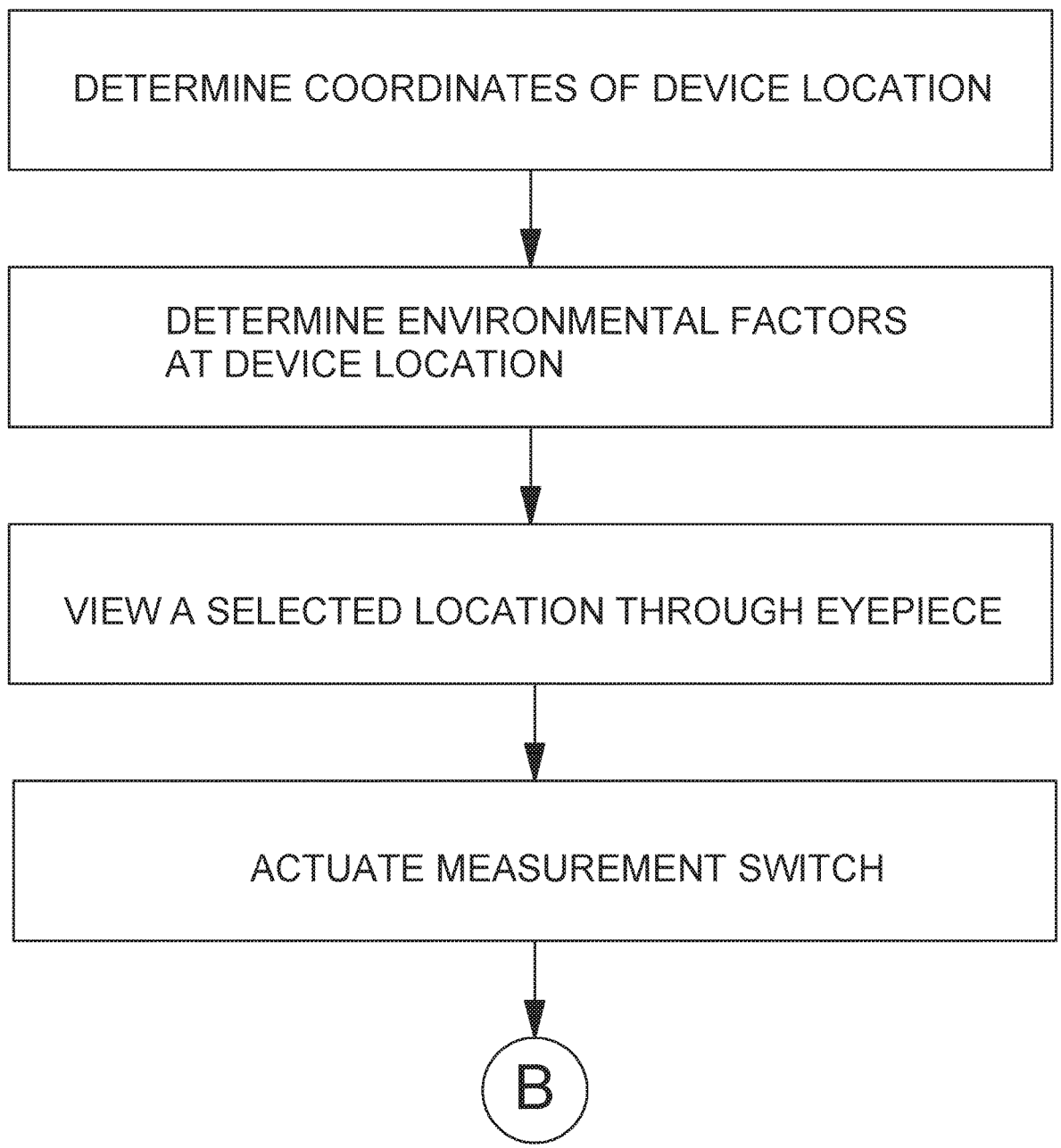
FIGS. 21A and 21B show a flowchart illustrating an example method in accordance with the detailed description.
Figure 21B:
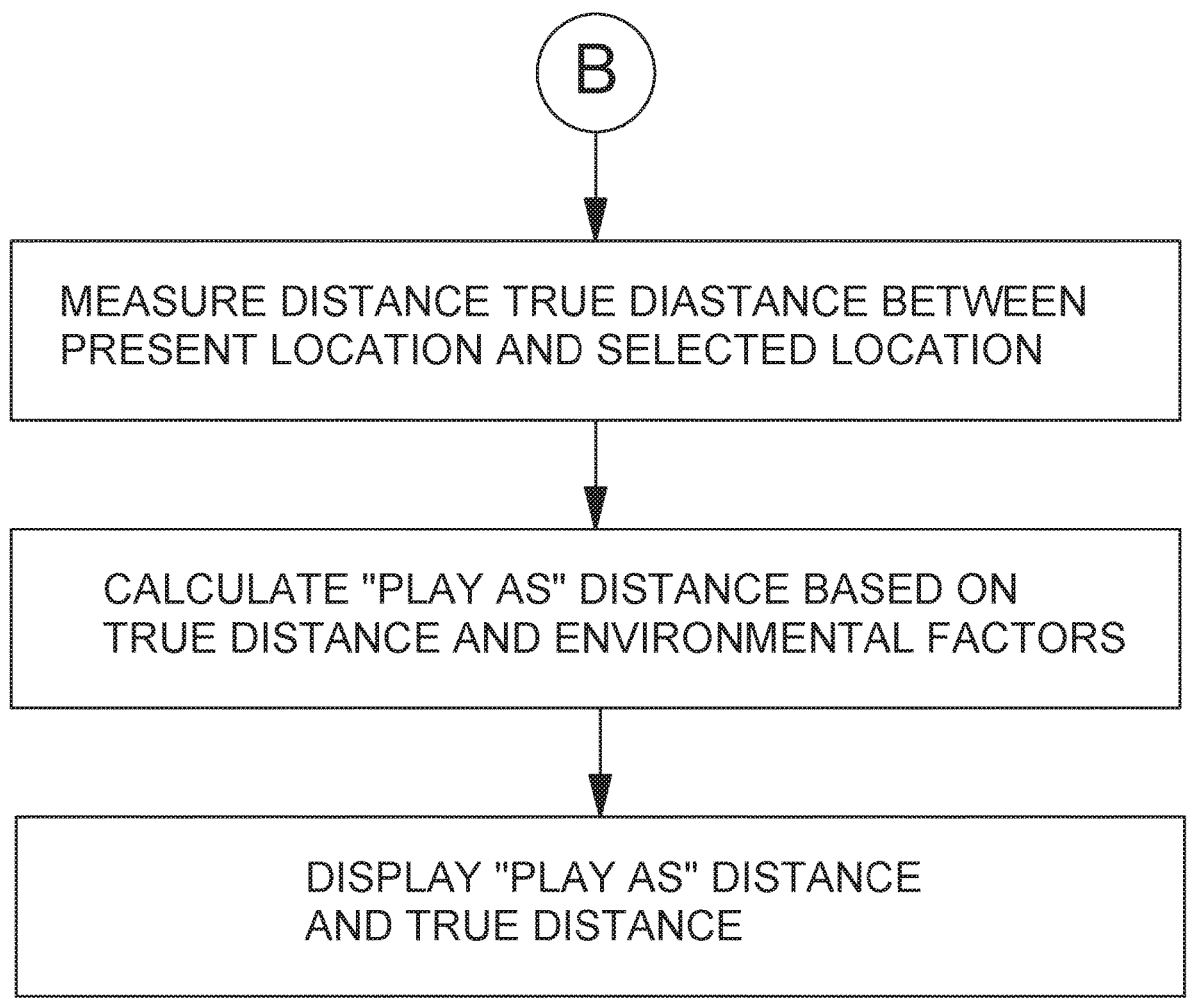

Referring to FIG. 20, in embodiments, a player (not shown) using a laser rangefinder 100, scopes the flag with a laser beam 118 and is provided a readout of a measured true distance 19 of 100 yards; on a high altitude course, however, due to the lessened wind resistance, the golfer may find that an expected 100 yard shot 226 travels 110 yards, a 10% differential. The rangefinder, with internal algorithms for compensating for the differential provides a readout of a calculated "play as" distance 222 of 91 yards. The golfer then hits what he would normally hit under his normal playing condition to hit a 91 yard shot. The "played as" shot 228 travels the desired 100 yards.

Referring to FIGS. 4, 9, 10, 20A, 20B, 21A and 21B, in embodiments, a method in accordance with this detailed description may include providing a laser rangefinder including a processor operatively coupled to a view-thru display and/or a projector and a laser source. In embodiments, the device emits a laser beam along a laser beam axis. The method may also include determining a present location of the device based on information received from the GPS receiver. The method may also include identifying a database record associated with a golf hole proximate the present location of the device. The method may also include measuring a flight time of light emitted by the laser source, reflected off of an object and sensed by the photo detector. The method may also include determining a measured true distance based on the flight time. The method may also include determining a calculated play as distance. The method may also include presenting the calculated play as distance for viewing through an eyepiece optic of the laser rangefinder. The calculated play as distance may be determined based on factors such as wind conditions, inclination, altitude, pressure, and/or temperature.

Referring to FIGS. 4, 9, 10, 20A, 20B, 21A and 21B, in embodiments, a laser rangefinder 100 may include a GPS receiver 130 for receiving information from GPS satellites and an antenna 140 operatively coupled to the GPS receiver 130. In embodiments, the GPS receiver 130 is operatively coupled to the control circuitry 122. In embodiments, the control circuitry comprises one or more processors 126 and a non-transitory computer readable medium 128 storing one or more instruction sets. In embodiments, the one or more instruction sets include instructions configured to be executed by the one or more processors 126 to determine a present location of the laser rangefinder 100 based on information received from the GPS receiver 130 and identify a database record associated with a golf hole proximate the present location of the laser rangefinder 100. The processors 126 may determine a green center coordinates from the identified database record. The instructions executed by the processors 126 may cause the processors 126 to measure a flight time associated for light emitted by the laser source, reflected off of an object, and sensed by the photo detector. The object may be located, for example, near a layup point of interest. A measured true distance may be calculated based on the determined flight time. The instructions executed by the processors 126 may cause the processors 126 to determine a calculated play as distance. The instructions executed by the processors 126 may cause the calculated play as distance to be presented on the view-thru display assembly 108 or projected by a projector 162. The calculated play as distance may be determined based on factors such as wind conditions, inclination, altitude, pressure, and temperature.

Figure 22:
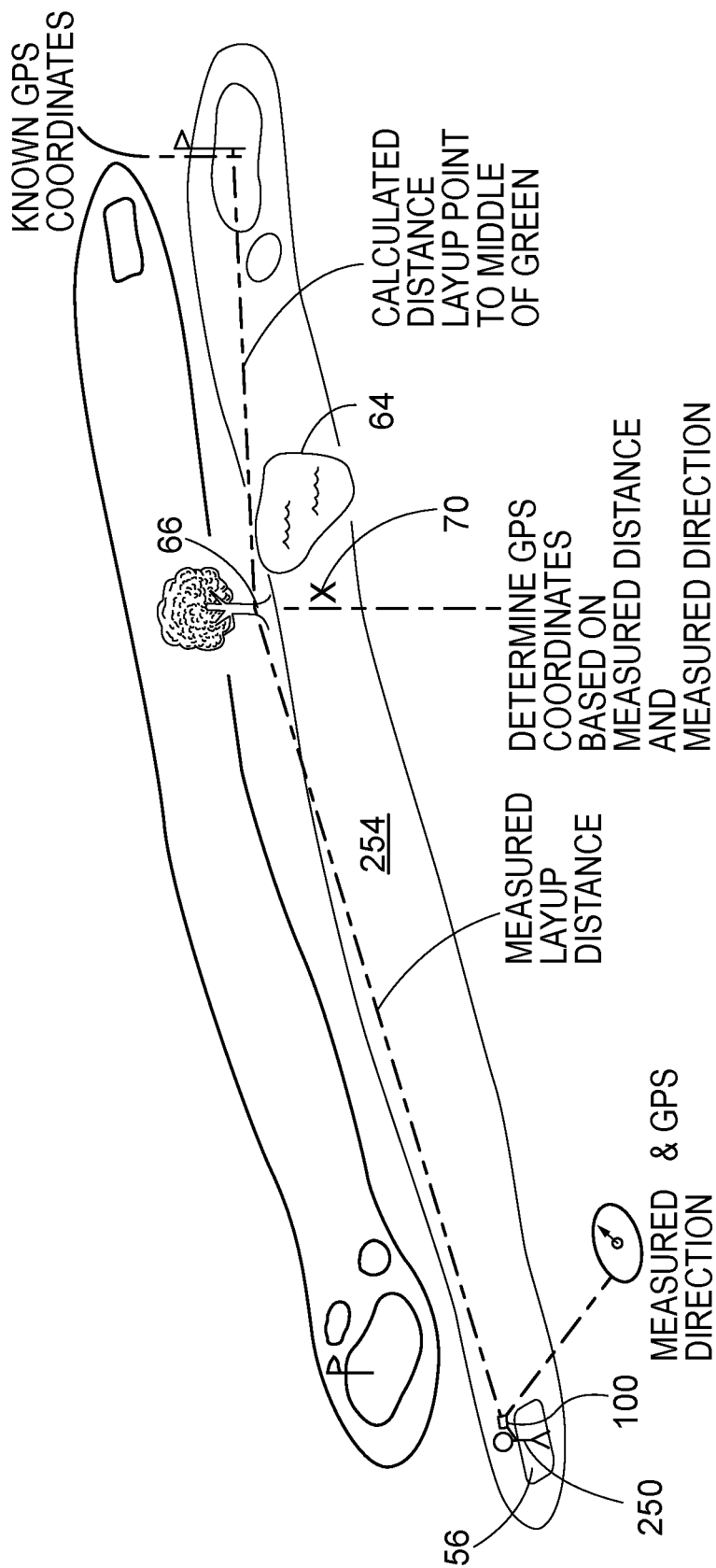
FIG. 22 is a diagram illustrating a laser rangefinder in use on a golf course.
Figure 23A:
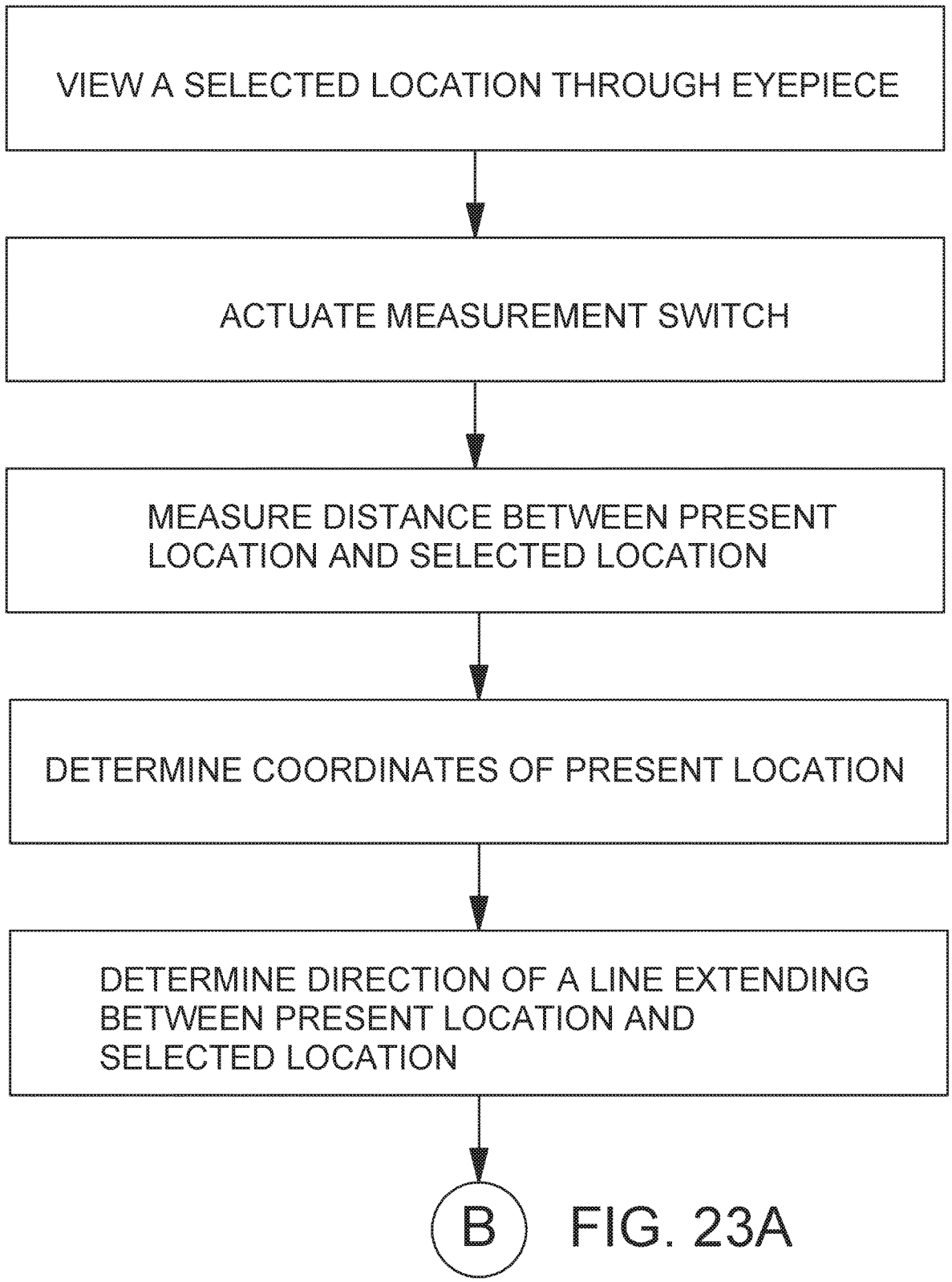
Figure 24A:
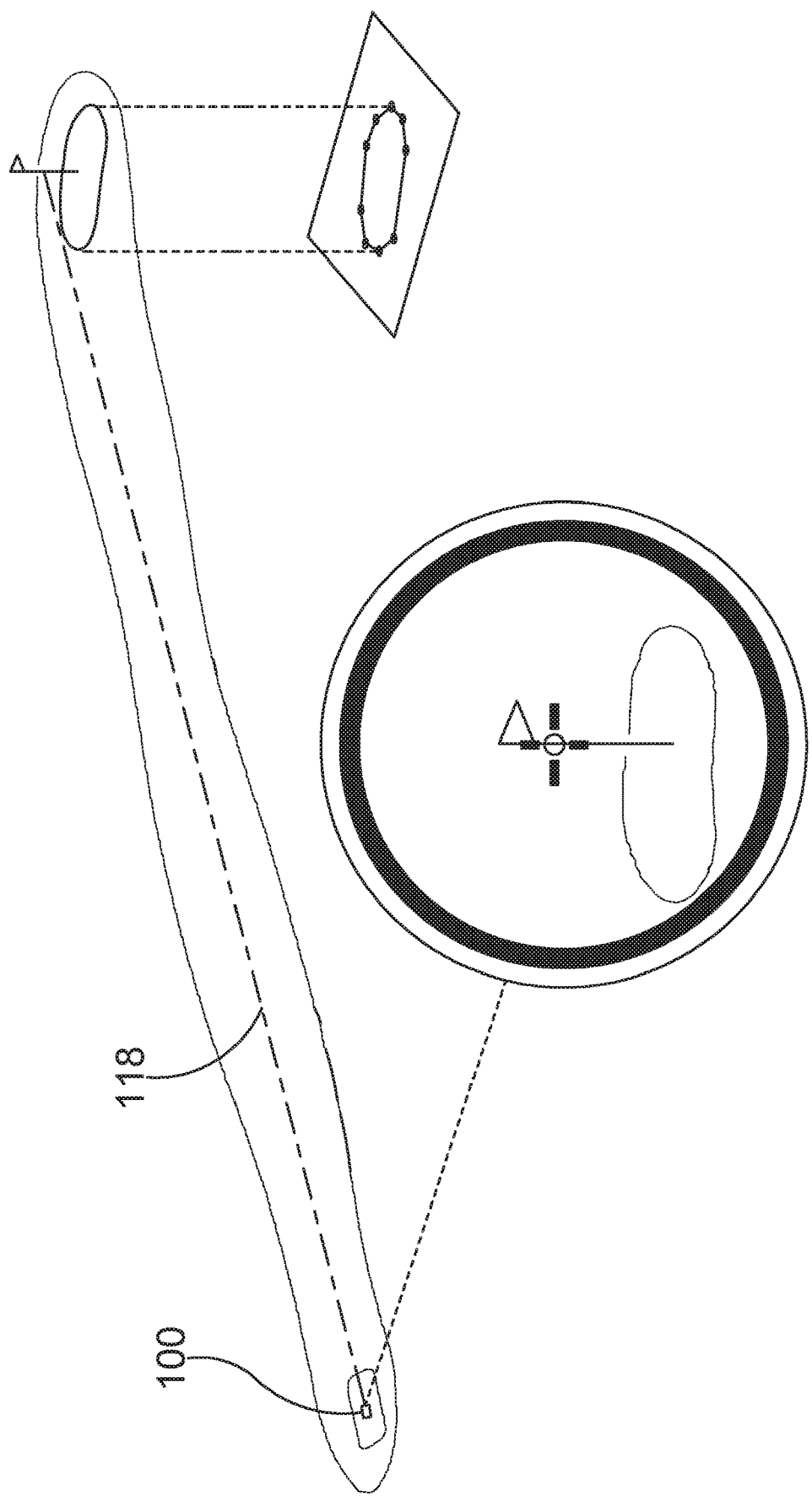
FIG. 24A is a perspective diagram illustrating a laser rangefinder in used on a golf course.
Figure 24C:
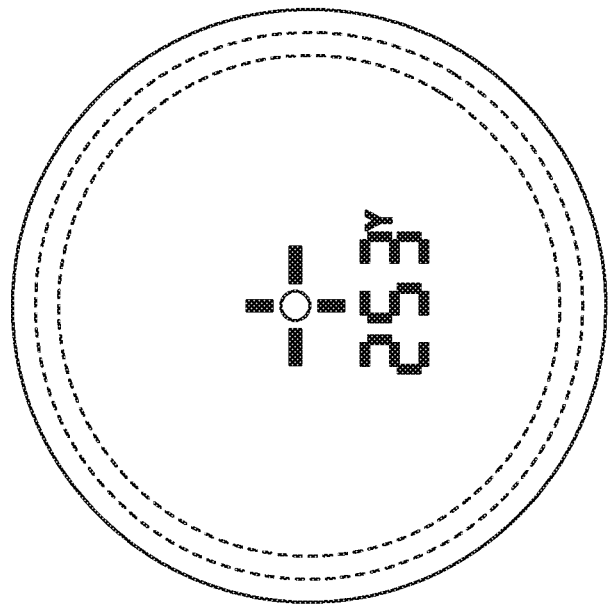
FIG. 24C is a diagram illustrating a stylized display that may be seen through an eyepiece of a laser rangefinder.
Figure 24B:
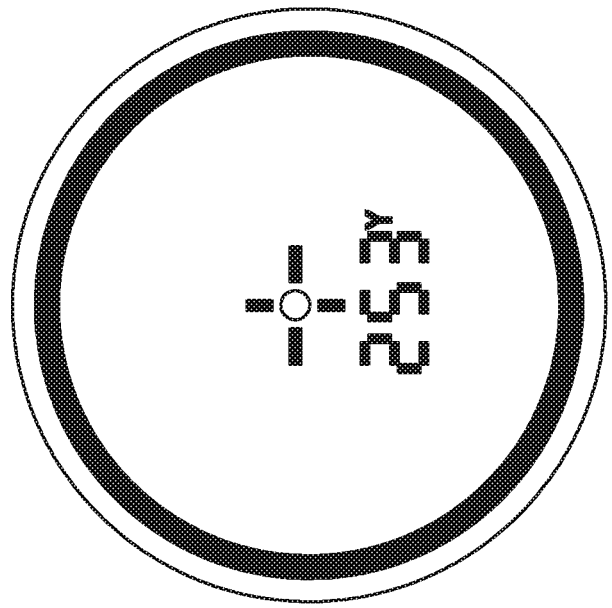
FIG. 24B is a diagram illustrating a stylized display that may be seen through an eyepiece of a laser rangefinder.
Figure 25A:
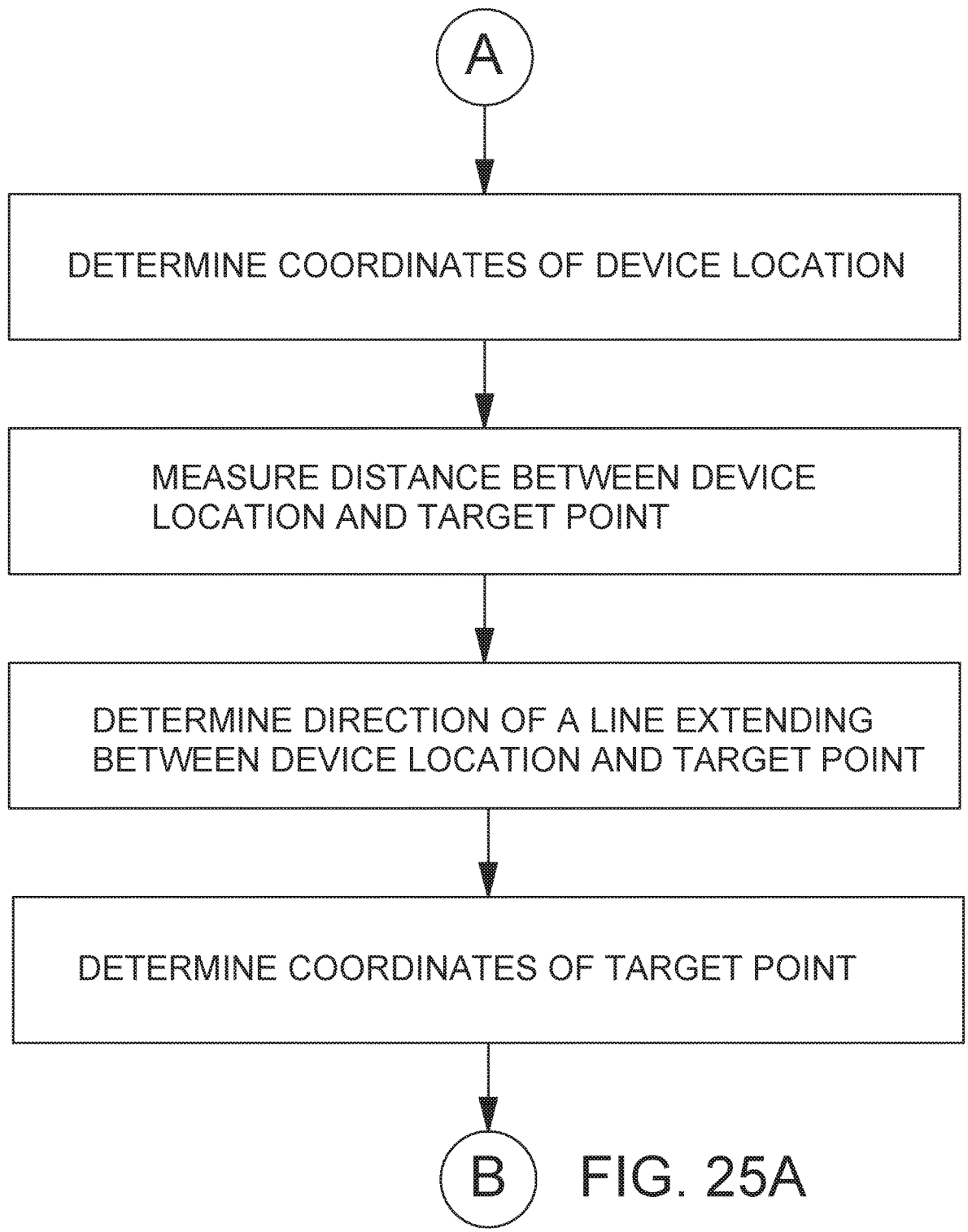

Referring to FIG. 22, in embodiments, a golfer 250 on a hole 254 at the tee 56, with a rangefinder 100, desires to layup on the golfer's side of a hazard 64. The golfer activates the rangefinder to determine the distance (layup distance) to an object 66 at or near a desired layup point 70. The laser rangefinder determines the current coordinates of the golfer and rangefinder using GPS, measures the distance to the object using the laser rangefinder function, measures the compass direction to the object, and calculates, based on the distance and direction, estimated coordinates of the object. The rangefinder then, based on coordinates of the center of the green obtained from a database calculates a distance from the object to the center of the green, this distance constituting a layup point to center of green distance. The laser rangefinder displays the approximate distance to the layup point, using the tree 66 as an estimated layup position, and further displays the calculated distance from the tree 66 to the center of the green which is a close estimate of the distance between the desired layup position and the center of the green.

Referring to FIGS. 4, 9, 10, 22, 23A and 23B, in embodiments, a method in accordance with this detailed description may include providing a laser rangefinder including a processor operatively coupled to a view-thru display and/or a projector and a laser source. In embodiments, the device emits a laser beam along a laser beam axis. The method may also include determining a present location of the device based on information received from the GPS receiver. The method may also include identifying a database record associated with a golf hole proximate the present location of the device. The method may also include determining green center coordinates from the database record. The method may also include measuring a flight time of light emitted by the laser source, reflected off of an object and sensed by the photo detector. The object may be, for example, located near a layup point of interest. The method may also include determining a measured layup distance based on the flight time. The method may also include determining a measured direction based on signals or information from a digital compass. The method may also include determining layup point coordinates. The determination of the layup point coordinates may be based, for example, on the present device location, the measured layup distance and the measured direction. The method may also include presenting the measured layup distance and the layup point to green distance for viewing through an eyepiece optic of the laser rangefinder.

Referring to FIGS. 4, 9, 10, 22, 23A and 23B, in embodiments, a laser rangefinder 100 may include a GPS receiver 130 for receiving information from GPS satellites and an antenna 140 operatively coupled to the GPS receiver 130. In embodiments, the GPS receiver 130 is operatively coupled to the control circuitry 122. In embodiments, the control circuitry comprises one or more processors 126 and a non-transitory computer readable medium 128 storing one or more instruction sets. In embodiments, the one or more instruction sets include instructions configured to be executed by the one or more processors 126 to determine a present location of the laser rangefinder 100 based on information received from the GPS receiver 130 and identify a database record associated with a golf hole proximate the present location of the laser rangefinder 100. The processors 126 may determine a green center coordinates from the identified database record. The instructions executed by the processors 126 may cause the processors 126 to measure a flight time associated for light emitted by the laser source, reflected off of an object, and sensed by the photo detector. The object may be located, for example, near a layup point of interest. A measured layup distance may be calculated based on the determined flight time. A measured direction may be determined based on signals and/or information from a digital compass. The instructions executed by the processors 126 may cause the processors 126 to determine the coordinates of the layup point. The determination of the layup point coordinates may be based, for example, on the present device location, the measured layup distance and the measured direction. The instructions executed by the processors 126 may cause the measured layup distance and the layup point to green distance to be presented on the view-thru display assembly 108 or projected by a projector 162.

Referring to FIGS. 4, 9, 10, 24A-24C and 25A-25B, in embodiments, a method in accordance with this detailed description may include providing a laser rangefinder including a processor operatively coupled to a laser source and a photodetector. In embodiments, the laser beam source emits a laser beam along a laser beam axis. The method may include measuring a flight time for light emitted by the laser source, reflected off of a target point and sensed by the photo detector. A measured distance may be determined based on the flight time of the light emitted by the laser source. A measured direction may also be determined. The measured direction may be determined, for example, using information or signals from a digital compass. In embodiments, a line extending between the device location and the target point extends in the measured direction. The method may also include determining a device location and a target point location. The device location may be determined, for example, based on information received from a GPS receiver. The location of the target point may be determined, for example, based on the device location, the measured distance and the measured direction. A green boundary associated with a hole of a golf course may be determined, for example, by accessing a relevant record in a database. The location of the target point may be compared to the green boundary and user-perceivable feedback may be generated if the target point is located inside the green boundary. The user-perceivable feedback may include, for example, haptic feedback, visual feedback and/or audible feedback.

Referring to FIGS. 9, 10, 24A-24C and 25A-25B, in embodiments, a laser rangefinder 100 may include a GPS receiver 130 for receiving information from GPS satellites and an antenna 140 operatively coupled to the GPS receiver 130. In embodiments, the GPS receiver 130 is operatively coupled to the control circuitry 122. In embodiments, the control circuitry comprises one or more processors 126 and a non-transitory computer readable medium 128 storing one or more instruction sets. The instructions executed by the processor(s) may cause the processor(s) to measure a flight time associated for light 118 emitted by the laser source, reflected off of an object and sensed by the photo detector. The object may be located, for example, near a target point of interest. A measured distance may be calculated based on the flight time of the light emitted by the laser source. A measured direction may be determined based on signals and/or information from a digital compass. A device location may be determined by the processor(s) based on information received from the GPS receiver. The instructions executed by the processor(s) may cause the processor(s) to determine the coordinates of the target point. The determination of the target point coordinates may be based, for example, on the present device location, the measured distance and the measured direction. A green boundary associated with a hole of a golf course may be determined, by the processor(s), by accessing a relevant record in a database. The instructions executed by the processor(s) may cause the processor(s) to compare the location of the target point to the green boundary and the processor(s) may cause the laser rangefinder to generate user-perceivable feedback if the target point is located inside the green boundary. The user-perceivable feedback may include, for example, haptic feedback, visual feedback and/or audible feedback.

Figure 26A:
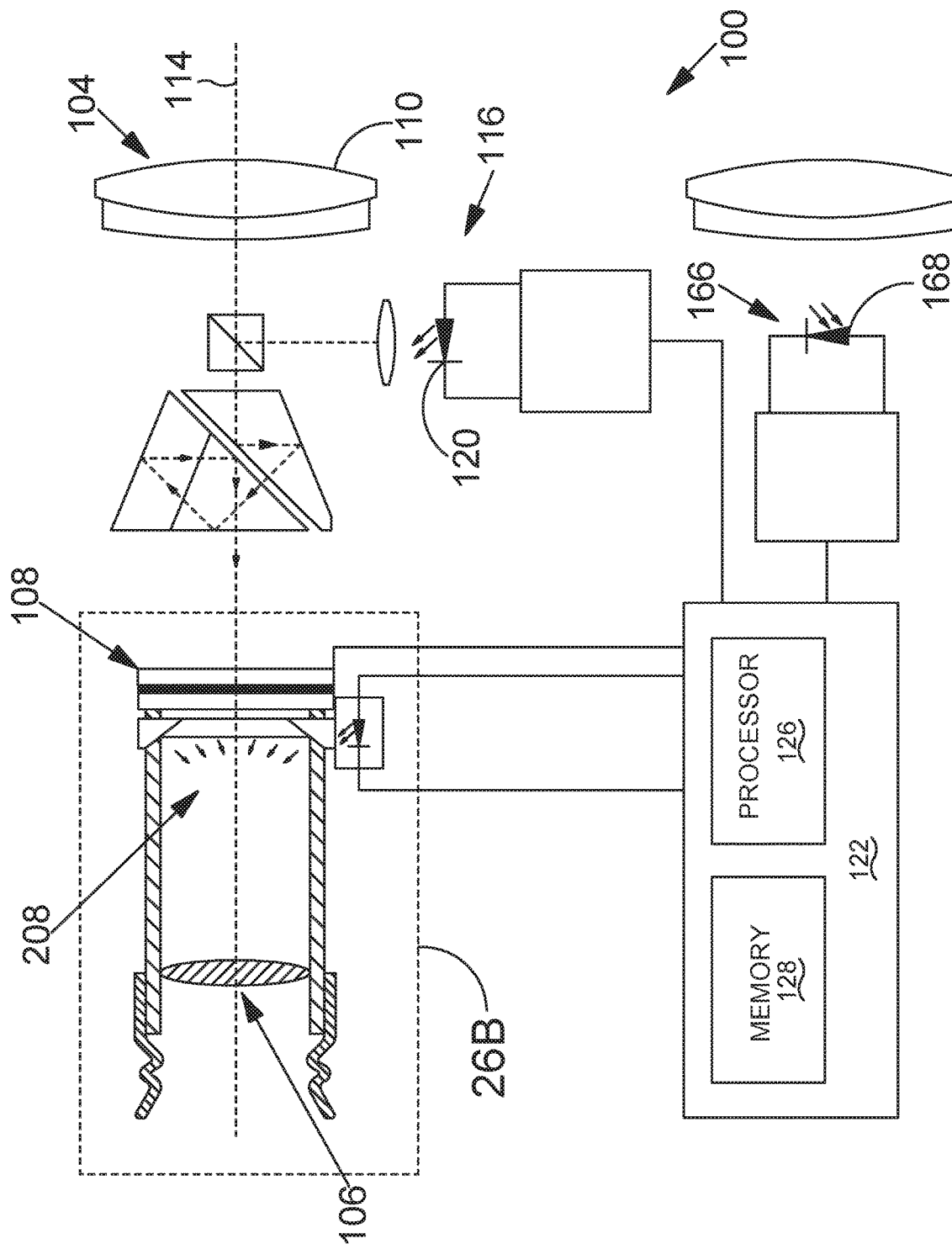
FIG. 26A is a diagram illustrating a laser rangefinder in accordance with the detailed description.
Figure 26C:
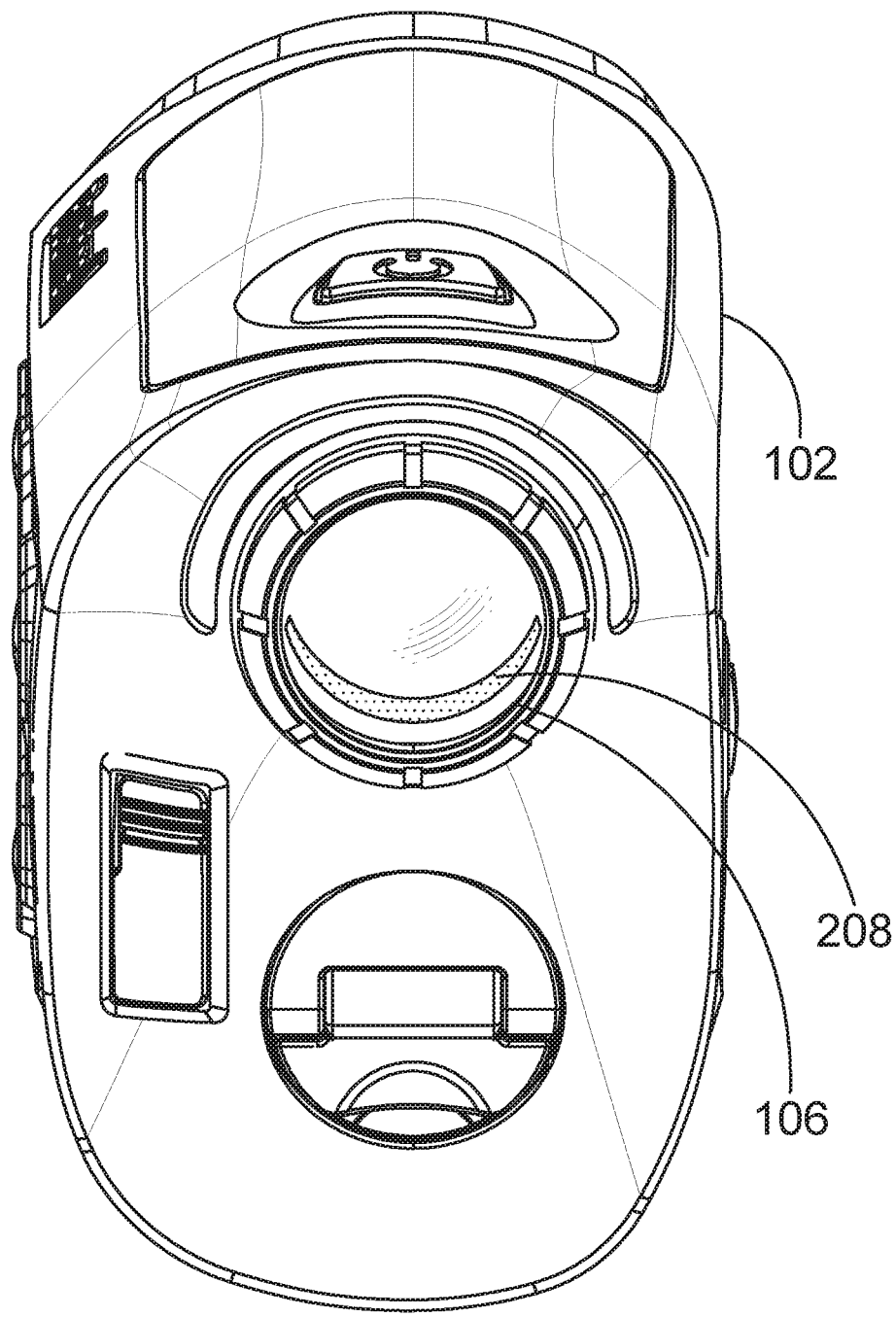
FIG. 26C is a perspective view of a laser rangefinder.

Referring to FIGS. 26A-26C, in embodiments, a laser rangefinder 100 comprises an eyepiece optic 106, an objective optic 104, and an ocular tube 200 supporting the eyepiece optic 106 and the objective optic 104. In embodiments, the ocular tube 200 has one or more walls 220 extending between the eyepiece optic 106 and the objective optic 104. In embodiments, the eyepiece optic 106, the objective optic 104, and the ocular tube 200 define a sealed cavity 202 filled with a dry, inert gas 204. In embodiments, the laser rangefinder 100 includes a visual feedback assembly 206. The visual feedback assembly 206 may be positioned and configured for presenting visually perceivable feedback 208 so that the visually perceivable feedback 208 is visible through the eyepiece optic 106. In embodiments, the visually perceivable feedback 208 comprises light 210 that is produced by a light source 212 of the visual feedback assembly 206. In embodiments, the light 210 produced by the light source 212 is directed by a light guide 214 of the visual feedback assembly 206. The light 210 and the visually perceivable feedback 208 are illustrated using dots and arrows in FIGS. 26A-26C. In embodiments, the light source 212 comprises one or more light emitting diodes 216. In embodiments, an eye cup 218 is disposed near a rearward end of the ocular tube 200.

Figure 26E:
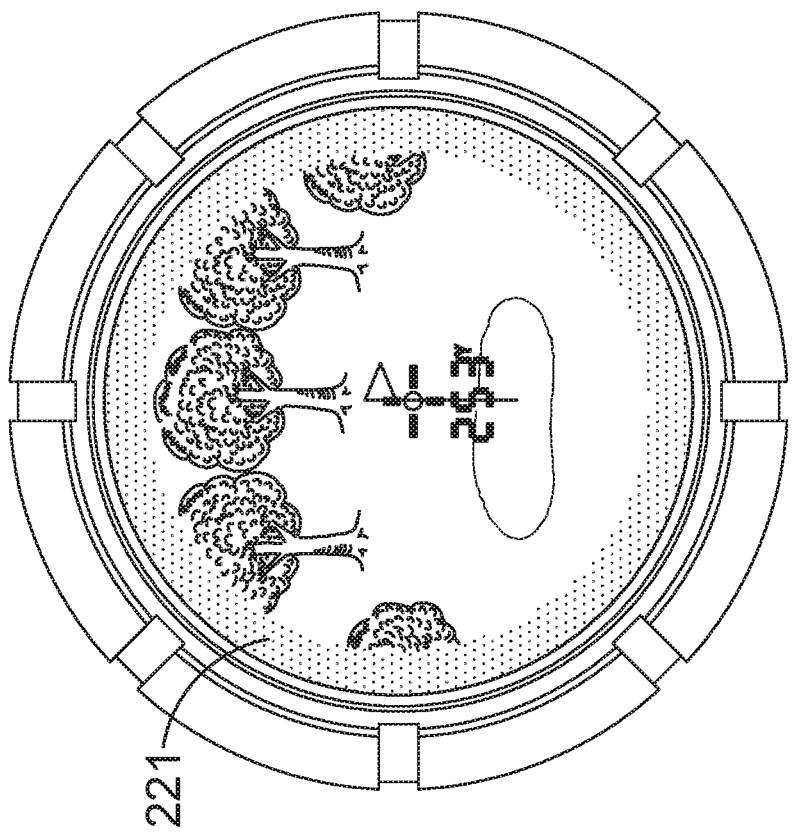
FIG. 26D-FIG. 26I are stylized views illustrating the view seen through the eyepiece optic of a laser rangefinder.
Figure 26D:
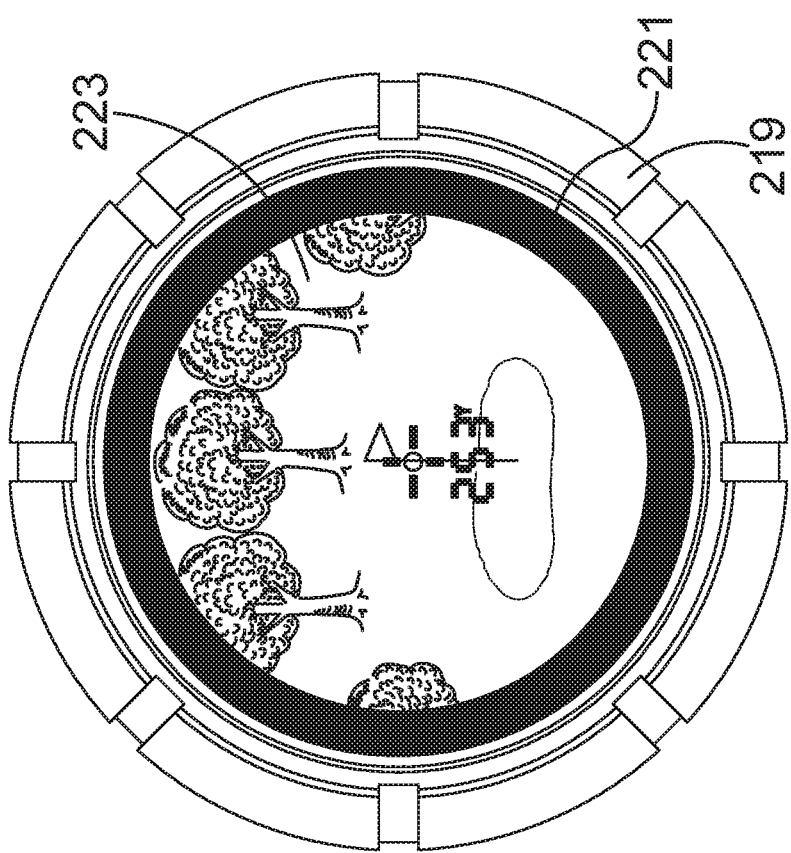

Referring to FIGS. 26D-26I, various peripheral indicator means of a laser rangefinder are illustrated. Such means provide a pronounced visual effect without blocking or impeding the view of middle of the image. The peripheral indicator can indicate, for example, indicate the target acquisition of the flagstick. Referring specifically to FIG. 26D, when a user places his eye close to the eyepiece of a laser rangefinder a peripheral black ring 221 surrounds the image 223 viewed in the view-thru display. The target acquisition indication may be presented by illuminating the ring 221 such as illustrated by FIG. 26E. The illumination may be a color such as red or yellow or other color, or white. The illumination may be provided by light emitting diodes 216 as shown in FIG. 26B.

Figure 26G:
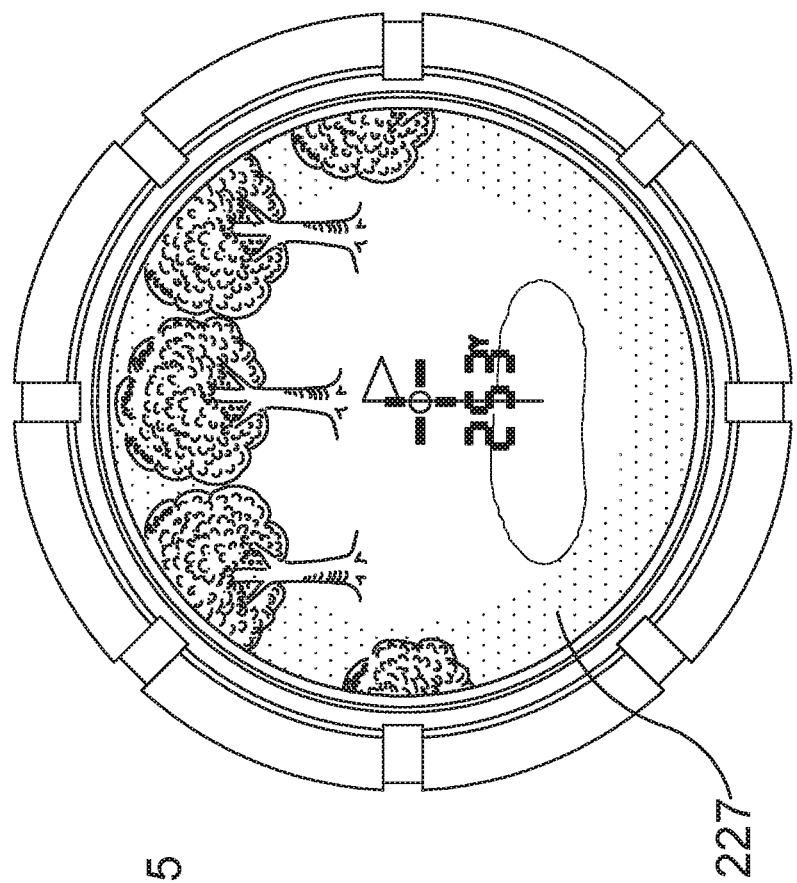
Figure 26F:
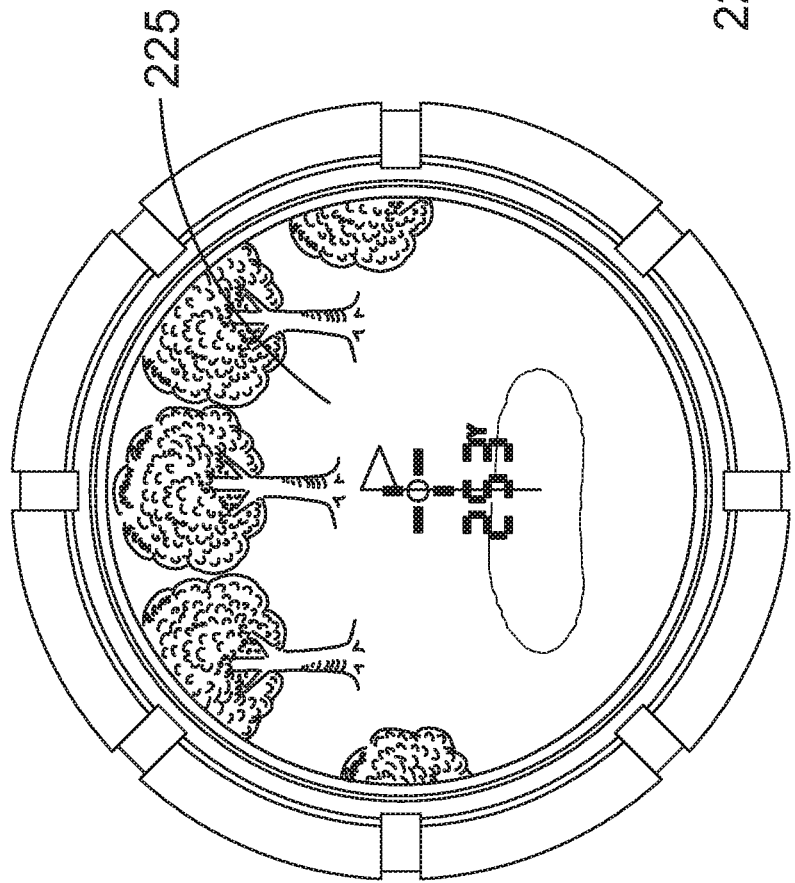
Figure 26I:
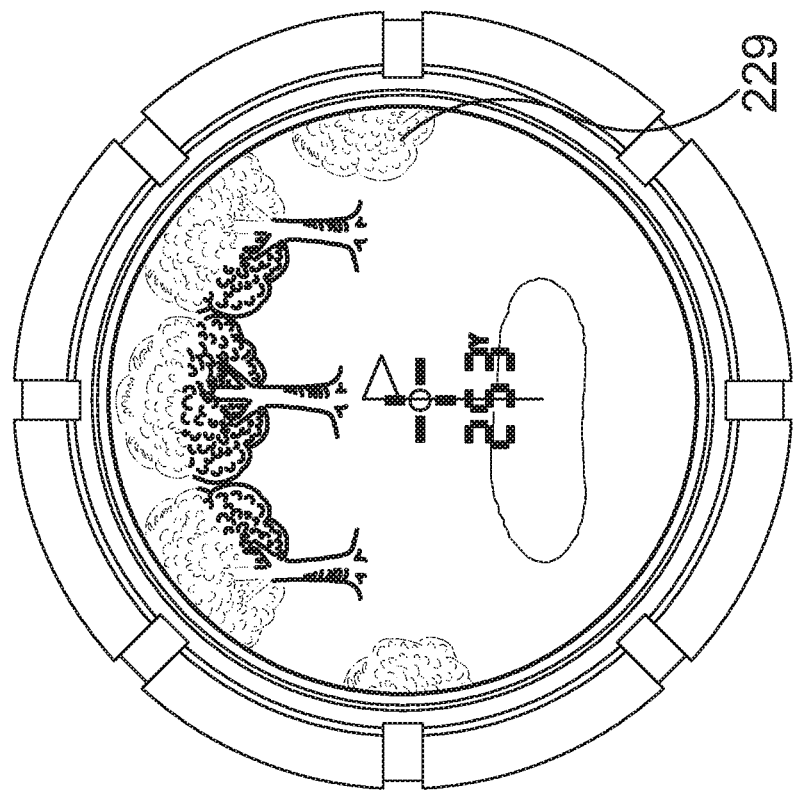
Figure 26H:
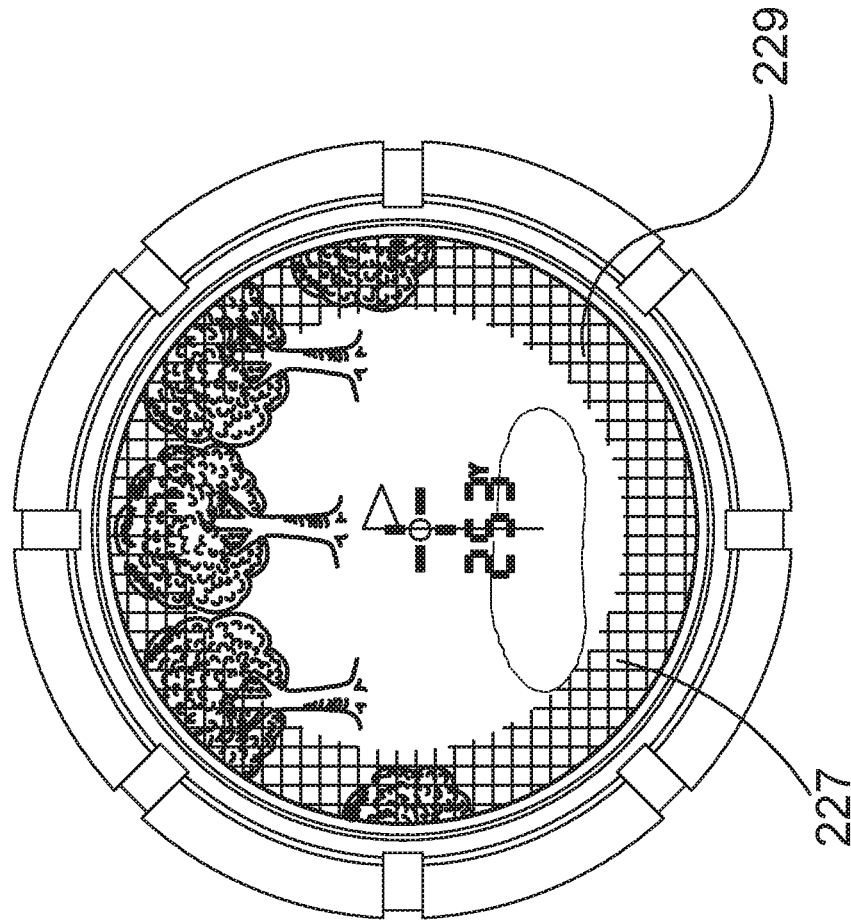

Referring specifically to FIGS. 26F and 26G, a target acquisition indicator may be provided by changing the clear image 225 of the view-thru display as represented by FIG. 26F by way of alternating the periphery 227 of the image such as by changing the contrast, see FIG. 26G. Alternately the periphery may be darkened or colored creating the pronounced peripheral ring 229 that is part of the image, see FIG. 26H, or by putting the peripheral ring 229 of the image out-of-focus as illustrated by FIG. 26I.

Figure 28B:
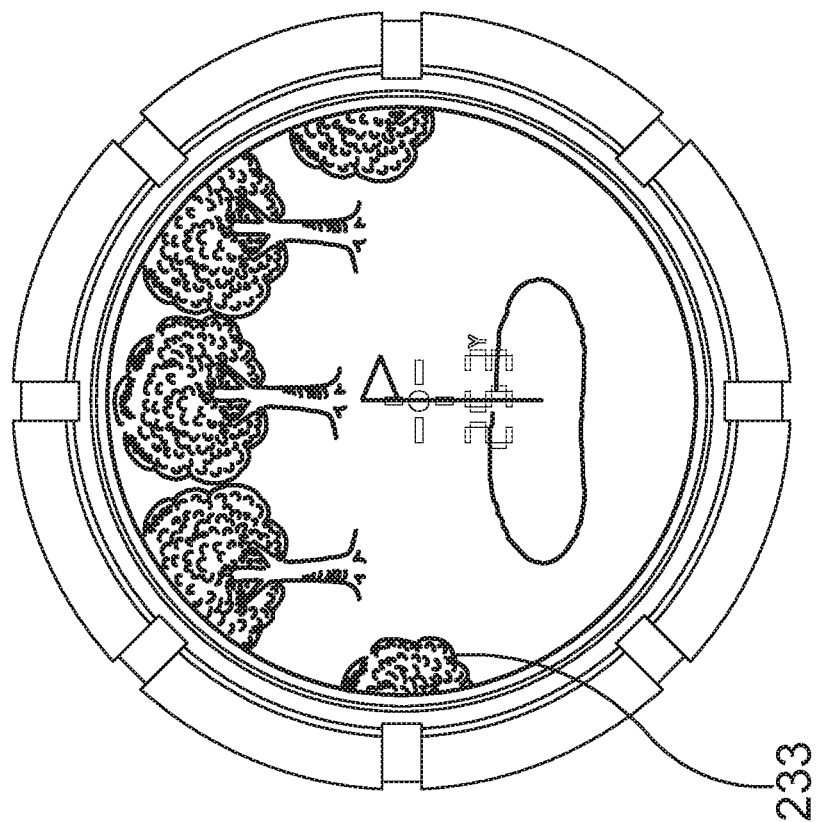
FIG. 28A-FIG. 28B are stylized views illustrating the view seen through the eyepiece optic of a laser rangefinder.
Figure 28A:
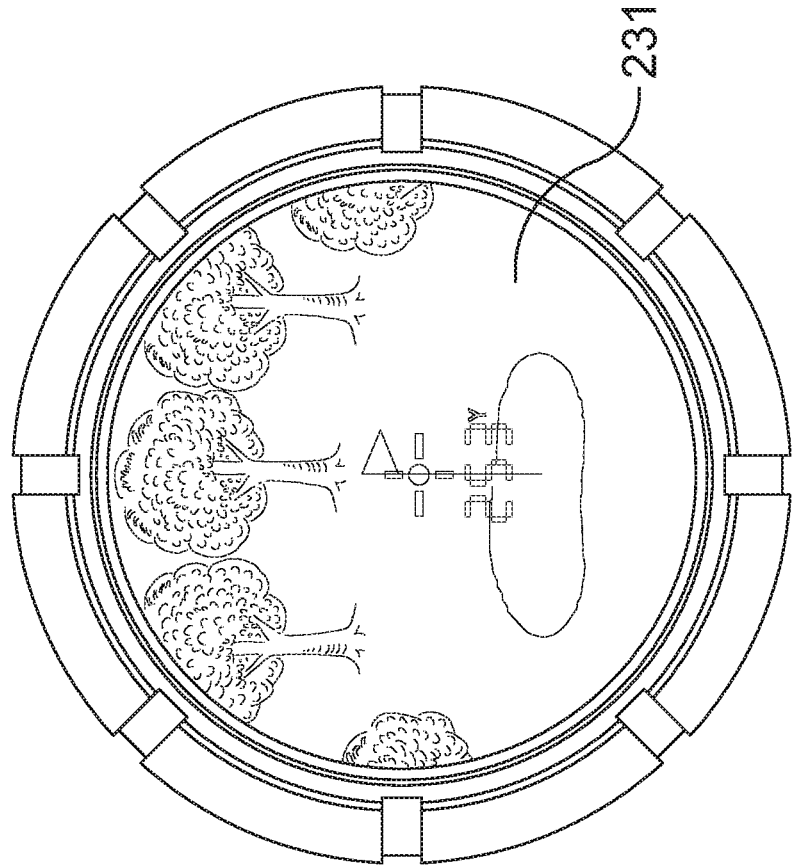

Referring specifically to FIGS. 28A and 28B, another highly perceptible visual indication of a target acquisition may be presented by an overall illumination of the original image 231 of the view-thru display of FIG. 28A to the highlighted image 233 as represented by FIG. 28B.

Figure 2:
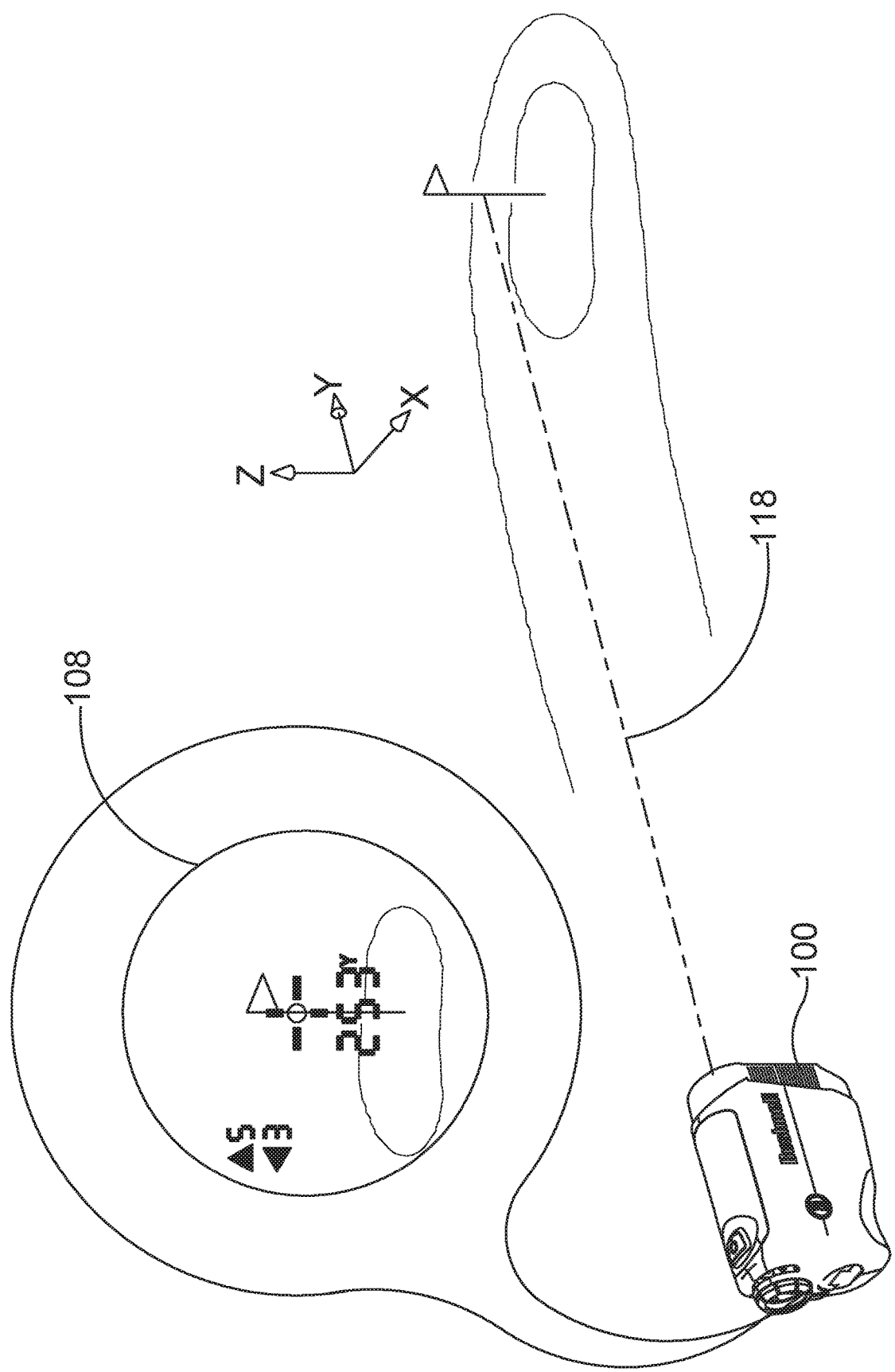
FIG. 2 is a diagram illustrating a laser rangefinder and a stylized display that may be seen through an eyepiece of the laser rangefinder.

Referring to FIGS. 1, 2 and 7, an upward direction Z and a downward or lower direction −Z are illustrated using arrows labeled "Z" and "−Z," respectively. A forward direction Y and a rearward direction −Y are illustrated using arrows labeled "Y" and "−Y," respectively. A rightward direction X and a port direction −X are illustrated using arrows labeled "X" and "−X," respectively. The directions illustrated using these arrows are applicable to the apparatus shown and discussed throughout this application. The port direction may also be referred to as a left direction and/or the leftward direction. The rightward direction may also be referred to as a right direction. In one or more embodiments, the upward direction is generally opposite the downward direction. In one or more embodiments, the upward direction and the downward direction are both generally orthogonal to an XY plane defined by the forward direction and the rightward direction. In one or more embodiments, the forward direction is generally opposite the rearward direction. In one or more embodiments, the forward direction and the rearward direction are both generally orthogonal to a ZX plane defined by the upward direction and the rightward direction. In one or more embodiments, the rightward direction is generally opposite the port direction. In one or more embodiments, rightward direction and the port direction are both generally orthogonal to a ZY plane defined by the upward direction and the forward direction. Various direction-indicating terms are used herein as a convenient way to discuss the objects shown in the figures. It will be appreciated that many direction indicating terms are related to the instant orientation of the object being described. It will also be appreciated that the objects described herein may assume various orientations without deviating from the spirit and scope of this detailed description. Accordingly, direction-indicating terms such as "upwardly," "downwardly," "forwardly," "backwardly," "leftwardly," and "rightwardly," should not be interpreted to limit the scope of the invention recited in the attached claims.

Figures 27B, 27C:
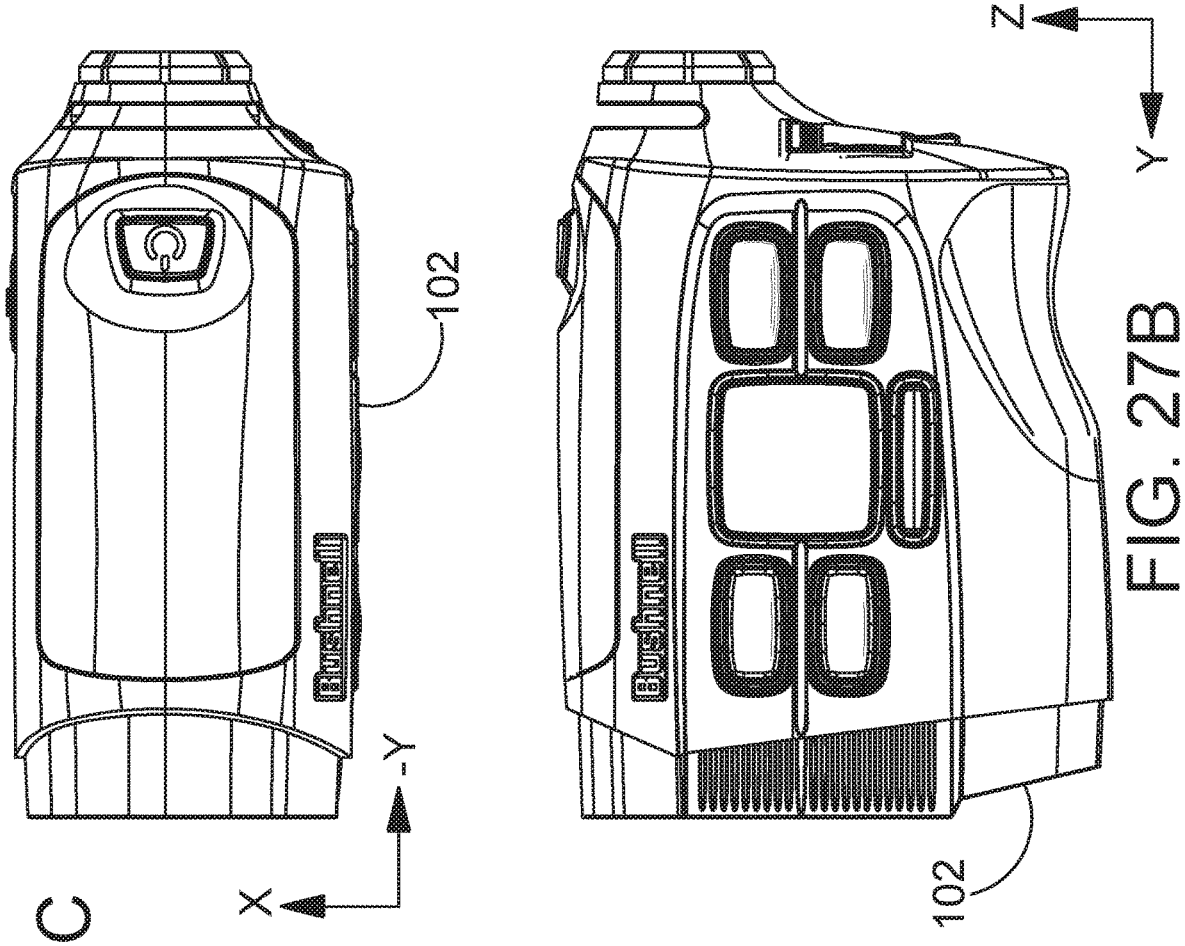
FIG. 27A through FIG. 27F are elevation and plan views showing six sides of a laser rangefinder.
Figure 27A:
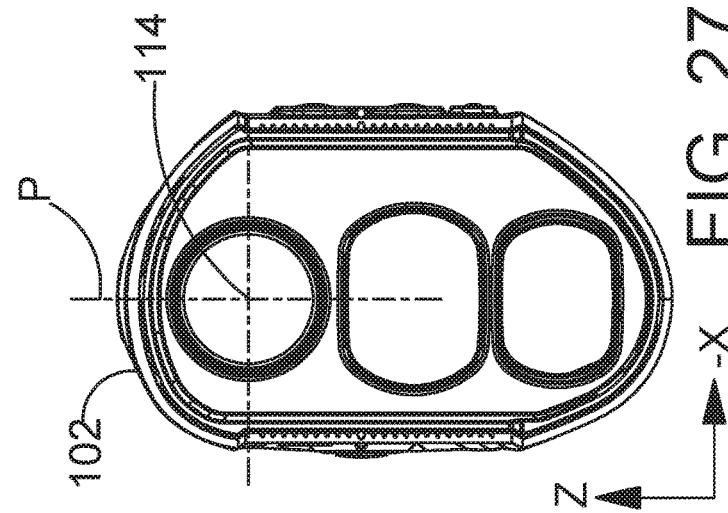
Figure 27E:
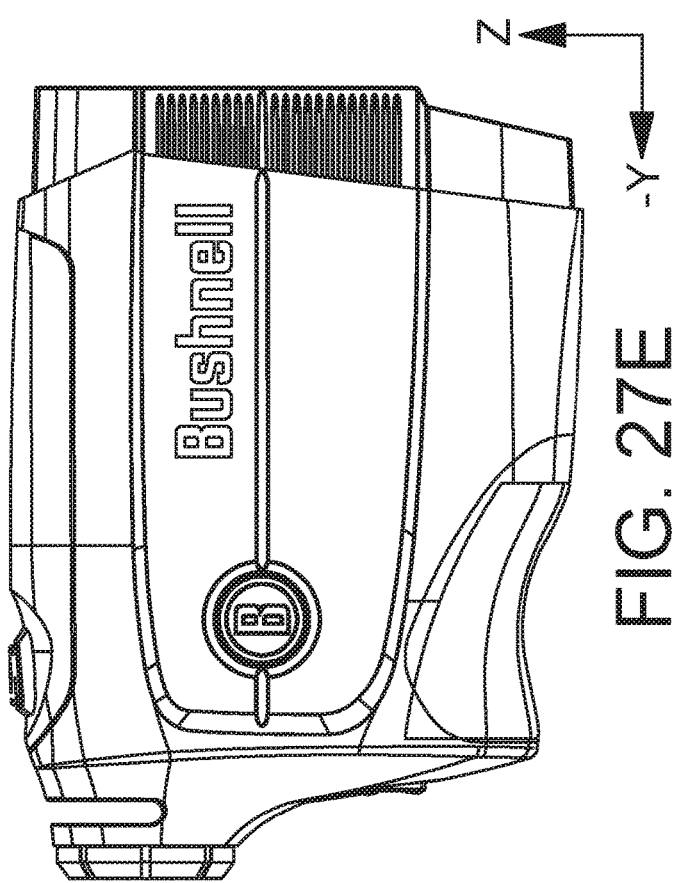
Figure 27F:
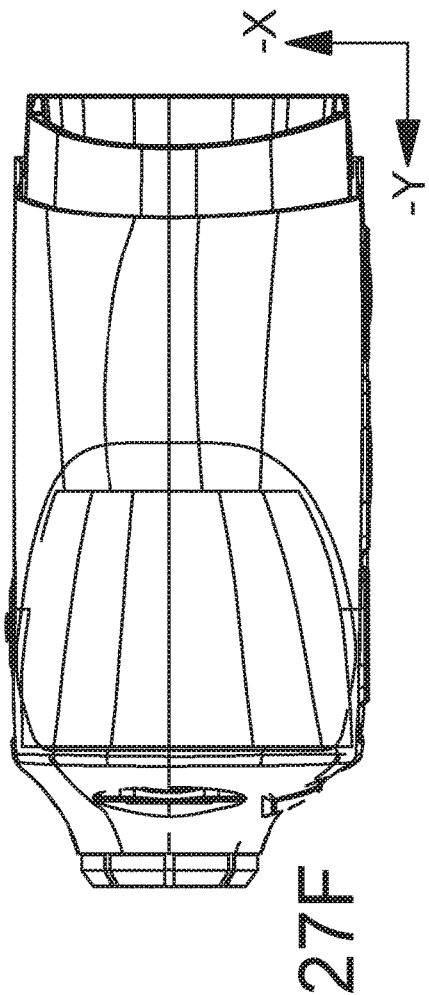
Figure 27D:
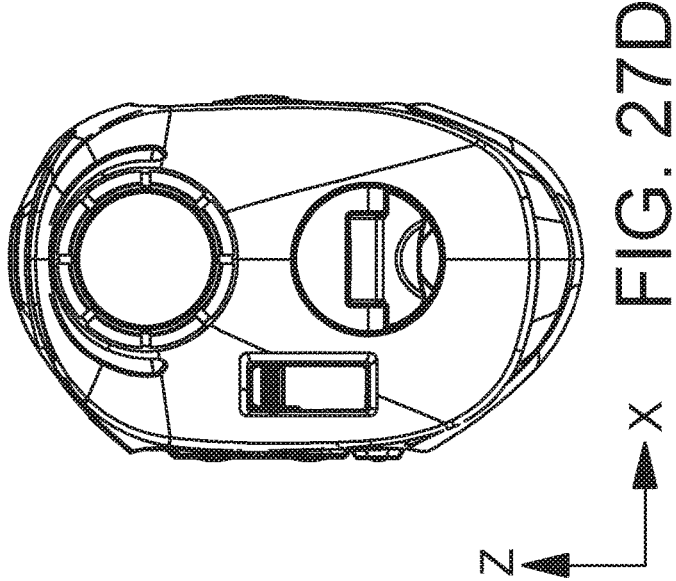

FIG. 27A through FIG. 27F are elevation and plan views showing six sides of a laser rangefinder having a housing 102. The process used to create views showing six sides of a three dimensional object may be referred to as multiview projection or orthographic projection. It is customary to refer to multiview projections using terms such as front view, right side view, top view, rear view, left side view, and bottom view. In accordance with this convention, FIG. 27A may be referred to as a front view of the housing 102, FIG. 27B may be referred to as a right side view of the housing 102, and FIG. 27C may be referred to as a top view of the housing 102. FIG. 27A through FIG. 27F may be referred to collectively as FIG. 27. Terms such as front view and right side view are used herein as a convenient method for differentiating between the views shown in FIG. 27. It will be appreciated that the elements shown in FIG. 27 may assume various orientations without deviating from the spirit and scope of this detailed description. Accordingly, the terms front view, right side view, top view, rear view, left side view, bottom view, and the like should not be interpreted to limit the scope of the invention recited in the attached claims. FIG. 27D may be referred to as a rear view of the housing 102, FIG. 27E may be referred to as a left side view of the housing 102, and FIG. 27F may be referred to as a bottom view of the housing 102.

Referring to FIG. 27A, the housing 102 of the laser rangefinder has a shape that is asymmetric about a plane P in some embodiments. The plane P intersects an optical axis 114 in some embodiments. The plane P extends in upward, downward, forward and rear ward directions in some embodiments. Referring to FIGS. 27A, 27B and 27E, the housing 102 of the laser rangefinder, in some embodiments, defines a right side recess and a left side recess. Referring to FIG. 27B, the housing 102 of the laser rangefinder supports an external display and a plurality of buttons in some embodiments. In embodiments, one button is located below the external display. In embodiments, two buttons are located forward of the external display. In embodiments, two buttons are located rearward of the external display.

The following United States patents are hereby incorporated by reference herein: U.S. Pat. Nos. 9,535,162, 9,518, 804, 9,494,686, 9,482,489, 9,429,653, 9,400,326, 9,383,448, 9,335,415, 9,322,920, 9,295,895, 9,274,202, 9,213,101, 9,212,868, 9,197,763, 9,151,603, 9,127,910, 9,095,761, 9,068,795, 9,038,901, 9,030,651, 8,959,823, 8,909,470, 8,868,342, 8,786,837, 8,708,841, 8,638,423, 8,605,259, 8,599,362, 8,529,380, 8,477,290, 8,411,257, 8,384,884, 8,355,869, 8,314,923, 8,240,186, 8,172,702, 8,081,300, 8,072,583, 8,070,629, 8,070,628, 8,040,758, 8,020,769, 8,018,580, 7,973,912, 7,942,762, 7,922,606, 7,898,647, 7,859,650, 7,713,148, 7,684,017, 7,658,031, 7,571,052, 7,535,553, 7,508,497, 7,414,707, 7,349,073, 7,239,377, 7,118,498, 7,053,992, 6,978,676, 6,934,012, 6,873,406, 6,862,084, 6,819,495, 6,717,654, 6,583,860, 6,529,827, 6,456,938, 6,433,860, 6,263,279, 6,252,655, 6,171,199, 6,144,308, 6,133,992, 6,108,071, 6,073,352, 6,029,121, 6,023,322, 5,953,109, 5,926,260, 5,926,259, 5,903,996, 5,898,484, 5,810,680, 5,703,678, 5,652,651, 5,623,335, 5,616,903, 5,364,093, 5,311,271, 5,283,732, 5,262,837, 5,046,839, 4,136,394, 8,797,511, and 8,909,470. Components illustrated in such patents may be utilized with embodiments herein. Incorporation by reference is discussed, for example, in MPEP section 2163.07(B).

The above references in all sections of this application are herein incorporated by references in their entirety for all purposes.

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. A method comprising:
   providing a laser rangefinder device comprising a processor operatively coupled to a view-thru display and a laser source, the laser rangefinder device emitting a laser beam along a laser beam axis;
   determining, with the processor, a device direction, wherein the laser beam axis extends in the device direction;
   receiving, by the processor, a signal representative of a wind vector, the wind vector comprising a vector direction and a vector magnitude;
   determining, with the processor, an angle, the angle extending between the device direction and the vector direction;
   calculating, with the processor, a headwind component velocity based on the angle and the vector magnitude;
   calculating, with the processor, a crosswind component velocity based on the angle and the vector magnitude;
   displaying, on the view-thru display, the headwind component velocity and the crosswind component velocity;
   displaying a first headwind icon or a second headwind icon, the first headwind icon pointing in an upward direction and the second headwind icon pointing in a downward direction;
   displaying, on the view-thru display, a first crosswind icon or a second crosswind icon, the first crosswind icon pointing in a leftward direction and the second crosswind icon pointing in a rightward direction;
   ranging a distance to an object with the laser source;
   identifying target acquisition; and
   indicating to a user the target acquisition by way of displaying a peripheral circular alteration of an image in the view-thru display upon target acquisition.

2. The method of claim 1 further comprising presenting the headwind component velocity and the crosswind component velocity numerically.

3. The method of claim 1 further comprising presenting the headwind component velocity and the crosswind component velocity each by way of a respective tail behind one of the headwind icons and one of the crosswind icons.

4. The method of claim 1 further comprising the processor obtaining the signal or information of the wind vector by way of a wireless link.

5. The method of claim 1 further comprising obtaining the signal representative of the wind vector from a wind sensor attached to the laser rangefinder device.

6. The method of claim 1 further comprising calculating with the processor a first correction to the laser ranged distance to the object based on the wind vector and displaying a play-as distance that utilized the first correction.

7. The method of claim 6 further comprising calculating with the processor a second correction to the laser ranged distance attributable to a difference in elevation between a location of the laser rangefinder device and the object and combining the second correction with the first correction based on the wind vector.

8. The method of claim 1, further comprising ranging a distance to a flagstick with the laser source and indicating to the user the target acquisition by way of a peripheral illumination of the display.

9. The method of claim 1, wherein the object is at or near a target of interest selected from a flagstick, a hazard or layup point.

10. The method of claim 1, wherein the object is a flagstick.

11. The method of claim 1 wherein there is no alteration of a central portion of the image in the target acquisition.

12. A laser rangefinder, comprising:
   a housing;
   an objective optic supported by the housing, the objective optic comprising one or more objective lenses;
   an eyepiece optic supported by the housing, the eyepiece optic comprising one or more eyepiece lenses;
   a view-thru display assembly disposed along an optical path between the objective optic and the eyepiece optic, the view-thru display assembly comprises a first transparent sheet and a plurality of electrodes disposed on a first inner surface of the first transparent sheet;
   the view-thru display assembly being disposed rearward of the objective optic and the eyepiece optic being disposed rearward of the view-thru display assembly so that a scene or a subject can be viewed through the eyepiece optic and a plurality of display elements selectively displayed by the view-thru display assembly are superimposed on the scene or the subject being viewed;
   circuitry operatively coupled to the view-thru display, wherein the circuitry comprises one or more processors and a non-transitory computer readable medium storing one or more instruction sets, wherein the one or more instruction sets include instructions configured to be executed by the one or more processors to cause the laser range finder to:

determine a device direction, wherein a laser beam axis extends in the device direction;

determine a wind vector, the wind vector comprising a vector direction and a vector magnitude;

determine an angle, the angle extending between the device direction and the vector direction;

calculate a headwind component velocity based on the angle and the vector magnitude;

calculate a crosswind component velocity based on the angle and the vector magnitude;

cause the view-thru display to present the headwind component velocity and the crosswind component velocity;

cause the view-thru display to present a selected a first headwind icon or a second headwind icon, the first headwind icon pointing in an upward direction and the second headwind icon pointing in a downward direction cause the view-thru display to present one of a first crosswind icon and second crosswind icon, the first crosswind icon pointing in a leftward direction and the second crosswind icon pointing in a rightward direction;

range a distance to an object with the laser source;

identify target acquisition; and indicate to a user the target acquisition by way of displaying a peripheral circular alteration of an image in the view-thru display upon target acquisition.

13. The laser rangefinder of claim 12 wherein calculating the crosswind component velocity comprises multiplying the vector magnitude by a sine of the angle.

14. The laser rangefinder of claim 12 wherein determining the device direction comprises analyzing a signal from a digital compass.

15. The laser rangefinder of claim 12 wherein the vector direction comprises a compass heading with a value between 0 and 360 degrees.

16. The laser rangefinder of claim 12 wherein determining the wind vector comprises analyzing, with the processor, a signal from a wind sensor.

17. The laser rangefinder of claim 12 wherein determining the wind vector comprises receiving wind information via a wireless link.

18. The laser rangefinder of claim 17 wherein the wireless link comprises one of WIFI and Bluetooth.

19. A laser rangefinder, comprising:

a housing;

an objective optic supported by the housing, the objective optic comprising one or more objective lenses;

an eyepiece optic supported by the housing, the eyepiece optic comprising one or more eyepiece lenses;

a view-thru display assembly disposed along an optical path between the objective optic and the eyepiece optic, the view-thru display assembly comprises a first transparent sheet and a plurality of electrodes disposed on a first inner surface of the first transparent sheet;

the view-thru display assembly being disposed rearward of the objective optic and the eyepiece optic being disposed rearward of the view-thru display assembly so that a scene or a subject can be viewed through the eyepiece optic and a plurality of display elements selectively displayed by the view-thru display assembly are superimposed on the scene or the subject being viewed;

the view-thru display including a plurality of selectively displayable icons disposed along an arcuate path in the following sequential order a zeroth icon, a first icon, a second icon, a third icon, a fourth icon, a fifth icon, a six icon, and a seventh icon;

circuitry operatively coupled to the view-thru display, wherein the circuitry comprises one or more processors and a non-transitory computer readable medium storing one or more instruction sets, wherein the one or more instruction sets include instructions configured to be executed by the one or more processors to cause the laser rangefinder to:

determine a device direction, wherein a laser beam axis extends in the device direction;

determine a wind vector, the wind vector comprising a wind direction and a wind magnitude;

determine an angle, the angle extending between the device direction and the wind direction;

identify a selected icon based on the angle;

cause the view-thru display to present the selected icon for viewing through the eyepiece optic;

cause the view-thru display to present a wind magnitude icon for viewing through the eyepiece optic;

range a distance to an object with the laser source;

identify target acquisition; and indicate to a user the target acquisition by way of displaying a peripheral circular alteration of an image in the view-thru display upon target acquisition.

* * * * *